US012658723B2

(12) United States Patent
Olsson et al.

(10) Patent No.: US 12,658,723 B2
(45) Date of Patent: Jun. 16, 2026

(54) MODULAR INTERCHANGEABLE BATTERY DEVICES, APPARATUS, AND SYSTEMS

(71) Applicant: SeeScan, Inc., San Diego, CA (US)

(72) Inventors: Mark S. Olsson, La Jolla, CA (US); Alexander L. Warren, Escondido, CA (US); Michael J. Martin, San Diego, CA (US); Jesse O. Casares, El Cajon, CA (US)

(73) Assignee: SeeScan, Inc., San Diego, CA (US)

( * ) Notice: Subject to any disclaimer, the term of this patent is extended or adjusted under 35 U.S.C. 154(b) by 650 days.

(21) Appl. No.: 18/089,266

(22) Filed: Dec. 27, 2022

(65) Prior Publication Data

US 2023/0283091 A1 Sep. 7, 2023

Related U.S. Application Data

(60) Provisional application No. 63/293,828, filed on Dec. 26, 2021.

(51) Int. Cl.
| | |
|---|---|
| *H02J 7/70* | (2026.01) |
| *H01R 31/06* | (2006.01) |
| *H01R 33/94* | (2006.01) |
| *H02J 7/00* | (2026.01) |

(52) U.S. Cl.
CPC .............. *H02J 7/751* (2026.01); *H01R 31/06* (2013.01); *H01R 33/94* (2013.01); *H02J 7/855* (2026.01); *H01M 2220/30* (2013.01)

(58) Field of Classification Search
CPC .................................................. H02J 7/0042
See application file for complete search history.

(56) References Cited

U.S. PATENT DOCUMENTS

| | | | | |
|---|---|---|---|---|
| 9,280,654 | B1 * | 3/2016 | Peterson | H02J 7/00712 |
| 10,371,305 | B1 * | 8/2019 | Olsson | F16L 55/26 |
| 10,935,686 | B1 * | 3/2021 | Olsson | G01S 19/071 |
| 11,398,739 | B1 * | 7/2022 | Santana | H02J 7/0044 |
| 11,404,892 | B2 * | 8/2022 | Will | H02J 7/02 |
| 11,495,929 | B1 * | 11/2022 | Murray | H01M 50/247 |
| 2009/0033277 | A1 * | 2/2009 | Ludtke | G01R 31/371 |
| | | | | 320/125 |
| 2009/0033278 | A1 * | 2/2009 | Ludtke | H02J 7/0045 |
| | | | | 320/106 |
| 2011/0197389 | A1 * | 8/2011 | Ota | H01M 50/213 |
| | | | | 429/121 |
| 2011/0286168 | A1 * | 11/2011 | Scheucher | H02J 7/0063 |
| | | | | 361/679.01 |
| 2013/0025893 | A1 * | 1/2013 | Ota | H02J 1/10 |
| | | | | 320/112 |

(Continued)

OTHER PUBLICATIONS

International Searching Authority, "Written Opinion of the International Searching Authority" for PCT Patent Application No. PCT/US2022/054086, Mar. 30, 2023, European Patent Office, Munich.

*Primary Examiner* — Tynese V McDaniel
(74) *Attorney, Agent, or Firm* — Steven C. Tietsworth, Esq.; Michael J. Pennington, Esq.

(57) ABSTRACT

Interchangeable battery interface apparatus and modular battery systems employing interchangeable battery adapter apparatus are disclosed. Embodiments may be used for adapting tools, instruments, and/or other devices to use different rechargeable battery types on hosts with different battery interface geometries.

18 Claims, 20 Drawing Sheets

200a — 230a — 240 — 250 — 210a — 220a
Compatible with *SeeScan*™, *Makita*™, and *Ridgid*™ Batteries 200d — 230d — 240 — 250 — 210d — 220d
Compatible with *DeWalt*™ Batteries 200e — 230e — 240 — 250 — 210e — 220e
Compatible with *Milwaukee*™ Batteries 200f — 230f — 240 — 250 — 210f — 220f
Compatible with *Bosch*™ Batteries 200a — 230a — 240 — 250 — 210a — 220a
Compatible with *SeeScan*™, *Makita*™, and *Ridgid*™ Batteries 200d — 230d — 240 — 250 — 210d — 220d
Compatible with *DeWalt*™ Batteries 200e — 230e — 240 — 250 — 210e — 220e
Compatible with *Milwaukee*™ Batteries 200f — 230f — 240 — 250 — 210f — 220f
Compatible with *Bosch*™ Batteries

(56) References Cited

U.S. PATENT DOCUMENTS

| | | | |
|---|---|---|---|
| 2014/0008093 A1 | 1/2014 | Patel | |
| 2014/0154535 A1* | 6/2014 | Olsson | H01M 10/613 |
| | | | 429/53 |
| 2016/0219193 A1* | 7/2016 | Price | H04N 23/50 |
| 2016/0311094 A1* | 10/2016 | Mergener | B25B 23/1475 |
| 2017/0070067 A1* | 3/2017 | Suzuki | B25H 3/022 |
| 2019/0181407 A1* | 6/2019 | Harris | H02J 7/00308 |
| 2021/0041516 A1* | 2/2021 | Bench | G01V 3/10 |
| 2021/0151945 A1* | 5/2021 | Yamaguchi | H01M 10/425 |
| 2021/0178569 A1* | 6/2021 | Huang | H02J 7/0045 |
| 2022/0216708 A1* | 7/2022 | Wee | H02J 1/06 |

\* cited by examiner

Compatible with *DeWalt* ™ Batteries

Compatible with *Bosch* ™ Batteries

Compatible with *SeeScan* ™, *Makita* ™, *and Ridgid* ™ Batteries

Compatible with *Milwaukee* ™ Batteries

Compatible with DeWalt™ Batteries

Compatible with Bosch™ Batteries

Compatible with SeeScan™, Makita™, and Ridgid™ Batteries

Compatible with Milwaukee™ Batteries

900

950    912a    912b    912c    912d    912e    912f

940

911a    911d    911e    911f 910a    910d    910e    910f    940

*1000*

*1000*

*1010a*

*1012a*

*1000*

*1010f*

*1010e*

*1010d*

*1060*

*1012f*

*1012e*

*1012d*

*1012c*

*1012b*

*1010a*

*1062*

*1012a*

MODULAR INTERCHANGEABLE BATTERY DEVICES, APPARATUS, AND SYSTEMS

CROSS-REFERENCE TO RELATED APPLICATIONS

This application claims priority under 35 U.S.C. § 119(e) to U.S. Provisional Patent Application Ser. No. 63/293,828, entitled MODULAR BATTERY SYSTEMS INCLUDING INTERCHANGEABLE BATTERY INTERFACE APPARATUS, filed on Dec. 26, 2021, the content of which is hereby incorporated by reference herein in its entirety for all purposes.

FIELD

This disclosure relates generally to modular battery systems that include interchangeable battery interfaces for use in coupling batteries in powering portable electronic devices, tools, or other instruments. More specifically, but not exclusively, the disclosure relates to modular battery systems that include interchangeable battery interface apparatuses for coupling batteries in utility locating devices, pipe inspection/cleaning devices, and/or other portable electronic devices, tools, or other instruments via different battery types having different sizes, shapes, and/or interface geometries.

BACKGROUND

There are many occupations where different battery powered tools, instruments, or other devices are required to perform various tasks. For instance, a broken or damaged sewer pipe in the ground may require one tool to inspect the pipe to discover the location of the break in the ground, a second tool tools to determine the corresponding location at the ground's surface, and yet other tools to excavate and repair the damage.

In such situations, each separate tool or set of tools may be made by a different manufacturer with each having a unique battery type. Each unique battery type may have a different interface geometry by which the battery or batteries couple with and electrically connect to the tool, instrument, or other device. For instance, the interface geometry may include the physical shape by which the battery or batteries couple to the device, as well as the position of electrical contacts that may align in coupling of electrical contacts of the battery or batteries and tool, instrument, or other host device. Such interface geometry is typically unique and specific to particularly battery types. Thus, different battery types may be incompatible with other tools or sets tools. This difference often requires two or more different battery types to accomplish a task at hand (e.g., determining the damage location in the pipe, determining the corresponding ground surface location, and excavating and repairing the damage).

There are various reasons it may be disadvantageous to require multiple different battery types in such scenarios. For instance, there may be a large upfront cost associated with purchasing a sufficient quantity of the different battery types and associated chargers. Likewise, there may be a large long-term expense due to the need to replace batteries that have a limited lifespan. Further, charging and storing may be problematic for some users.

In the pipe inspection and utility locating example above, for instance, a worker typically stores and charges batteries in a van or other work vehicle. It may be unduly cumbersome to charge all of them or, alternatively, swap out different charging apparatuses to charge different battery types due to the limited availability of electrical outlets or other charging ports in a typical vehicle.

Likewise, storage space may also be limited, and thus having multiple different battery types occupying a large amount of storage space may be undesirable. Further, a user may often be required to carry their tools some distance to a jobsite. In such scenarios, the weight of carrying many different battery types may prove to be unnecessarily physically taxing for a user. There are various other disadvantages to needing multiple different battery types and chargers as well.

Accordingly, there is a need in the art to address the above-described as well as other problems.

SUMMARY

The present disclosure relates generally to modular battery systems that include interchangeable battery interface apparatuses for use in coupling batteries in powering portable electronic devices, tools, or other instruments. More specifically, but not exclusively, the disclosure relates to modular battery systems that include interchangeable battery interface apparatuses which may be used in coupling batteries in powering utility locating devices, pipe inspection/cleaning devices, and/or other portable electronic devices, tools, or other instruments or systems via a variety of different battery types having different interface geometries.

In one aspect, the disclosure relates to an interchangeable battery interface apparatus for use with a host device. The apparatus may include, for example, a base subassembly configured to mechanically and electrically couple to the host device. The apparatus may also include a battery-specific adapter element operatively mechanically and electrically coupled to the base subassembly. The battery-specific adapter may include a battery-specific interface configured to mate with the interface geometry of a specific rechargeable battery type. The specific rechargeable battery type may be of a battery type that is not compatible with direct coupling to the host device or, in some embodiments, may be of a battery type that is couplable with the host device. The battery-specific adapter may include an electrical contact element having one or more electrically conductive contacts aligned so as to connect with the electrical contacts of the specific rechargeable battery type. The battery-specific adapter may include a control element having one or more electronic circuits to receive input electrical current from the specific rechargeable battery and provide output current for powering and/or exchanging data with the host device. The battery-specific adapter may include a routing element providing electrical connectivity and routing between the contact elements, control element, and the host device.

In another aspect, the disclosure relates to an interchangeable battery interface apparatus for use with a host device. The apparatus may, for example, include one or more base subassemblies configured to mechanically and electrically couple to the host device. The apparatus may further include a plurality of different battery-specific adapter elements electrically coupled to the one or more base subassemblies, wherein ones of the plurality of different battery-specific adapter each comprising, a battery-specific interface configured to mate with the interface geometry of a specific rechargeable battery type, wherein the specific rechargeable battery type is not compatible with direct coupling to the host device, an electrical contact element having one or more electrically conductive contacts aligned so as to connect with the electrical contacts of the specific rechargeable battery type, a control element having one or more electronic circuits to receive input electrical current from the specific rechargeable battery and provide output current for powering and/or exchanging data with the host device, and a routing element providing electrical connectivity and routing between the contact elements, control element, and the host device. Each of the plurality of different battery-specific adapters may be configured to mate with different specific rechargeable battery types In another aspect, the disclosure relates to a battery-specific battery adapter element for use between a battery and a host device. The adapter may, for example, include a battery-specific adapter element operatively mechanically and electrically coupleable to a base subassembly configured to operationally and mechanical couple to the host device, the battery-specific adapter may further include a battery-specific interface configured to mate with the interface geometry of a specific rechargeable battery type, wherein the specific rechargeable battery type is not compatible with direct coupling to the host device. The adapter may further include an electrical contact element having one or more electrically conductive contacts aligned so as to connect with the electrical contacts of the specific rechargeable battery type. The adapter may include a control element having one or more electronic circuits to receive input electrical current from the specific rechargeable battery and provide output current for powering and/or exchanging data with the host device. The adapter may include a routing element providing electrical connectivity and routing between the contact elements, control element, and the host device.

In another one aspect, the disclosure relates to an interchangeable battery interface apparatus for use in a battery powered host device. Each interchangeable battery interface apparatus embodiment may be configured for use with a specific rechargeable battery type and is replaceable or reconfigurable for use with different rechargeable battery types (e.g., batteries having different interface geometries which may include those from different manufacturers, have different chemistries, or the like). Various interchangeable battery interface apparatus embodiments of the present disclosure may include a battery-specific adapter element having a battery-specific interface formed to mate with the interface geometry of the specific rechargeable battery type as well as a contact element having one or more electrically conductive contacts aligned so as to connect with electrical contacts on the specific battery type in use. The interchangeable battery interface apparatus embodiments may include a control element having one or more electronic circuits to receive input electrical current from the battery and output current for powering and/or exchanging data with the host. A routing element may be included to establish electrical pathways between the contact elements, control element, and the host device. Such a routing element may be configured with electrically conductive pathways for various different battery types.

In another aspect, the present disclosure relates to a modular battery system embodiment employing one or more interchangeable battery interface apparatuses as disclosed herein. The modular battery system may include a battery-powered host device. The battery-powered host device may include a mount element by which one or more interchangeable battery interface apparatus embodiments mate with a host device to allow the host device to use a battery type or battery types with particular interface geometries that are reconfigurable for mating a battery type or battery types with different interface geometries in powering the host device (e.g., a mounting port by which one or more interchangeable battery interface apparatuses may mate with a host device or wherein various elements of one or more interchangeable battery interface apparatuses are built into the host device).

The one or more rechargeable batteries may couple with one or more interchangeable battery interface apparatus embodiments to facilitate providing power to the host device. Each interchangeable battery interface apparatus may be sized and shaped with mounting and electrical connections for use with a specific rechargeable battery type or types and may be replaceable or reconfigurable for use with different rechargeable battery types. The interchangeable battery interface apparatus embodiments may include a battery-specific adapter element having a battery-specific interface formed to mate with the interface geometry of the specific rechargeable battery or batteries and a contact element having one or more electrically conductive contacts that extend through the battery-specific interface aligned so as to connect with electrical contacts on the specific battery type or battery types. Each interchangeable battery interface apparatus embodiment may include a control element having one or more electronic circuits to receive input electrical current from each battery and output current for powering and/or exchanging data with the host device. A routing element may establish electrical pathways between the contact elements, control element, and the host device. Such a routing element may be configured with electrically conductive pathways for various different battery types.

Additional aspects, features, and functionality are further described below in conjunction with the appended drawings.

BRIEF DESCRIPTION OF THE DRAWINGS

The present disclosure may be more fully appreciated in connection with the following detailed description taken in conjunction with the accompanying drawings, wherein.

DETAILED DESCRIPTION OF EMBODIMENTS

Overview

Figure 1:
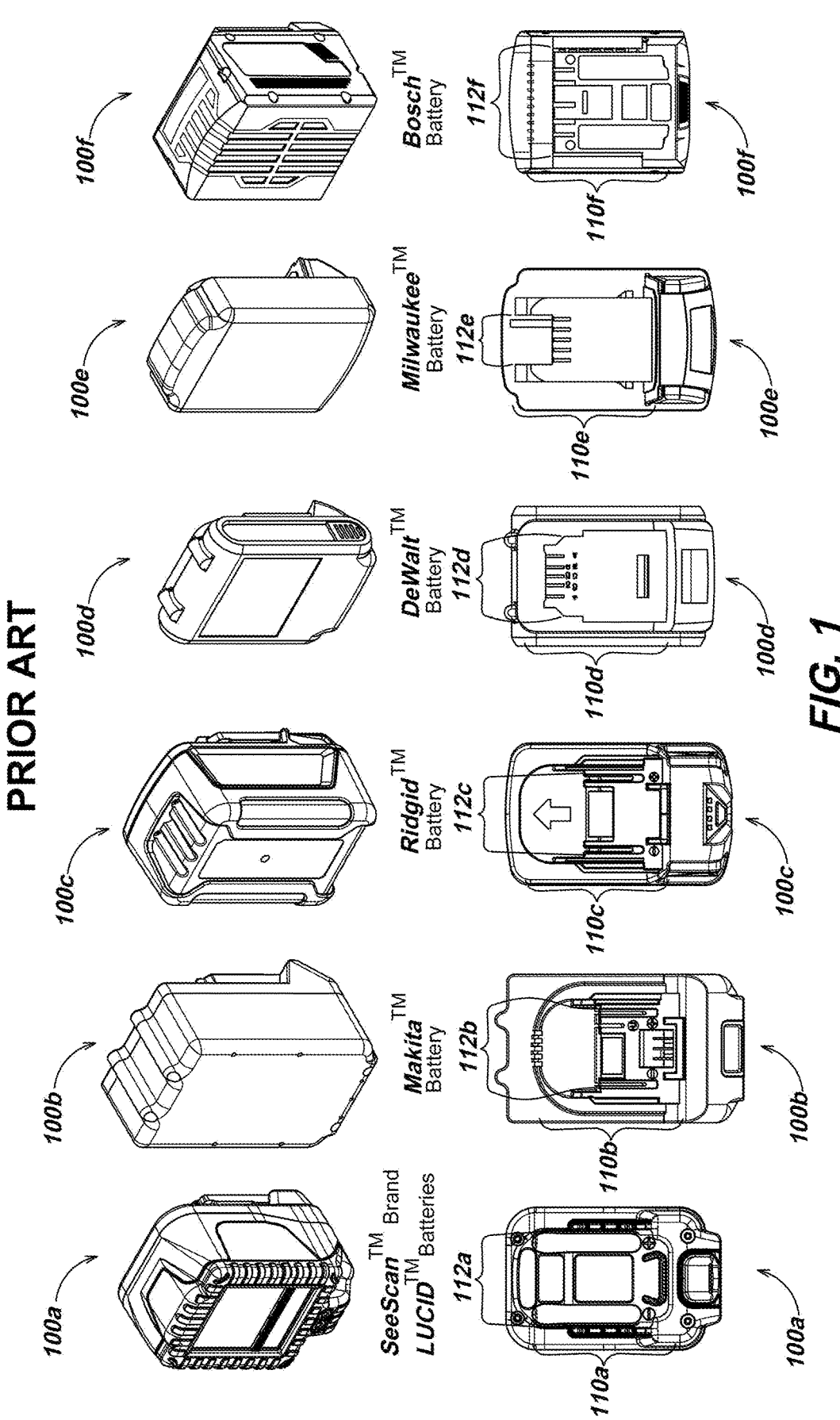
FIG. 1 is an illustration of various example prior art batteries.

This disclosure relates generally to modular battery systems that include interchangeable battery interface apparatuses for use in coupling different batteries to power portable electronic devices, tools, or other instruments. More specifically, but not exclusively, the disclosure relates to modular battery systems that include interchangeable battery interface apparatuses which may be used in coupling batteries in powering utility locating devices, pipe inspection/cleaning devices, and/or other portable electronic devices, tools, or other equipment or instruments via a variety of different battery types and/or with different interface geometries.

Embodiments of the modular battery system and associated interchangeable battery interface apparatus may be used in conjunction with various electronic devices, including buried object locators/utility locator devices, utility locating transmitters, GNSS backpack devices, rangefinder apparatuses and devices, pipe inspection and/or cleaning cable-reels, camera control units (CCU) or other control units associated with pipe inspection and/or cleaning devices. Exemplary embodiments may be used with systems and devices such as those described in the incorporated patents and applications below or in other devices. In exemplary embodiments the modular battery system and associated interchangeable battery interface apparatus may be coupled to or integrated with a buried utility locator device or pipe inspection camera system device to power the devices using multiple different battery types.

For example, in one aspect, the disclosure relates to an interchangeable battery interface apparatus for use with a host device. The apparatus may include, for example, a base subassembly configured to mechanically and electrically couple to the host device. The apparatus may also include a battery-specific adapter element operatively mechanically and electrically coupled to the base subassembly. The battery-specific adapter may include a battery-specific interface configured to mate with the interface geometry of a specific rechargeable battery type. The specific rechargeable battery type may be of a battery type that is not compatible with direct coupling to the host device or, in some embodiments, may be of a battery type that is couplable with the host device. The battery-specific adapter may include an electrical contact element having one or more electrically conductive contacts aligned so as to connect with the electrical contacts of the specific rechargeable battery type. The battery-specific adapter may include a control element having one or more electronic circuits to receive input electrical current from the specific rechargeable battery and provide output current for powering and/or exchanging data with the host device. The battery-specific adapter may include a routing element providing electrical connectivity and routing between the contact elements, control element, and the host device.

The base assembly may, for example, be attachably and detachably disposed or coupled on the host device. In some embodiments the base assembly may be built into or non-detachably disposed on the host device or coupled to the host device. The battery-specific adapter element may be detachably and detachably couplable to the base assembly or, in some embodiments, the battery-specific adapter element may be fixedly or non-detachably coupled to the base assembly. The base assembly and battery-specific adapter element may be configured to be attachable and detachable or, in some embodiments, the base assembly and battery-specific adapter element may be configured to be fixed together and not detachable. Some embodiments may include a second battery specific adapter element having a different battery specific interface configured to mate with a second specific rechargeable battery different from the specific rechargeable battery.

The control element may, for example, include an under-voltage-lockout (UVLO) circuit and/or an over-voltage protection circuitry, and/or a temperature sensor, and/or one or more electronic circuits, modules, or elements for stepping up or stepping down voltage levels of the specific rechargeable battery type to correspond with a voltage requirement of the host device, and/or or more processors or processing elements or modules which may include or be operatively coupled to associated non-transitory memories. The processors or processing elements or modules may be used to control adapter operations and/or for communicating data between the host device and the specific rechargeable battery type. The communicated data may include virally communicated data and/or code transferred between the specific rechargeable battery and the host device or to another device or system. The communicated data is used to authenticate the specific rechargeable battery for use on with the host. The communicated data may be used to store metrics on battery operation such as, for example, battery charge capacity, cycles, life expectancy, current output, voltage outputs, temperature, or other battery parameters.

The host may, for example, be a buried utility locator, and the base assembly may be configured to mechanically and electrically couple to the utility locator battery interface. The host may be a utility locator transmitter and the base assembly may be configured to mechanically and electrically couple to the utility locator transmitter battery interface. The host may be a video inspection system device and the base assembly may be configured to mechanically and electrically couple to the video inspection system device battery interface. The video inspection system device may be a video camera control unit (CCU). The video inspection system device may be a cable reel. The video inspection system device may be a powered cable feed apparatus for feeding and/or retracting push cable from within a buried utility or other cavity. The host may be a rangefinder and the base assembly may be configured to mechanically and electrically couple to the rangefinder battery interface. The rangefinder may be operatively coupled to a buried utility locator. The host may be a GNSS backpack device and the base assembly may be configured to mechanically and electrically couple to the GNSS backpack device battery interface.

The apparatus may, for example, include a sealing element to provide one or more seals between the base assembly and host device for waterproofing or otherwise protecting against the external environment. In addition or alternatively, the sealing element may provide one or more seals between the battery specific interface apparatus and the battery for waterproofing or otherwise protecting against the external environment.

The apparatus may, for example, include one or more external connector ports. The connector ports may be configured for connecting with one or more external devices or power sources to exchange data and/or provide electrical power. The external connector port may be a universal serial bid (USB) connector. The external connector port may be a USB power delivery (PD) connector port. The apparatus may be configured to charge the specific rechargeable battery via the external connector port.

The apparatus may, for example, include a wireless element to wirelessly communicate data from the specific rechargeable battery and/or the host. The wireless element may be one or more Wi-Fi, Bluetooth, Bluetooth Low Energy (BLE), or near-field communication (NFC) module. Alternately or in addition, the apparatus may include a wired communications element. The wired communications element may be configured to communicatively transfer data from the specific rechargeable battery and/or host and/or to or from another device or system. The wired communications element may be a USB transceiver.

The control element may, for example, include an under-voltage-lockout (UVLO) circuit. The electrically conductive contacts may be insertably sealed. The electrically conductive contacts may be individually sealed.

In another aspect, the disclosure relates to an interchangeable battery interface apparatus for use with a host device. The apparatus may, for example, include one or more base subassemblies configured to mechanically and electrically couple to the host device. The apparatus may further include a plurality of different battery-specific adapter elements electrically coupled to the one or more base subassemblies, wherein ones of the plurality of different battery-specific adapter each comprising, a battery-specific interface configured to mate with the interface geometry of a specific rechargeable battery type, wherein the specific rechargeable battery type is not compatible with direct coupling to the host device, an electrical contact element having one or more electrically conductive contacts aligned so as to connect with the electrical contacts of the specific rechargeable battery type, a control element having one or more electronic circuits to receive input electrical current from the specific rechargeable battery and provide output current for powering and/or exchanging data with the host device, and a routing element providing electrical connectivity and routing between the contact elements, control element, and the host device. Each of the plurality of different battery-specific adapters may be configured to mate with different specific rechargeable battery types In another aspect, the disclosure relates to a battery-specific battery adapter element for use between a battery and a host device. The adapter may, for example, include a battery-specific adapter element operatively mechanically and electrically coupleable to a base subassembly configured to operationally and mechanical couple to the host device, the battery-specific adapter may further include a battery-specific interface configured to mate with the interface geometry of a specific rechargeable battery type, wherein the specific rechargeable battery type is not compatible with direct coupling to the host device. The adapter may further include an electrical contact element having one or more electrically conductive contacts aligned so as to connect with the electrical contacts of the specific rechargeable battery type. The adapter may include a control element having one or more electronic circuits to receive input electrical current from the specific rechargeable battery and provide output current for powering and/or exchanging data with the host device. The adapter may include a routing element providing electrical connectivity and routing between the contact elements, control element, and the host device.

In another aspect, the disclosure relates to an interchangeable battery interface apparatus for use in a battery powered host device. Each interchangeable battery interface apparatus embodiments may be configured for use with a specific rechargeable battery type and is replaceable or reconfigurable for use with different rechargeable battery types (e.g., batteries having different interfaces geometries that may further be from different manufacturers and/or have different chemistries).

In some embodiments, different interchangeable battery interface apparatus embodiments may, for instance, be configured for use with different commercially available power tool batteries. Interchangeable battery interface apparatus embodiments may include a battery-specific adapter element having a battery-specific interface formed to mate with the interface geometry of the specific rechargeable battery type and a contact element having one or more electrically conductive contacts that extend through the battery-specific interface aligned so as to connect with electrical contacts on the specific battery type. The interchangeable battery interface apparatus embodiment may include a control element having one or more electronic circuits to receive input electrical current from the battery and output current for powering and/or exchanging data with the host.

The control element may, for instance, be or include an undervoltage-lockout (UVLO) circuit. Likewise, the control element may include overvoltage protection circuits. Further, in some embodiments the control element may include circuitry configured to adjust input current for stepping up/down the voltage. One or more temperature sensors may be included in the control element to measure temperature which may further function to shut down the interchangeable battery interface apparatus if unsafe temperatures are measured. In some embodiments, the control element may include one or more processors and associated non-transitory memories for the exchange of data with the host device and/or rechargeable battery. In some such embodiments, the exchanged data may include a viral-like scheme and associated electronics to communicate data and/or transfer code between batteries, host devices, and interchangeable battery interface apparatuses. In yet further embodiments, the processors and memories may be used to authenticate batteries coupled to the interchangeable battery interface apparatus. For instance, the authentication of batteries may be used to disable the interchangeable battery interface apparatus and therefore a connected host device for purpose of disallowing some battery types and/or as a security measure in case of theft.

A routing element may be included establishing electrical pathways between the contact elements, control element, and the host device. In some embodiments, a sealing element may be included to provide one or more seals for the interchangeable battery interface apparatus and/or host device in waterproofing or otherwise protecting against external environment. In some such embodiments the interchangeable battery interface apparatus elements may be independently sealed separately from the battery-specific adapter element. For instance, in embodiments having a base subassembly common to a plurality of battery-specific adapter elements, the subassembly may be independently sealed from the battery-specific adapter element. Further, some embodiments may include a wireless element (e.g., one or more Wi-Fi, Bluetooth, Bluetooth Low Energy (BLE), near-field communication (NFC) or like wireless communication apparatus or technologies). The wireless element may communicate data wirelessly to a host device, one or more batteries, remote server, and/or one or more other devices.

In another aspect, the present disclosure relates to a modular battery system employing one or more interchangeable battery interface apparatuses as disclosed herein. The modular battery system may include a battery-powered host device. The battery-powered host device may include a mount element by which one or more interchangeable battery interface apparatuses mate with a host device in configuring the host device for use with a battery type or battery types with particular interface geometries that is reconfigurable for mating a battery type or battery types with different interface geometries in powering the host device (e.g., a mounting port by which one or more interchangeable battery interface apparatuses may mate with a host device or wherein various elements of one or more interchangeable battery interface apparatuses are built into the host device).

One or more rechargeable batteries may be included in modular battery system embodiments that couple with one or more interchangeable battery interface apparatuses in powering the host device. Each interchangeable battery interface apparatus embodiment may be configured for use with a specific rechargeable battery type or battery types and is replaceable or reconfigurable for use with different rechargeable battery types. In some embodiments, interchangeable battery interface apparatuses may, for instance, be configured for use with different commercially available power tool batteries. The interchangeable battery interface apparatus embodiments may include a battery-specific adapter element having a battery-specific interface formed to mate with the interface geometry of the specific rechargeable battery or batteries and a contact element having one or more electrically conductive contacts that extend through the battery-specific interface aligned so as to connect with electrical contacts on the specific battery type or battery types.

Each interchangeable battery interface apparatus embodiment may include a control element having one or more electronic circuits to receive input electrical current from each battery and output current for powering and/or exchanging data with the host device. The control element may, for instance, include an UVLO circuit. Likewise, an overvoltage circuit may be included in the control element to protect against excessive voltage reaching a connected host device. Further, in some embodiments the control element may include circuitry configured to adjust input current for stepping up/down the voltage. One or more temperature sensors may be included in the control element to measure temperature which may further function to shut down the interchangeable battery interface apparatus if unsafe temperatures are measured.

In some embodiments, the control element includes one or more processors and associated non-transitory memories for the exchange of data with the host device and/or rechargeable battery. In some such embodiments, the exchanged data may include a viral-like scheme and associated electronics to communicate data and/or transfer code between batteries, host devices, and interchangeable battery interface apparatuses. In yet further embodiments, the processors and memories may be used to authenticate batteries coupled to the interchangeable battery interface apparatus. For instance, the authentication of batteries may be used to disable the interchangeable battery interface apparatus and therefore a connected host device for purpose of disallowing some battery types and/or as a security measure in case of theft. A routing element may establish electrical pathways between the contact elements, control element, and the host device. Such a routing element may be configured with electrically conductive pathways for various different battery types. In some embodiments, a sealing element may be included to provide one or more seals for the interchangeable battery interface apparatus and/or host device in waterproofing or otherwise protecting against external environment. In some such embodiments, the interchangeable battery interface apparatus elements are independently sealed separately from the battery-specific adapter element.

In another aspect, exemplary interchangeable battery interface apparatus embodiments and modular battery system embodiments of the present disclosure may be employed in various utility locating system tools and devices used in locating and/or mapping utility lines. In at least one embodiment, the interchangeable battery interface apparatus and modular battery system embodiments of the present disclosure may be employed in a utility locator device for determining utility line locations from magnetic fields emitted by one or more utility lines. In one exemplary use, the interchangeable battery interface apparatus embodiments and modular battery system embodiments of the present disclosure may be employed in a utility locating transmitter device for coupling electrical current on one or more utility lines in generating magnetic field.

In another exemplary embodiment, the interchangeable battery interface apparatus embodiments of the present disclosure may be employed in a GNSS backpack device used in utility locating systems to determine geolocation information. In yet another exemplary embodiment, the interchangeable battery interface apparatus and modular battery system embodiments of the present disclosure may be employed in a rangefinder device used in utility locating systems to determine distances.

In another aspect, exemplary interchangeable battery interface apparatus embodiments and modular battery system embodiments of the present disclosure may be employed in various pipe inspection and/or cleaning system tools used in inspecting and/or cleaning pipes or other voids. In at least one embodiment, the interchangeable battery interface apparatus and modular battery system embodiments of the present disclosure may be employed in a cable reel used to store and dispense push-cables in pipe inspection and/or cleaning systems. In at least one embodiment, the interchangeable battery interface apparatus and modular battery system embodiments of the present disclosure may be employed in a control unit for displaying pipe inspection imagery and/or controlling the pipe inspection camera, cable drum, and/or cleaning tool.

In another aspect, the interchangeable battery interface apparatus embodiments and modular battery system embodiments of the present disclosure may be configured for use with a plurality of batteries. In some such embodiments, the plurality of batteries may be of different chemistries, different manufacturers, different shapes and/or sizes, and/or different mechanical and/or electrical interface geometries.

In another aspect, the interchangeable battery interface apparatus embodiments may be replaceable or reconfigurable for use with other battery types by the user in some modular battery system embodiments of the present disclosure. In yet other modular battery system embodiments and interchangeable battery interface apparatus embodiments, the interchangeable battery interface apparatus may be configured for battery type in manufacture and may be replaceable/reconfigurable by a qualified expert/technician for use with other battery types.

Details of example devices, systems, and methods that may be used in combination with the interchangeable battery interface embodiments and modular battery system embodiments herein in further embodiments, as well as additional components, methods, and configurations that may be used in conjunction with the embodiments described herein, are disclosed in various co-assigned patents and patent applications. These include, but are not limited to, U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTICHANNEL LOCATOR SYSTEM FOR MULTIPLE PROXIMITY DETECTION; U.S. Pat. No. 7,969,151, issued Jun. 28, 2011, entitled PRE-AMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE POR-TABLE LOCATOR EMPLOYING MULTIPLE SENSOR ARRAYS HAVING FLEXIBLE NESTED ORTHOGO-NAL ANTENNAS; U.S. Pat. No. 8,264,226, issued Sep. 11, 2012, entitled SYSTEM AND METHOD FOR LOCATING BURIED PIPES AND CABLES WITH A MAN POR-TABLE LOCATOR AND A TRANSMITTER IN A MESH NETWORK; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUC-TURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICAT-ING THE DIFFERENT LOCATIONS TO A USER; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYS-TEM; U.S. Pat. No. 8,717,028, issued May 6, 2014, entitled SPRING CLIPS FOR USE WITH LOCATING TRANS-MITTERS; U.S. Pat. No. 8,773,133, issued Jul. 8, 2014, entitled ADAPTIVE MULTICHANNEL LOCATOR SYS-TEM FOR MULTIPLE PROXIMITY DETECTION; U.S. Pat. No. 8,841,912, issued Sep. 23, 2014, entitled PRE-AMPLIFIER AND MIXER CIRCUITRY FOR A LOCA-TOR ANTENNA; U.S. Pat. No. 9,041,794, issued May 26, 2015, entitled PIPE MAPPING SYSTEMS AND METH-ODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR; U.S. Pat. No. 9,082, 269, issued Jul. 14, 2015, entitled HAPTIC DIRECTIONAL FEEDBACK HANDLES FOR LOCATION DEVICES; U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,341, 740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYS-TEMS, AND METHODS; U.S. patent application Ser. No. 15/187,785, filed Jun. 21, 2016, entitled BURIED UTILITY LOCATOR GROUND TRACKING APPARATUS, SYS-TEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYN-CHRONIZED BURIED OBJECT LOCATOR APPARA-TUS, SYSTEMS, AND METHODS; U.S. Pat. No. 9,465, 129, issued Oct. 11, 2016, entitled IMAGE-BASED MAPPING LOCATING SYSTEM; U.S. Pat. No. 9,488,747, issued Nov. 8, 2016, entitled GRADIENT ANTENNA COILS AND ARRAYS FOR USE IN LOCATING SYS-TEM; U.S. Pat. No. 9,494,706, issued Nov. 15, 2016, entitled OMNI-INDUCER TRANSMITTING DEVICES AND METHODS; U.S. Pat. No. 9,523,788, issued Dec. 20, 2016, entitled MAGNETIC SENSING BURIED OBJECT LOCATOR INCLUDING A CAMERA; U.S. Pat. No. 9,571, 326, issued Feb. 14, 2017, entitled METHOD AND APPA-RATUS FOR HIGH-SPEED DATA TRANSFER EMPLOY-ING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS; U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZ-ING QUADRATURE AMPLITUDE MODULATION (QAM); United States patent application, filed Apr. 25, 2017, entitled SYSTEMS AND METHODS FOR LOCAT-ING AND/OR MAPPING BURIED UTILITIES USING VEHICLE-MOUNTED LOCATING DEVICES; U.S. Pat. No. 9,638,824, issued May 2, 2017, entitled QUAD-GRA-DIENT COILS FOR USE IN LOCATING SYSTEMS; United States patent application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYS-TEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696, 448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPARATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 2018, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS; U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORTHOGONAL ANTENNAE; U.S. patent application Ser. No. 16/036,713, issued Jul. 16, 2018, entitled UTILITY LOCATOR APPARATUS AND SYSTEMS; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA; U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE; U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. Pat. No. 10,490,908, issued Nov. 26, 2019, entitled DUAL ANTENNA SYSTEMS WITH VARIABLE POLARIZATION; U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METHODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/810,788, filed Mar. 5, 2019, entitled MAGNETICALLY RETAINED DEVICE HANDLES; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. patent application Ser. No. 17/235,507, filed Apr. 20, 2021, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. patent application Ser. No. 17/013,831, filed Sep. 7, 2020, entitled MULTIFUNCTION BURIED UTILITY LOCATING CLIPS; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; U.S. Provisional Patent Application 63/091,670, filed Oct. 14, 2020, entitled ELECTRONIC MARKER-BASED NAVIGATION SYSTEMS AND METHODS FOR USE IN GNSS-DEPRIVED ENVIRONMENTS; U.S. Pat.

No. 10,809,408, issued Oct. 20, 2020, entitled DUAL SENSED LOCATING SYSTEMS AND METHODS; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; U.S. Pat. No. 10,955,583, issued Mar. 23, 2021, entitled BORING INSPECTION SYSTEMS AND METHODS; U.S. Pat. No. 10,983,239, issued Apr. 20, 2021, entitled MULTI-FREQUENCY LOCATING SYSTEMS AND METHODS; U.S. Pat. No. 10,983,240, issued Apr. 20, 2021, entitled MAGNETIC UTILITY LOCATOR DEVICE AND METHOD; U.S. Pat. No. 10,989,830, issued Apr. 27, 2021, entitled UTILITY LOCATOR APPARATUS AND SYSTEMS; U.S. Pat. No. 11,014,734, issued May 25, 2021, entitled MARKING PAINT APPLICATOR APPARATUS; U.S. Pat. No. 11,029,439, issued Jun. 8, 2021, entitled UTILITY LOCATOR APPARATUS, SYSTEMS, AND METHODS; U.S. Provisional Patent Application 63/212,713, filed Jun. 20, 2021, entitled DAYLIGHT VISIBLE AND MULTI-SPECTRAL LASER RANGEFINDERS AND ASSOCIATED METHODS AND UTILITY LOCATOR DEVICES; U.S. Pat. No. D922,885, issued Jun. 22, 2021, entitled BURIED UTILITY LOCATOR; U.S. patent application Ser. No. 17/379,867, filed Jul. 19, 2021, entitled LOCATING DEVICES, SYSTEMS, AND METHODS USING FREQUENCY SUITES FOR UTILITY DETECTION; U.S. patent application Ser. No. 17/382,040, filed Jul. 21, 2021, entitled VEHICLE-BASED UTILITY LOCATING USING PRINCIPAL COMPONENTS; U.S. Pat. No. 11,073,632, issued Jul. 27, 2021, entitled LOCATING DEVICES, SYSTEMS, AND METHODS USING FREQUENCY SUITES FOR UTILITY DETECTION; U.S. Pat. No. 11,092,712, issued Aug. 17, 2021, entitled UTILITY LOCATING SYSTEMS, DEVICES, AND METHODS USING RADIO BROADCAST SIGNALS; U.S. patent application Ser. No. 17/461,833, filed Aug. 30, 2021, entitled COMBINED SATELLITE NAVIGATION AND RADIO TRANSCEIVER ANTENNA DEVICES; U.S. patent application Ser. No. 17/467,435, filed Sep. 6, 2021, entitled TRACKABLE DIPOLE DEVICES, METHODS, AND SYSTEMS FOR USE WITH MARKING PAINT STICKS; U.S. patent application Ser. No. 17/467,438, filed Sep. 6, 2021, entitled SATELLITE AND MAGNETIC FIELD SONDE APPARATUS AND METHODS; U.S. Pat. No. 11,137,513, issued Oct. 5, 2021, entitled INDUCTIVE CLAMP DEVICES, SYSTEMS, AND METHODS; U.S. Pat. No. 11,146,892, issued Oct. 12, 2021, entitled MAGNETIC FIELD CANCELING AUDIO DEVICES; U.S. patent application Ser. No. 17/501,670, filed Oct. 14, 2021, entitled ELECTRONIC MARKER-BASED NAVIGATION SYSTEMS AND METHODS FOR USE IN GNSS-DEPRIVED ENVIRONMENTS; U.S. Pat. No. 11,156,737, issued Oct. 26, 2021, entitled BURIED OBJECT LOCATOR APPARATUS AND METHODS; U.S. Pat. No. 11,171,369, issued Nov. 9, 2021, entitled MODULAR BATTERY PACK APPARATUS, SYSTEMS, AND METHODS; U.S. patent application Ser. No. 17/522,857, filed Nov. 9, 2021, entitled WIRELESS BURIED PIPE AND CABLE LOCAT- ING SYSTEMS; U.S. patent application Ser. No. 17/523,857, filed Nov. 10, 2021, entitled SONDE DEVICES INCLUDING A SECTIONAL FERRITE CORE STRUCTURE; U.S. Pat. No. 11,175,427, issued Nov. 16, 2021, entitled BURIED UTILITY LOCATING SYSTEMS WITH OPTIMIZED WIRELESS DATA COMMUNICATION; U.S. patent application Ser. No. 17/531,533, filed Nov. 19, 2021, entitled INPUT MULTIPLEXED SIGNAL PROCESSING APPARATUS AND METHODS; U.S. patent application Ser. No. 17/540,239, filed Dec. 1, 2021, entitled DUAL SENSED LOCATING SYSTEMS AND METHODS; U.S. patent application Ser. No. 17/541,057, filed Dec. 2, 2021, entitled COLOR-INDEPENDENT MARKER DEVICE APPARATUS, SYSTEMS, AND METHODS; U.S. patent application Ser. No. 17/540,231, filed Dec. 2, 2021, entitled AUTO-TUNING CIRCUIT APPARATUS AND METHODS; U.S. Pat. No. 11,193,767, issued Dec. 7, 2021, entitled SMART PAINT STICK DEVICES AND METHODS; U.S. Pat. No. 11,199,521, issued Dec. 14, 2021, entitled RESILIENTLY DEFORMABLE MAGNETIC FIELD CORE APPARATUS AND APPLICATIONS; U.S. Pat. No. 11,204,246, issued Dec. 21, 2021, entitled DUAL SENSED LOCATING SYSTEMS AND METHODS; U.S. Provisional Patent Application 63/293,828, filed Dec. 26, 2021, entitled MODULAR BATTERY SYSTEMS INCLUDING BATTERY INTERFACE APPARATUS; U.S. patent application Ser. No. 17/563,049, filed Dec. 28, 2021, entitled SONDE DEVICES WITH A SECTIONAL FERRITE CORE; U.S. Provisional Patent Application 63/306,088, filed Feb. 2, 2022, entitled UTILITY LOCATING SYSTEMS AND METHODS WITH FILTER TUNING FOR POWER GRID FLUCTUATIONS; U.S. patent application Ser. No. 17/687,538, filed Mar. 4, 2022, entitled ANTENNAS, MULTI-ANTENNA APPARATUS, AND ANTENNA HOUSINGS; U.S. patent application Ser. No. 17/694,640, filed Mar. 14, 2022, entitled UTILITY LOCATORS WITH RETRACTABLE SUPPORT STRUCTURES AND APPLICATIONS THEREOF; U.S. patent application Ser. No. 17/694,656, filed Mar. 14, 2022, entitled ELECTROMAGNETIC MARKER DEVICES FOR BURIED OR HIDDEN USE; U.S. Pat. No. 11,280,934, issued Mar. 22, 2022, entitled ELECTROMAGNETIC MARKER DEVICES FOR BURIED OR HIDDEN USE; U.S. Pat. No. 11,300,597, issued Apr. 12, 2022, entitled SYSTEMS AND METHODS FOR LOCATING AND/OR MAPPING BURIED UTILITIES USING VEHICLE-MOUNTED LOCATING DEVICES; U.S. Pat. No. 11,300,700, issued Apr. 12, 2022, entitled SYSTEMS AND METHODS OF USING A SONDE DEVICE WITH A SECTIONAL FERRITE CORE STRUCTURE; U.S. Pat. No. 11,300,701, issued Apr. 12, 2022, entitled UTILITY LOCATORS WITH RETRACTABLE SUPPORT STRUCTURES; U.S. patent application Ser. No. 17/728,949, filed Apr. 25, 2022, entitled BURIED UTILITY LOCATOR GROUND TRACKING APPARATUS, SYSTEMS, AND METHODS; U.S. patent application Ser. No. 17/731,579, filed Apr. 28, 2022, entitled BURIED UTILITY MARKER DEVICES, SYSTEMS, AND METHODS; U.S. Pat. No. 11,333,786, issued May 17, 2022, entitled BURIED UTILITY MARKER DEVICES, SYSTEMS, AND METHODS; U.S. patent application Ser. No. 17/833,799, filed Jun. 6, 2022, entitled TRACKED DISTANCE MEASURING DEVICES, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDERS AND ASSOCIATED SYSTEMS AND METHODS AND UTILITY LOCATOR DEVICES; U.S. Pat. No. 11,366,245, issued Jun. 21, 2022, entitled BURIED UTILITY LOCA-TOR GROUND TRACKING APPARATUS, SYSTEMS, AND METHODS; U.S. Pat. No. 11,397,274, issued Jul. 26, 2022, entitled TRACKED DISTANCE MEASURING DEVICES, SYSTEMS, AND METHODS; U.S. Pat. No. 11,428,814, issued Aug. 30, 2022, entitled OPTICAL GROUND TRACKING APPARATUS, SYSTEMS, AND METHODS FOR USE WITH BURIED UTILITY LOCA-TORS; U.S. patent application Ser. No. 17/930,029, filed Sep. 6, 2022, entitled GNSS POSITIONING METHODS AND DEVICES USING PPP-RTK, RTK, SSR, OR LIKE CORRECTION DATA; U.S. Pat. No. 11,448,600, issued Sep. 20, 2022, entitled MULTI-CAMERA PIPE INSPEC-TION APPARATUS, SYSTEMS AND METHODS; U.S. patent application Ser. No. 17/935,564, filed Sep. 26, 2022, entitled SYSTEMS AND METHODS FOR DETERMIN-ING AND DISTINGUISHING BURIED OBJECTS USING ARTIFICIAL INTELLIGENCE; U.S. Pat. No. 11,460,598, issued Oct. 4, 2022, entitled USER INTERFACES FOR UTILITY LOCATORS; U.S. Pat. No. 11,467,317, issued Oct. 11, 2022, entitled ELECTROMAGNETIC MARKER DEVICES WITH SEPARATE RECEIVE AND TRANS-MIT ANTENNA ELEMENTS; U.S. Pat. No. 11,468,610, issued Oct. 11, 2022, entitled METHODS AND SYSTEMS FOR GENERATING INTERACTIVE MAPPING DIS-PLAYS IN CONJUNCTION WITH USER INTERFACE DEVICES; U.S. Pat. No. 11,474,275, issued Oct. 18, 2022, entitled OMNI-INDUCER TRANSMITTING DEVICES AND METHODS; U.S. Pat. No. 11,474,276, issued Oct. 18, 2022, entitled SYSTEMS AND METHODS FOR UTILITY LOCATING IN A MULTI-UTILITY ENVIRONMENT; U.S. Pat. No. 11,476,539, issued Oct. 18, 2022, entitled MODULAR BATTERY PACK APPARATUS, SYSTEMS, AND METHODS INCLUDING VIRAL DATA AND/OR CODE TRANSFER; U.S. Provisional Patent Application 63/380,375, filed Oct. 20, 2022, entitled LINKED CABLE-HANDLING AND CABLE-STORAGE DRUM DEVICES AND SYSTEMS FOR THE COORDINATED MOVE-MENT OF A PUSH-CABLE; and U.S. Pat. No. 11,528,401, issued Dec. 13, 2022, entitled PIPE INSPECTION SYS-TEMS WITH SELF-GROUNDING PORTABLE CAM-ERA CONTROLLERS. The content of each of the above-described patents and applications is incorporated by reference herein in its entirety. The above applications may be collectively denoted herein as the "co-assigned applica-tions" or "incorporated applications."

The following exemplary embodiments are provided for the purpose of illustrating examples of various aspects, details, and functions of apparatus and systems; however, the described embodiments are not intended to be in any way limiting. It will be apparent to one of ordinary skill in the art that various aspects may be implemented in other embodi-ments within the spirit and scope of the present disclosure.

It is noted that as used herein, various implementations of the disclosed elements, apparatus, devices, and systems may be referred to as embodiments. It is further noted that as used herein the term, "exemplary" means "serving as an example, instance, or illustration." Any aspect, detail, function, imple-mentation, and/or embodiment described herein as "exem-plary" is not necessarily to be construed as preferred or advantageous over other aspects and/or embodiments unless explicitly described as such. The embodiments herein are described for illustrative purposes and are not intended to be exhaustive, exclusive, or limiting of the scope of the present invention, but rather are provided as examples to allow one of ordinary skill in the art to practice various aspects and implementations of the invention. Likewise, other descriptions of details, elements, modules, components or other aspects described herein should not be considered limited or exclusive of the invention unless explicitly described as such.

Terminology

The modular battery system embodiments of the present disclosure may include a "host device" referring to any tool, instrument, or other device that may mate or be used with an interchangeable battery interface apparatus embodiment as disclosed herein in adapting the host device to be powered by one or more different batteries or types of batteries. The disclosure describes a variety of different host devices used in various utility locating system tools/devices (e.g., utility locator devices, utility locating transmitters, GNSS back-pack devices, and rangefinder devices) and pipe inspection/cleaning systems (cable-reel, wireless communication relay node, and camera control unit). It should be noted that the modular battery systems and interchangeable battery inter-face apparatus embodiments of the present disclosure are not so limited to just those devices and applications described herein, but may also be employed in various other tools, instruments, powered equipment, or other devices or sys-tems.

The "utility locator device" embodiments of the present disclosure may, for instance, be portable so as to be carried by a user traversing an area, or alternatively may be attached to a vehicle or other structure and moved about the locate area, to measure magnetic signals in order to determine the positions of and map utility lines which may generally be buried underground. In some uses, a "utility locating trans-mitter" may be used to generate current to be coupled onto one or more utility lines for the purpose of generating electromagnetic signals resulting from current flow there-from, with the electromagnetic field signals then sensed by utility locator devices in order to determine the position, depth, or other information about the utility and/or to map or otherwise identify or mark utility lines and their character-istics.

The "GNSS backpack" embodiments of the present dis-closure may include one or more global navigation satellite systems (GNSS) and associated antennas to receive satellite navigation signals in determining geolocation which may further refine the geolocation of an associated utility locator device data in determining positions and/or mapping utility line(s). The "the rangefinder apparatuses" of the present disclosure may include one or more lasers in determining distances for utility locating system devices. Such rangefinder apparatuses may be either stand-alone devices or built into a utility locator device. Additional details about various utility locator devices, utility locating transmitters, GNSS backpacks, and rangefinder apparatus device embodi-ments may be found in the patents and patent applications incorporated by reference herein.

The "cable-reel" embodiments of the present disclosure may be used to store and dispense push-cable having one or more attached cameras and/or cleaning apparatuses into a pipe or other void. In some embodiments, an interchange-able battery interface apparatus may couple to a "relay node" further coupled to the cable-reel. Such a "relay node" may wirelessly communicate data including but not limited to images/video from the inspection camera with one or more wirelessly connected devices (e.g., computer, smart phone, tablet, or the like).

The "camera control unit (CCU)" embodiments of the present disclosure may be used to display and/or store inspection video/images from the inspection camera as well as control aspects of the inspection camera and/or cleaning tool and/or aspects of the cable-reel and/or other wirelessly or wired connected devices of the pipe inspection/cleaning system.

As used herein, the term "interface geometry" generally refers to the size and shape of the element or elements for coupling or mating a battery or batteries and an interchangeable battery interface apparatus. For instance, such "interface geometries" on batteries and interchangeable battery interface apparatuses may be or include the shape, topography, geometry, or like elements at surfaces in keying, snapping or mating together, or otherwise mechanically adjoining and securing or un-securing the battery or batteries and interchangeable battery interface apparatus when in use. Further, the "interface geometries" of batteries and interchangeable battery interface apparatuses may include the physical location, size, shape alignment, and/or other characteristics of electrical contacts such that when mechanically coupled together, the electrical contacts of the battery or batteries and the electrical contacts on an associated interchangeable battery interface apparatus align and provide high quality electrical signal and/or power pathway(s) between the two. In some embodiments, other parameters or elements, such as optical signal connections, switches, or other devices or functions may also be included or implemented as part of the interface geometry between batteries and interchangeable battery interface apparatus.

It should be noted that some of the different batteries described herein include interface geometries that are the same or substantially the same (e.g., similar enough to allow interchangeability). In such instances, the various different batteries with the same or similar interface geometries may be referred to herein as having the same "battery type" despite differences in manufacturer, battery chemistry, size, or other properties. As used herein with respect to batteries and associated apparatus for coupling the battery to a particular device or system, "mating" and configurations for "mating" refer to the ability to operationally couple a battery to the associated device to power the device and/or to provide signaling and/or data to or from the powered device via the battery or other tool or electronics device or system, such as a utility locator, utility locator transmitter, camera control unit (CCU), or other tool or device as described or referenced herein. Mating configuration refers to the associated structure, shape, size, mechanical coupling mechanisms, electrical coupling mechanisms, contact configurations, and the like for providing attachable and detachable mechanical and electrical operational coupling between the battery and powered device or system. In some embodiments coupling or mating configuration may also include additional functions such as optical connections, switch connections, or other shared functions or interface connections.

The various interchangeable battery interface apparatus embodiments of the present disclosure may include a "battery-specific adapter" or "battery-specific adapter element" having a specific interface geometry, referred to as "battery-specific interface," configured for a specific battery/batteries or battery type. In some interchangeable battery interface apparatus and modular battery system embodiments, only the battery-specific adapter may need to be exchanged in adapting a host device to a different battery/batteries or battery type. In other interchangeable battery interface apparatus and modular battery system embodiments, the entire interchangeable battery interface apparatus may be swapped out in adapting a host device for use with a different battery/batteries or battery type.

Example Modular Battery System and Interchangeable Battery Interface Apparatus Embodiments Referring to FIG. 1, various different exemplary commercially available rechargeable batteries 100a, 100b, 100c, 100d, 100e and 100f are illustrated. These may be used in, for example, powering tools, instruments, electronic equipment, or other host devices via an interchangeable battery interface apparatus that may be attachable and/or detachable. The battery interface apparatus may be part of a modular battery system in accordance with aspects of the present disclosure.

As illustrated, in one example configuration the battery 100a may be a Lucid™ battery commercially available from SeeScan™ Inc, assignee of the instant application. The battery 100a may include an interface geometry 110a specifically configured to couple with one or more SeeScan™ branded tools such as those known for use in pipe inspection and cleaning and/or utility locating and mapping (e.g., a pipe inspection/cleaning system 610 and/or a utility locating system 640 of FIG. 6). The battery 100a may be or share aspects with the battery embodiments disclosed in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER and/or other battery embodiments of the incorporated patents and applications or batteries made by other manufacturers.

Further illustrated in FIG. 1, the battery 100b may be a commercially available rechargeable battery from Makita™ Inc. that may include an interface geometry 110b configured to couple with one or more Makita™ branded tools, the battery 100c may be a commercially available rechargeable battery from Ridgid™ Inc. that may include an interface geometry 110c configured to couple with one or more Ridgid™ branded tools, the battery 100d may be a commercially available rechargeable battery from DeWalt™ Tools that may include an interface geometry 110d configured to couple with one or more DeWalt™ branded tools, the battery 100e may be a commercially available rechargeable battery from Milwaukee™ Tool that may include an interface geometry 110e configured to couple with one or more Milwaukee™ Tool branded tools, and the battery 100f may be a commercially available rechargeable battery from the Bosch™ Tool Company that may include an interface geometry 110e configured to couple with one or more Bosch™ branded tools.

It should be noted that, as each of the batteries 100a, 100b, 100c, 100d, 100e and 100f may have a unique interface geometry (e.g., interface geometries 110a, 110b, 110c, 110d, 110e and 110f respectively). These geometries may not be interchangeable. For example, each battery 100a, 100b, 100c, 100d, 100e and 100f may, without an interchangeable battery interface apparatus and modular battery system in accordance with aspects of the present disclosure, be incompatible with tools or devices provided by other manufacturers.

For instance, the SeeScan™ branded battery 100a used primarily in pipe inspection and cleaning (e.g., a pipe inspection/cleaning system 610) and/or utility locating and mapping (e.g., a utility locating system 640 of FIG. 6) may not functionally interconnect with the battery 100d, 110e, or 110f that may be used with cordless drills, reciprocal saws, and/or other tools that may be used in repairing damaged pipes inspected and located by SeeScan™ branded tools. In practice, this can require a worker to own multiple different batteries to power different tool sets so as to accomplish a single task.

It should further be noted that, though some differences may be present in the interface geometry of the various batteries described, some batteries may still couple to the tools or other host devices of the other manufacturers. For instance, the interface geometry 110a of SeeScan™ battery 100a, the interface geometry 110b of the Makita™ battery 100b, and the interface geometry 110c of the Ridgid™ battery 100c may be similar enough such that they may couple and be used to power the tools or other host devices of the other manufacturers. Having substantially similar enough interface geometries that they may couple and be used to power the tools or other host devices of the other manufacturers, the batteries 100a, 110b, and 100c may, in some embodiments, all be made to couple with the same interchangeable battery interface apparatus embodiments (e.g., the interchangeable battery interface apparatus 200a of FIGS. 2A and 2B). It should also be noted that other manufacturers may make batteries for other branded tools commonly referred to as "after-market batteries." Such after-market batteries may likewise be used with various compatible interchangeable battery interface apparatus embodiments of the present disclosure.

Referring still to FIG. 1, the interface geometries of each battery (e.g., the interface geometry 110a of battery 100a, the interface geometry 110b of battery 100b, the interface geometry 110c of battery 100c, the interface geometry 110d of battery 100d, the interface geometry 110e of battery 100e, and the interface geometry 110f of battery 100f) may be formed to mechanically and electrically couple with a tool or set of tools made by each manufacturer. For instance, each interface geometry 110a, 110b, 110c, 110d, 110e and 110f may each include a number of electrical contacts (e.g., contacts 112a, 112b, 112c, 112d, 112e and 112f) for providing electrical pathways between the respective battery 100a, 100b, 100c, 100d, 100e and 100f and a tool or other host device.

In some embodiments, the contacts (e.g., contacts 112a, 112b, 112c, 112d, 112e and 112f) may further exchange data between the battery and host device (e.g., viral data and/or code transfer with associated electronics which may be included in the SeeScan™ battery 100a). Likewise, such a viral-like scheme and associated electronics to communicate data and/or transfer code may occur between interchangeable battery interface apparatus and modular battery system in accordance with aspects of the present disclosure.

It should also be noted that though the rechargeable batteries 100a, 100b, 100c, 100d, 100e and 100f illustrated in FIG. 1 are of the variety used in various cordless power tools, the interchangeable battery interface apparatus embodiments and modular battery system embodiments of the present disclosure may be configured for use with other types of batteries with other interface geometries as used in other tools, instruments, and devices for other applications beyond the genre of cordless power tools.

Figure 2A:
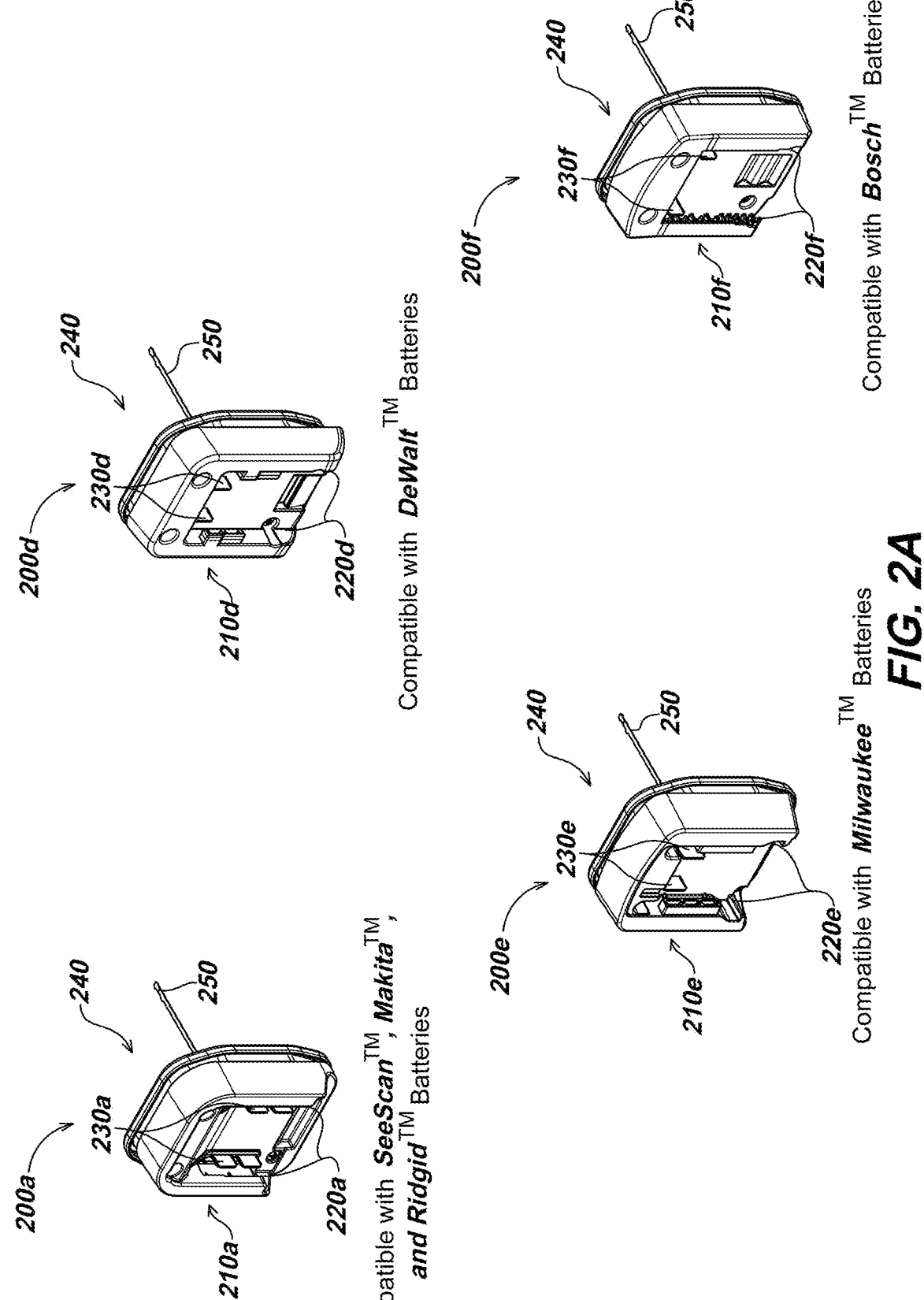
FIG. 2A is an isometric view of interchangeable battery interface apparatus embodiments configured for use with different battery types.
Figure 2B:
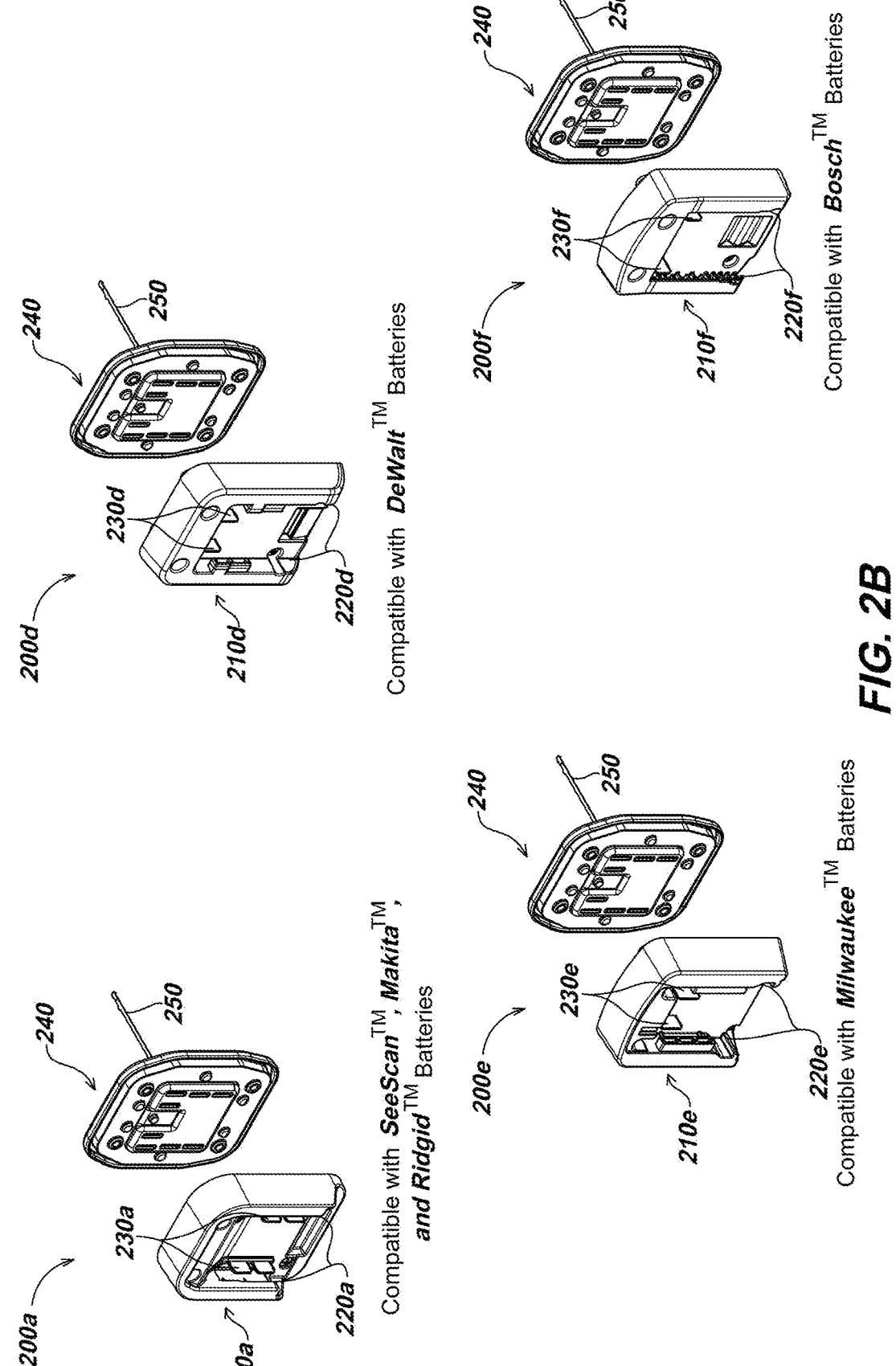
FIG. 2B is a partially exploded view of the interchangeable battery interface apparatus embodiments of FIG. 2A separating battery-specific adapters from the base subassemblies.

Turning to FIGS. 2A and 2B, a number of interchangeable battery interface apparatus embodiments are illustrated. Exemplary embodiments of interface apparatus such as shown in FIGS. 2A and 2B include a base assembly configured to electrically and mechanically operationally couple to a host device on one side or end of the apparatus and a battery specific adapter element to electrically and mechanically coupled to a specific rechargeable battery type that is typically incompatible with directly coupling to the host device (e.g., if they devices are from different manufactures, or of different models or otherwise incompatible, such as due to different voltages, currents, or other parameters). Put another way, the specific battery adapter element in combination with a base assembly may be used to provide a mechanical and electrical interface between hosts configured to use a battery of a host-specific type and batteries of different types.

Various interface apparatus embodiments may be used in different modular battery system embodiments of the present disclosure between a host device and different rechargeable batteries (e.g., battery 100a, 100b, 100c, 100d, 100e, or 100f of FIG. 1). As illustrated in FIGS. 2A and 2B, an interchangeable battery interface apparatus 200a may be configured to mate with the SeeScan™ battery 100a of FIG. 1, the Makita™ battery 100b of FIG. 1, and the Ridgid™ battery 100c. Further illustrated in FIGS. 2A and 2B, an interchangeable battery interface apparatus 200d may be configured to mate with the DeWalt™ battery 100d of FIG. 1, an interchangeable battery interface apparatus 200e may be configured to mate with the Milwaukee™ battery 100e of FIG. 1, and an interchangeable battery interface apparatus 200f may be configured to mate with the Bosch™ battery 100f of FIG. 1. The interface apparatus allows various types of different batteries to mate with various types of host devices. In typical embodiments the interface apparatus allows batteries of one manufacturer to mate with host devices of other manufacturers so as to reduce the need for carrying multiple batteries for each different type of host device. Other applications, such as allowing batteries with different power storage capacity, current levels, and the like to interface with various host devices are also supported by various embodiments disclosed herein.

Each interchangeable battery interface apparatus embodiment 200a, 200d, 200e, and 200f may include a battery-specific adapter element (e.g., battery-specific adapter 210a, 210d, 210e, and 210f) having a battery-specific interface (e.g., battery-specific interface 220a, 220d, 220e, and 220f) formed to mate with and mechanically and electrically couple with a specific battery type. For instance, the interchangeable battery interface apparatus 200a may include a battery-specific adapter 210a which may further include a battery-specific interface 220a formed to mate and mechanically couple with the SeeScan™ battery 100a, the Makita™ battery 100b, or the Ridgid™ battery 100c of FIG. 1. Likewise, the interchangeable battery interface apparatus embodiment 200d may include a battery-specific adapter 210d which may further include a battery-specific interface 220d formed to mate and mechanically and electrically couple with the DeWalt™ battery 100d of FIG. 1, the interchangeable battery interface apparatus 200e may include a battery-specific adapter 210e which may further include a battery-specific interface 220e formed to mate and mechanically and electrically couple with the Milwaukee™ battery 100e of FIG. 1, and the interchangeable battery interface apparatus 200f may include a battery-specific adapter 210f which may further include a battery-specific interface 220f formed to mate and mechanically and electrically couple with the Bosch™ battery 100f of FIG. 1.

Still referring to FIGS. 2A and 2B, each battery-specific adapter embodiment (e.g., battery-specific adapter 210a, 210d, 210e, and 210f) may further include a contact element having one or more electrically conductive contacts (e.g., contacts 230a, 230d, 230e, and 230f) that may extend through the battery-specific interface (e.g., battery-specific interface 220a, 220d, 220e, and 220f) and are aligned so as to connect with the electrical contacts on respective batteries in communicating electric current for powering a host device and/or, in some embodiments, the exchange of data. For instance, in mechanically coupling the SeeScan™ battery 100a, the Makita™ battery 100b, or the Ridgid™ battery 100c of FIG. 1 to the battery-specific adapter 210a of the interchangeable battery interface apparatus 200a, the contacts 112a, 112b, or 112c (FIG. 1) of the respective battery 100a, 100b, or 100c may contact the contacts 230a of the interchangeable battery interface apparatus 200a. Electrical and mechanical contacts and mating elements on the battery-specific adapter embodiment may be shaped, sized, and positioned to functionally match those of the corresponding battery.

Likewise, in mechanically coupling the DeWalt™ battery 100d of FIG. 1 to the battery-specific adapter 210d of the interchangeable battery interface apparatus 200d the contacts 112d of the battery 100d may contact the contacts 230d of the interchangeable battery interface apparatus embodiment 200d, in mechanically coupling the Milwaukee™ battery 100e of FIG. 1 to the battery-specific adapter 210e of the interchangeable battery interface apparatus 200e the contacts 112e of the battery 100e may contact the contacts 230e of the interchangeable battery interface apparatus 200e, and in mechanically coupling the Bosch™ battery 100f of FIG. 1 to the battery-specific adapter 210f of the interchangeable battery interface apparatus 200f the contacts 112f of the battery 100f may connect with the contacts 230f of the interchangeable battery interface apparatus 200f. Electrical and mechanical contacts and mating elements on the battery interface apparatus may be shaped, sized, and positioned to functionally match those of the corresponding battery.

As best illustrated in FIG. 2B, each interchangeable battery interface apparatus embodiment 200a, 200d, 200e, and 200f may further include a base subassembly 240 that may couple with the respective ones of the battery-specific adapters 210a, 210d, 210e, and 210f. The base subassembly 240 may, in some embodiments, be the same in all interchangeable battery interface apparatus embodiments 200a, 200d, 200e, and 200f. Each base subassembly 240 of FIG. 2B may mechanically couple (e.g., via screws, bolts, snaps, or the like), as well as electrically couple via a connector 250 (e.g., a flexible circuit board (FCB), flexible flat cables, wires, or the like for establishing electrical pathways) to a host device in communicating electrical current for powering and optionally exchanging data between the host device, battery or batteries, and/or the interchangeable battery interface apparatus. In some embodiments, a base subassembly, such as the base subassembly 240 may be built into a host device (e.g., the wireless pipe inspection video transmission apparatus 730 in the cable-reel 720 of FIG. 7C, the CCU 830 of FIG. 8C, the utility locator device 950 of FIG. 9C, the utility locating transmitter 1060 of FIG. 10C, the GNSS backpack 1170 of FIG. 11, and the rangefinder apparatus 1280 of FIG. 12). Electrical and mechanical contacts and mating elements on base subassembly embodiments may be shaped, sized, and positioned to functionally match those of the corresponding battery and/or host device.

Referring to FIGS. 2A and 2B, it should be noted that in some modular battery system embodiments employing interchangeable battery interface apparatus embodiments in accordance with aspects of the present disclosure, as well as one or more batteries and a host device configured to connect with the interchangeable battery interface apparatus embodiments, the base subassembly (e.g., the base subassembly 240) may be the same in various interchangeable battery interface apparatuses (e.g., interchangeable battery interface apparatuses 200a, 200d, 200e, and 200f) such that only the battery-specific adapters (e.g., battery-specific adapters 210a, 210d, 210e, and 210f) may be swapped out to adapt the interchangeable battery interface apparatus (e.g., interchangeable battery interface apparatus 200a, 200d, 200e, and 200f) for use with a different battery type (e.g., battery 100a, battery 100b, battery 100c, battery 100d, battery 100e, or battery 100f of FIG. 1).

Figure 7A:
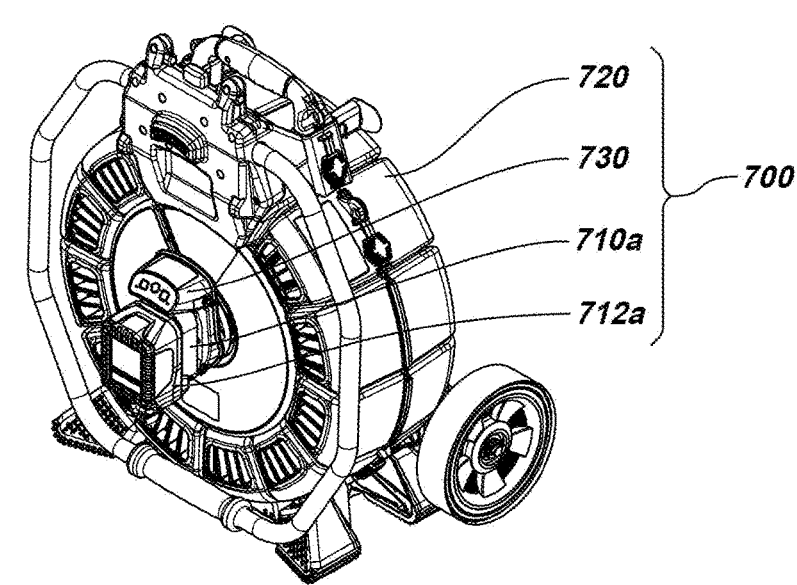
FIG. 7A is an isometric view of a modular battery system embodiment including an interchangeable battery interface apparatus embodiment employed in a cable-reel.
Figure 7B:
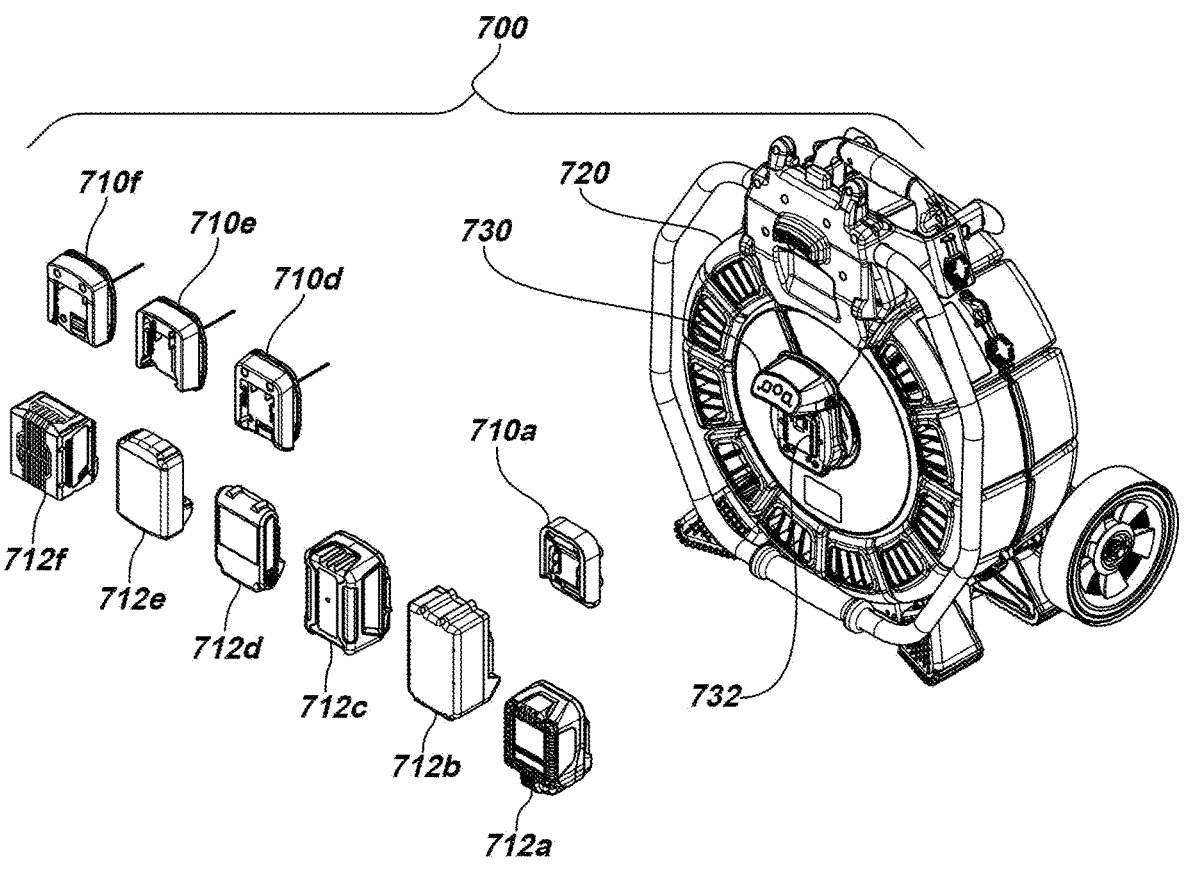
FIG. 7B is a partially exploded view of the modular battery system embodiment of FIG. 7A with various different interchangeable battery interface apparatus embodiments, battery embodiments, and the cable-reel separated.
Figure 7C:
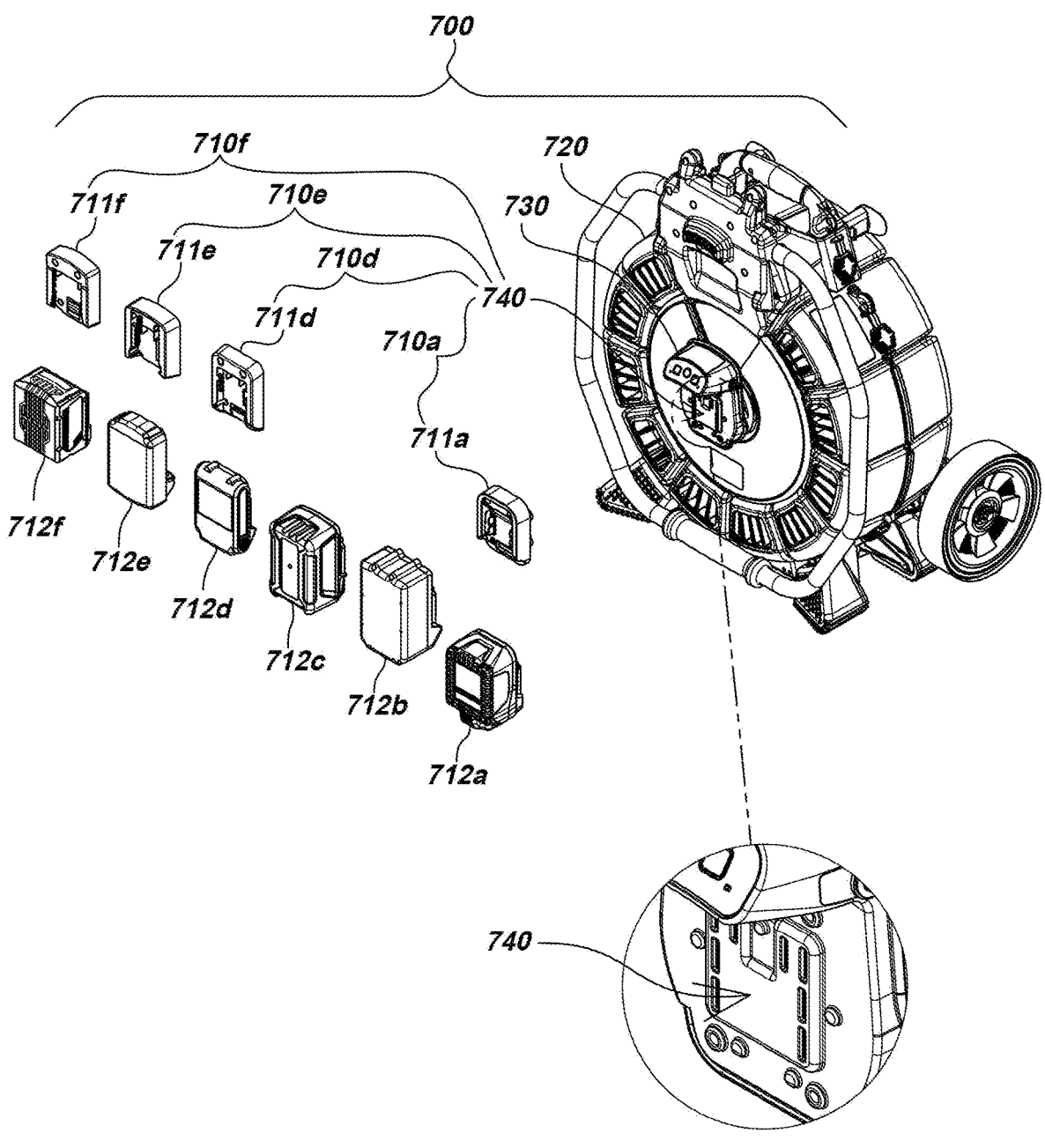
FIG. 7C is a partially exploded view of the modular battery system embodiment including an interchangeable battery interface apparatus embodiment partially built into a cable-reel.
Figure 8A:
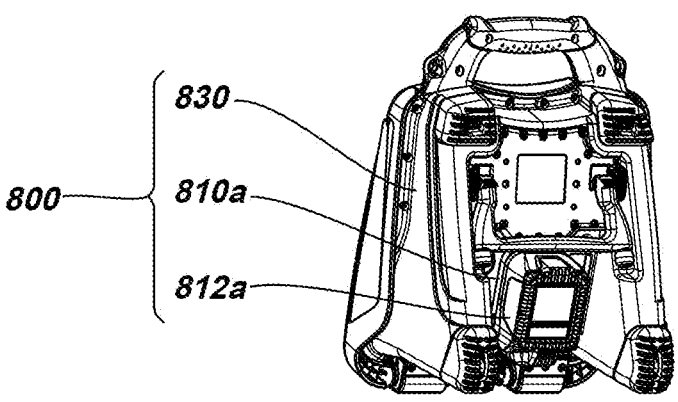
FIG. 8A is an isometric view of a modular battery system embodiments including an interchangeable battery interface apparatus embodiment employed in a CCU.
Figure 8B:
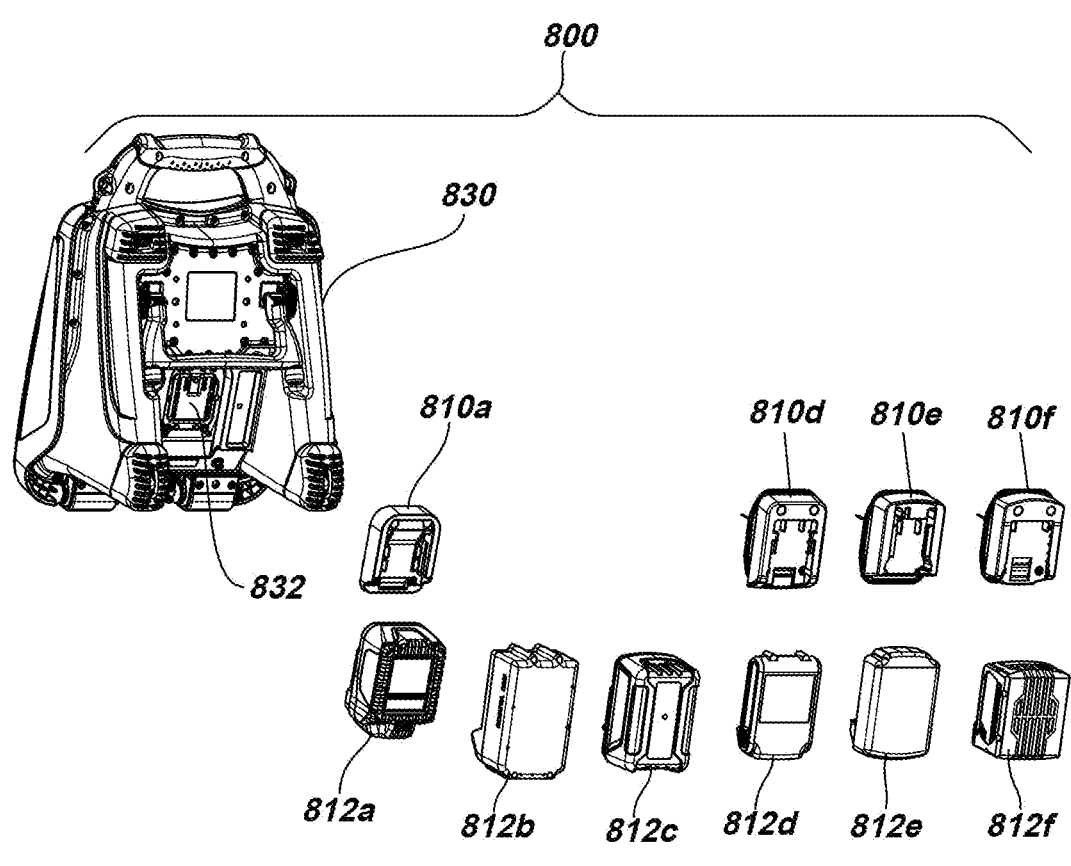
FIG. 8B is a partially exploded view of the modular battery system embodiment of FIG. 8A with various different interchangeable battery interface apparatus embodiments, battery embodiments, and the CCU separated.
Figure 8C:
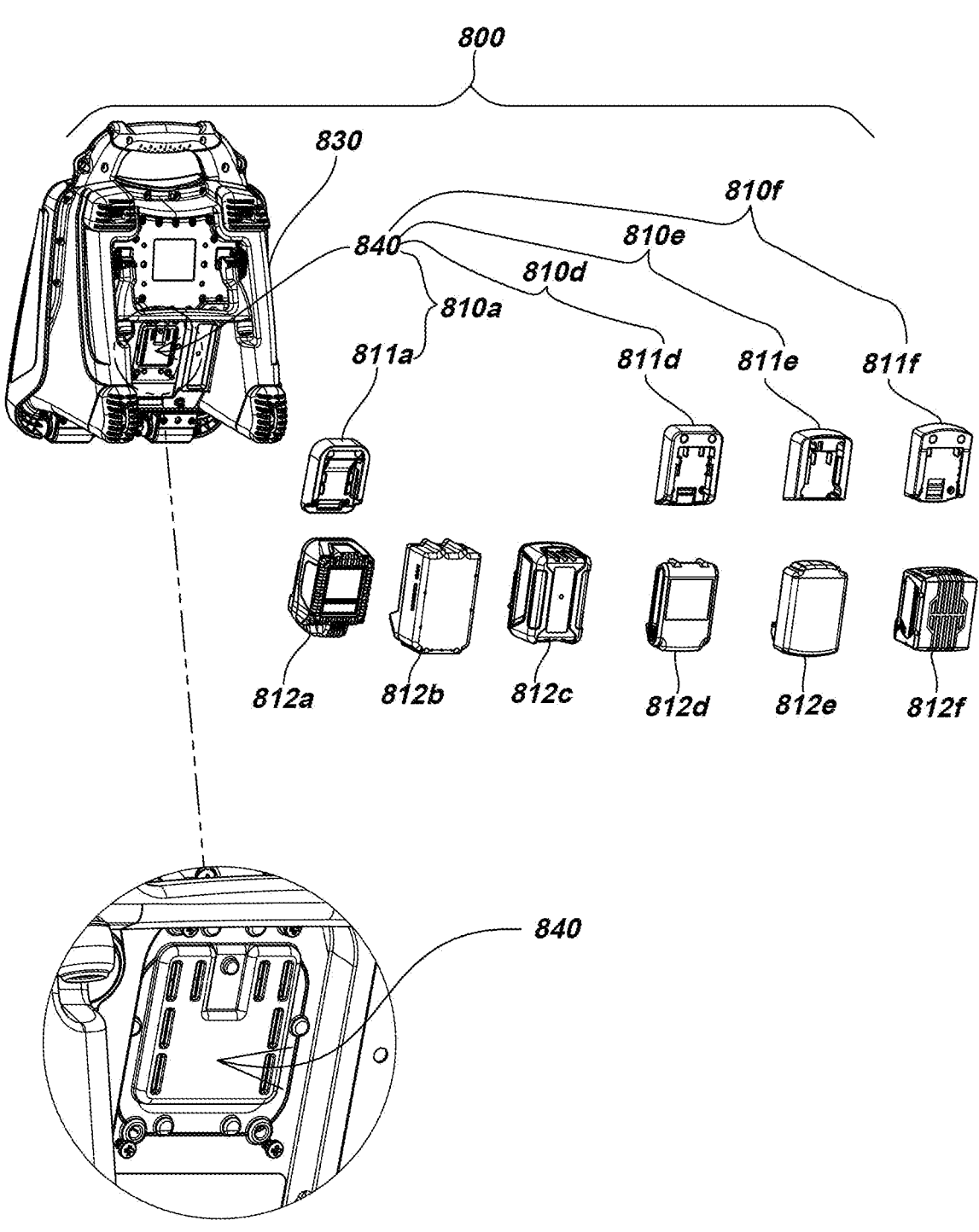
FIG. 8C is a partially exploded view of the modular battery system embodiment including an interchangeable battery interface apparatus embodiment partially built into a CCU.
Figure 9A:
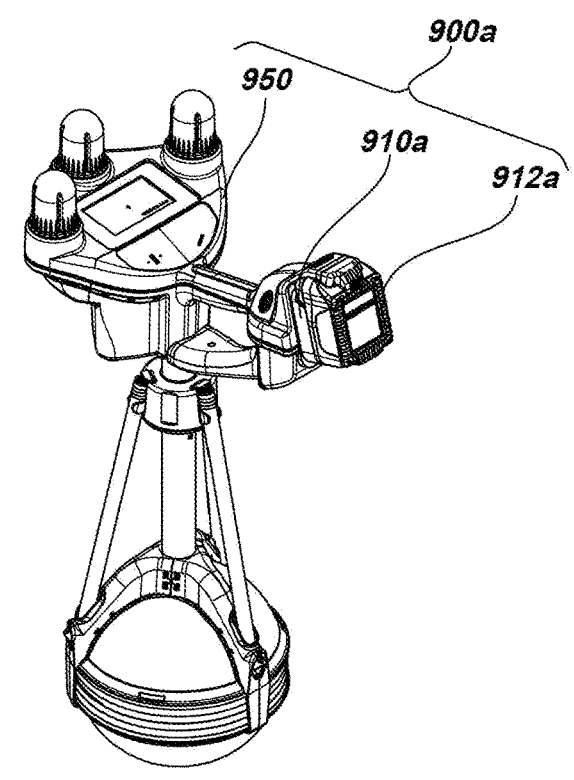
FIG. 9A is an isometric view of a modular battery system embodiment including an interchangeable battery interface apparatus embodiment employed in a utility locator device.
Figure 9B:
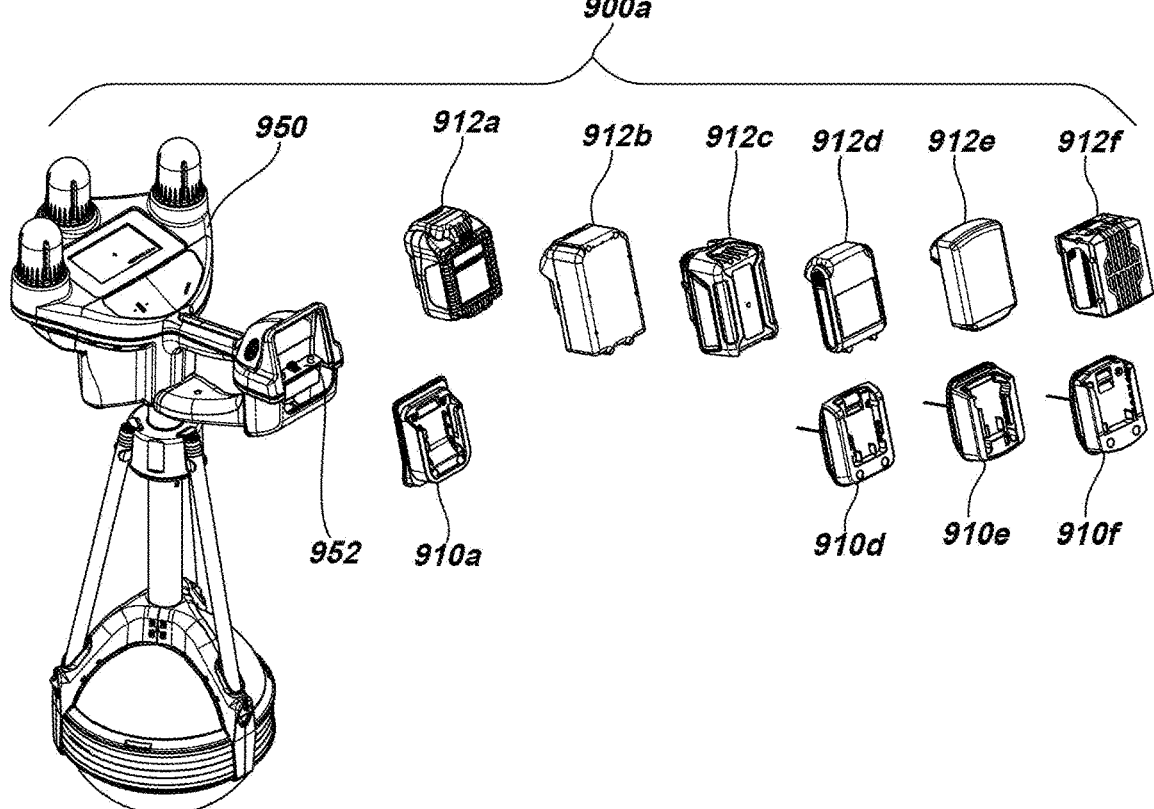
FIG. 9B is a partially exploded view of the modular battery system embodiment of FIG. 9A with various different interchangeable battery interface apparatus embodiments, battery embodiments, and the utility locator device separated.
Figure 9C:
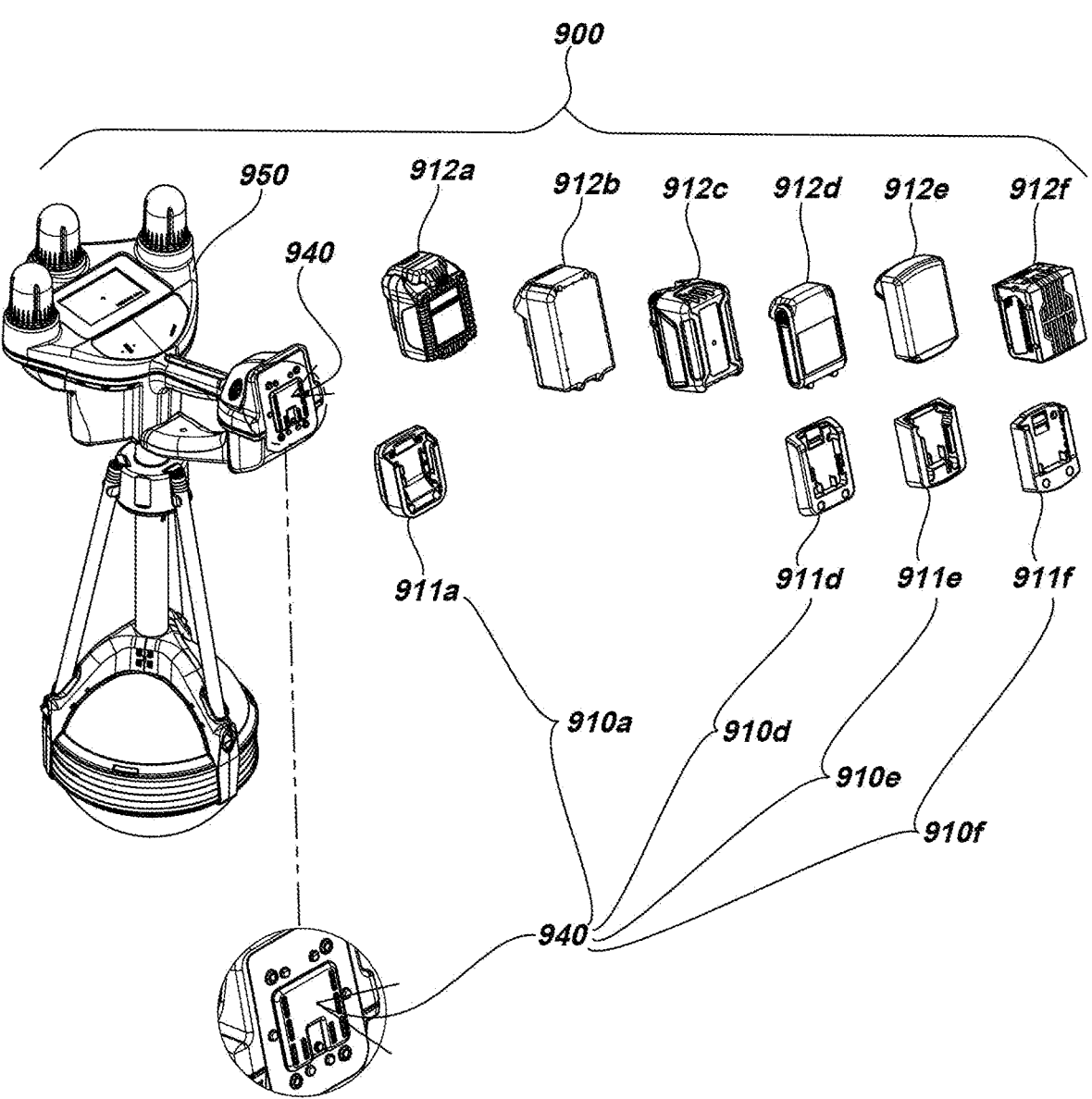
FIG. 9C is a partially exploded view of the modular battery system embodiment including an interchangeable battery interface apparatus embodiment partially built into a utility locator device.
Figures 10A, 10B:
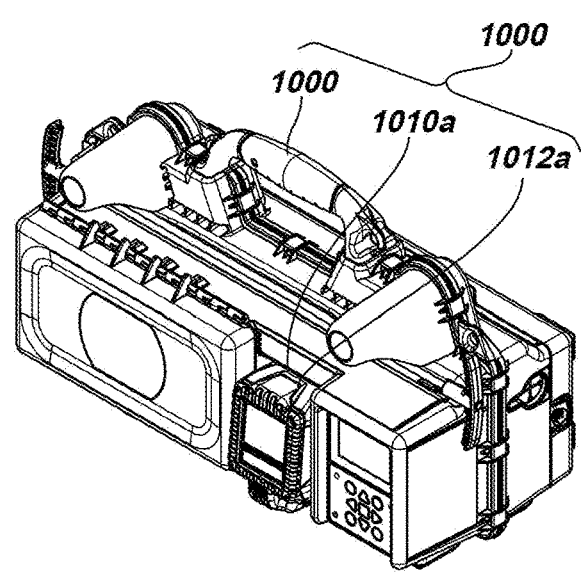
FIG. 10A is an isometric view of a modular battery system embodiment including an interchangeable battery interface apparatus embodiment employed in a utility locating transmitter.
FIG. 10B is a partially exploded view of the modular battery system embodiment of FIG. 10A with various different interchangeable battery interface apparatus embodiments, battery embodiments, and the utility locating transmitter separated.
Figure 10C:
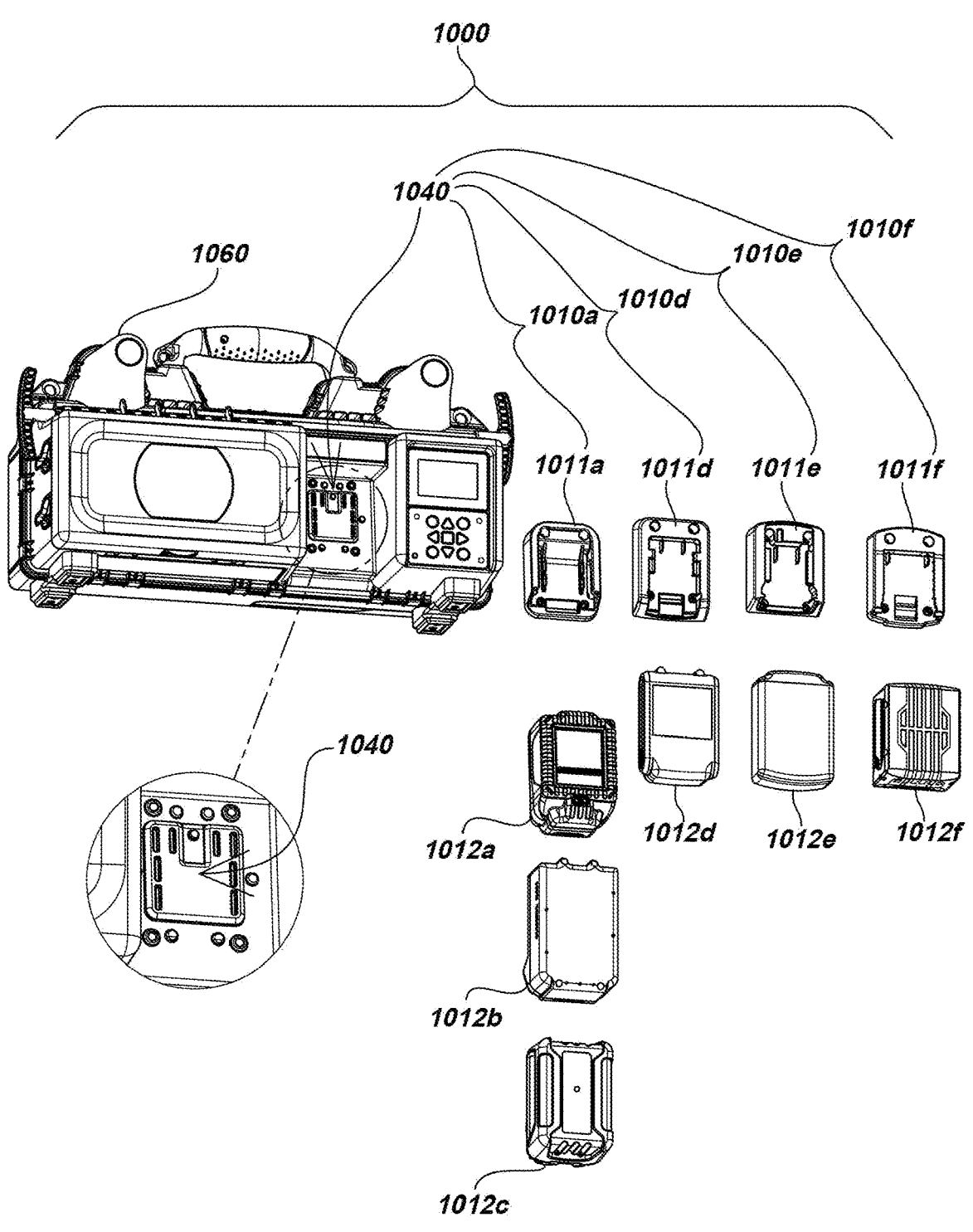
FIG. 10C is a partially exploded view of the modular battery system embodiment including an interchangeable battery interface apparatus partially embodiment built into utility locating transmitter.

In some such embodiments having a base subassembly built into the host device (e.g., the wireless pipe inspection video transmission apparatus 730 in the cable-reel 720 of FIG. 7C, the CCU 830 of FIG. 8C, the utility locator device 950 of FIG. 9C, the utility locating transmitter 1060 of FIG. 10C, the GNSS backpack 1170 of FIG. 11, and the rangefinder apparatus 1280 of FIG. 12), only the battery-specific adapters (e.g., battery-specific adapters 210a, 210d, 210e, and 210f) may be swapped out to adapt the interchangeable battery interface apparatus (e.g., interchangeable battery interface apparatus 200a, 200d, 200e, and 200f) for use with a different battery type (e.g., battery 100a, battery 100b, battery 100c, battery 100d, battery 100e, or battery 100f of FIG. 1). In other modular battery system embodiments in accordance with aspects of the present disclosure, the entirety of the interchangeable battery interface apparatus (e.g., interchangeable battery interface apparatus 200a, 200d, 200e, and 200f) may be swapped out to adapt a host device with a different battery type (e.g., battery 100a, battery 100b, battery 100c, battery 100d, battery 100e, or battery 100f of FIG. 1).

Figure 3:
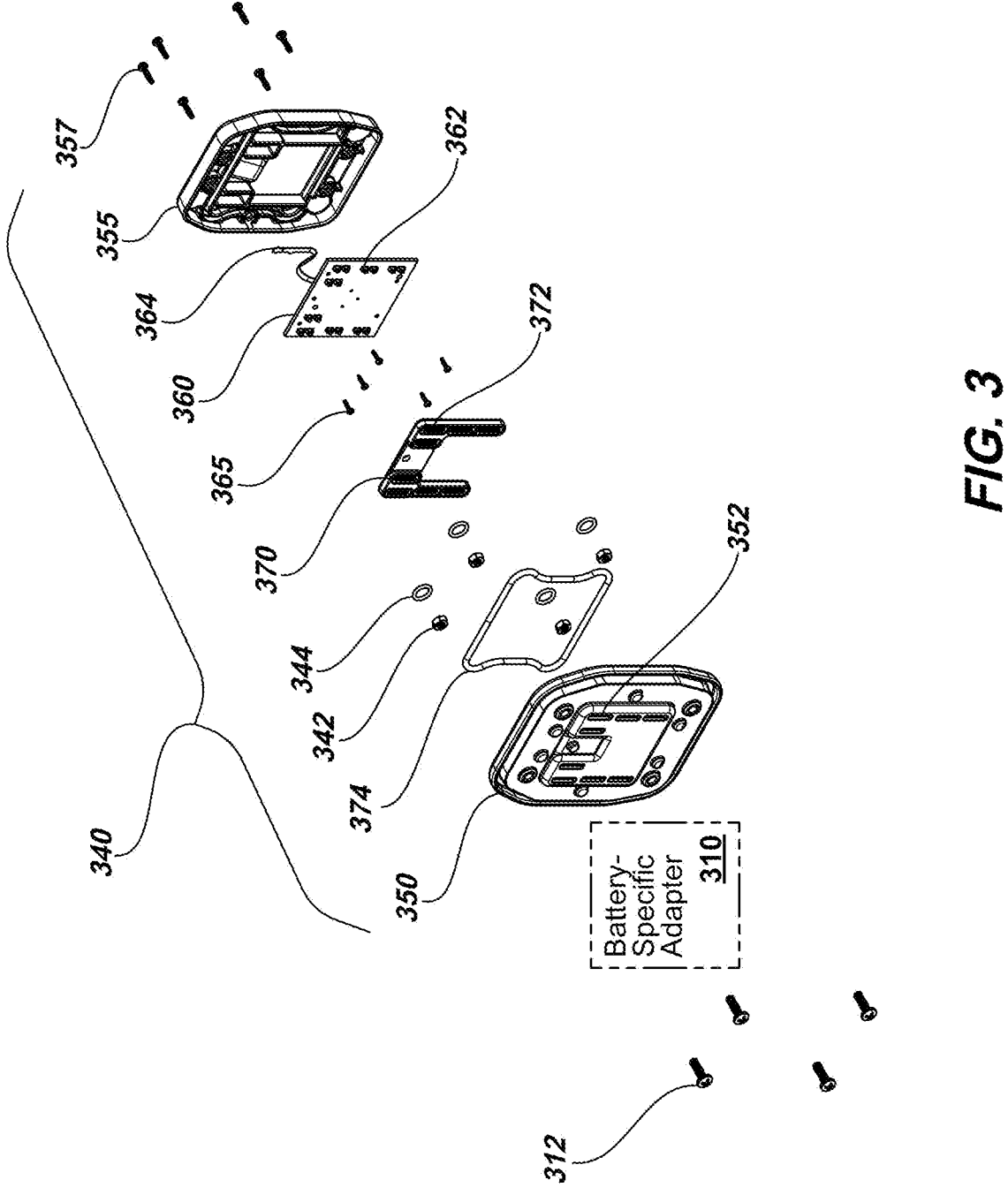
FIG. 3 is an exploded view of a base subassembly embodiment that may mate with one of various different battery-specific adapters embodiment.

Turning to FIG. 3, a base subassembly embodiment 340 is illustrated which may be or share aspects with the base subassembly 240 of FIGS. 2A and 2B that may be configured for use with a plurality of different battery-specific adapters, such as the battery-specific adapter 310. The battery-specific adapter 310, which may be or share aspects with the battery-specific adapters 210a, 210d, 210e, and 210f or other adapters for use with other battery types, may couple to the base subassembly 340. For instance, a number of bolts 312 may mate to nuts 342 in the base subassembly 340 in coupling the battery-specific adapter 310 to the base subassembly 340. Optionally, one or more O-rings 344 may be included in the base subassembly 340 to prevent the ingress of water or other environmental contaminants.

Still referring to FIG. 3, the base subassembly embodiment 340 may include a front housing element 350 and a rear housing element 355 that, in assembly, may mate together and house a PCB 360 securing together via bolts 357. A connector 364 (e.g., FCB or the like) may couple to the PCB 360 and, in assembly, further connect with a host device in establishing electrical pathways. The connector 364 may be used to communicate data with a host device (e.g., battery charge or other status, security data to prevent use of stolen batteries, or other data) as well as provide pathways for the transmitting of electrical power.

Figure 4:
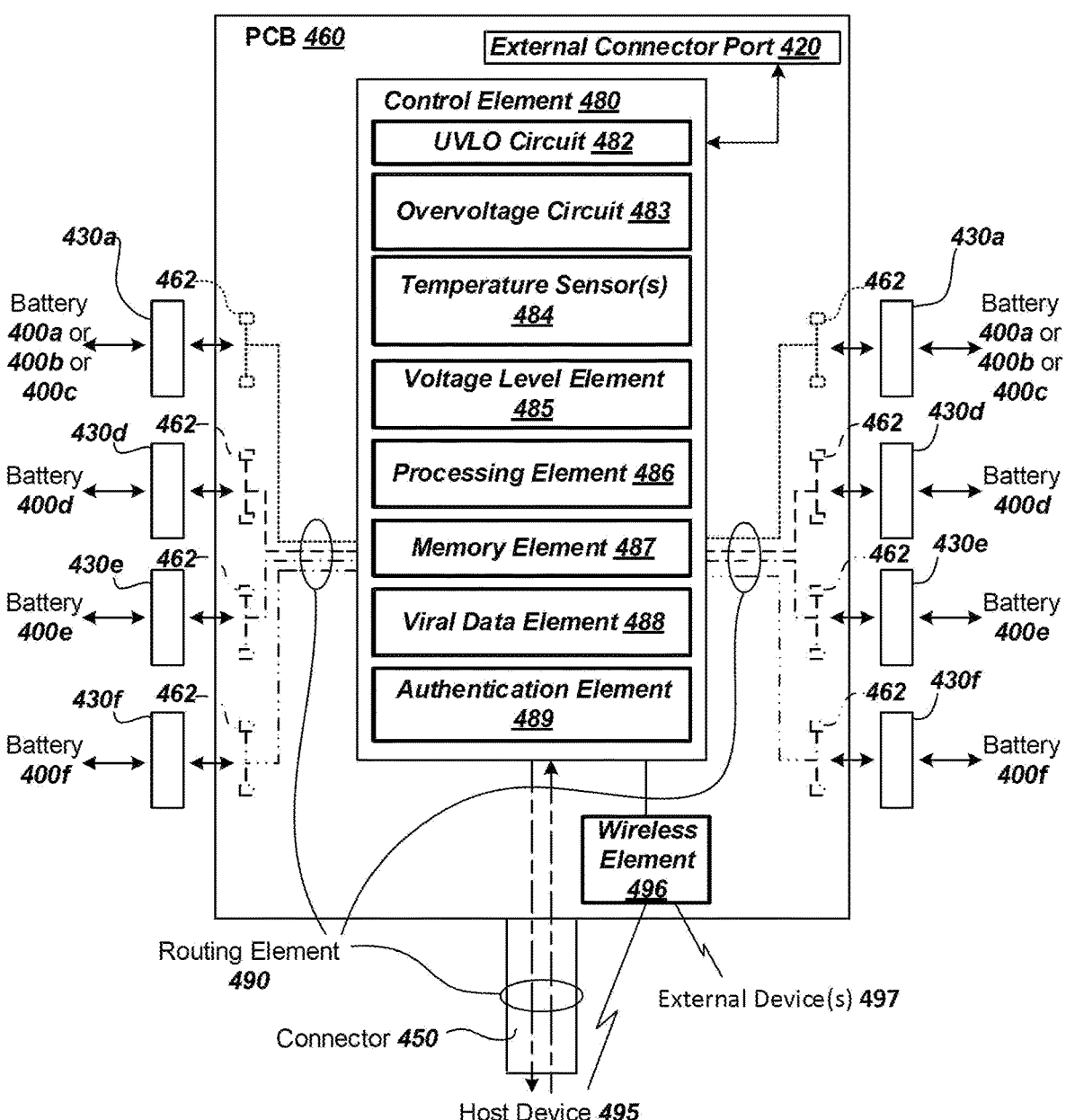
FIG. 4 is a diagram of a PCB embodiment which may be included in interchangeable battery interface apparatus embodiments.

In some embodiments, a wireless element embodiment (e.g., the wireless element 496 of FIG. 4 that may be or include one or more external devices via one or more Wi-Fi, Bluetooth, Bluetooth Low Energy (BLE), near-field communication (NFC) or like wireless communication apparatus or technologies) may be included wherein the wireless element may communicate data wirelessly with a host device, one or more batteries, a remote server, and/or one or more other devices (e.g., the host device 495 or the external device(s) 497).

The PCB 360 may secure to the rear housing element 355 via screws 365. Further illustrated, the front housing element 350 may include a series of slit features 352 through which electrical contacts on the battery-specific adapter 310 (e.g., the electrical contacts 230a on the battery-specific adapter 210a, the electrical contacts 230d on the battery-specific adapter 210d, the electrical contacts 230e on the battery-specific adapter 210e, or the electrical contacts 230f on the battery-specific adapter 210f illustrated in FIGS. 2A and 2B) may extend through the front housing element 350 and further couple to the PCB 360. It should be noted that various different positions of the slit features 352 may be present in the front housing element 350 so as to accommodate the different positions of electrical contact on different battery-specific adapters (e.g., the position of electrical contacts 230a on the battery-specific adapter 210a, the electrical contacts 230d on the battery-specific adapter 210d, the electrical contacts 230e on the battery-specific adapter 210e, or the electrical contacts 230f on the battery-specific adapter 210f illustrated in FIGS. 2A and 2B).

Still referring to FIG. 3, a sealing element embodiment 370 as well as an O-ring 374 may seat between the PCB 360 and front housing element 350 to prevent the ingress of water or other environmental contaminants. It should be noted that the base subassembly 340 may independently be sealed separately from the battery-specific adapter 310 or other battery-specific adapter element via the sealing element 370. The sealing element 370 may have a number of slit features 372 aligning with the slit features 352 on the front housing element 350 where electrical contacts may pass through in connecting with the PCB 360 via the connectors 362. The PCB 360 may include a routing element establishing electrical pathways between electrical contacts, a control element, and a host device (e.g., as disclosed with the routing element 490 of the PCB 460 in FIG. 4).

For instance, various different battery types may have differently positioned electrical contacts thus requiring the battery-specific adapter (e.g., the battery-specific adapter 220a, 220d, 220e, and 220f of FIGS. 2A and 2B) to have differently position electrical contacts (e.g., electrical contacts 230a, 230d, 230e, and 230f of FIGS. 2A and 2B) and further, require different electrical pathways (e.g., routing element 490 of FIG. 4). The PCB 360 may include a number of connectors 362 such that electrical contacts (e.g., electrical contacts 230a, 230d, 230e, and 230f of FIGS. 2A and 2B) may couple thereto in communicating electrical current. The various connectors 362 may include a selection of differently positioned electrical contacts (e.g., electrical contacts 230a, 230d, 230e, and 230f of FIGS. 2A and 2B) associated with different battery-specific adapters (e.g., battery-specific adapter 220a, 220d, 220e, and 220f).

The routing element may be or include traces on the PCB 360 ensuring electrical current is communicated to a control element (e.g., the control element 480 of FIG. 4), which may also be included on the PCB 360, and further to a host device. Such a control element may include circuitry for receiving input electrical current from the battery and output current for powering and/or exchanging data with of the host device and/or battery type.

For instance, the control element may include an undervoltage-lockout (UVLO) circuit to turn off the power of to a host device in the event of the voltage dropping below the operational value. Further, in some embodiments the control element may include circuitry configured to adjust input current for stepping up/down the voltage. One or more temperature sensors may be included to measure temperature which may further function to shut down the interchangeable battery interface apparatus if unsafe temperatures are measured. In some embodiments, the control element includes one or more processors and associated non-transitory memories for the exchange of data with the host device and/or rechargeable battery.

In some such embodiments, the exchanged data may include a viral-like scheme and associated electronics to communicate data and/or transfer code between batteries, host devices, and interchangeable battery interface apparatuses. For instance, the exchanged data may include data and/or code transferred via a viral-like scheme and associated electronics between batteries, host devices, and interchangeable battery interface apparatuses as described in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER of the incorporated patents and applications. In yet further embodiments, the processors and memories may be used to authenticate batteries coupled to the interchangeable battery interface apparatus. For instance, the authentication of batteries may be used to disable the interchangeable battery interface apparatus and therefore a connected host device for purpose of disallowing some battery types and/or as a security measure in case of theft.

In some embodiments, a base subassembly common to a plurality of battery-specific adapter elements, such as the base subassembly 340 of FIG. 3, may be built into the host (e.g., the wireless pipe inspection video transmission apparatus 730 in the cable-reel 720 of FIG. 7C, the CCU 830 of FIG. 8C, the utility locator device 950 of FIG. 9C, the utility locating transmitter 1060 of FIG. 10C, the GNSS backpack 1170 of FIG. 11, and the rangefinder apparatus 1280 of FIG. 12) such that different battery-specific adapter elements may all mate with the base subassembly in adapting an interchangeable battery interface apparatus embodiment for use with different battery types.

Turning to FIG. 4, a PCB embodiment 460 is illustrated which may be included, with the PCB embodiment including various elements, such as a circuit board and discrete passive and/or active electronic components, mechanical components, connectors, and the like disposed thereon, of an interchangeable battery interface apparatus in accordance with aspects of the present disclosure. In some interchangeable battery interface apparatus embodiments, the PCB 460 may be disposed in a base subassembly for coupling with a plurality of different battery-specific adapters (e.g., the base subassembly 240 of FIG. 2A or the base subassembly 340 of FIG. 3 and battery-specific adapters 210a, 210d, 210e, and 210f of FIG. 2B). For instance, the PCB 460 may be or share aspects with the PCB 360 of FIG. 3. The PCB 460 may include a control element 480 which may be or share aspects with the control element described with FIG. 2.

For instance, the control element 480 may include electronic circuitry for receiving input electrical current from the battery or batteries and output current for powering and/or exchanging data with the host device. The control element 480 may be or include an undervoltage-lockout (UVLO) circuit 482 to turn off the power of to a host device in the event of the voltage dropping below the operational value. Likewise, an overvoltage circuit 483 may optionally be included in the control element 480 to prevent excessive voltage reaching a connected host device. One or more temperature sensors 484 may optionally be included in the control element 480 to measure temperature which may further function to shut down the interchangeable battery interface apparatus (e.g., the interchangeable battery interface apparatus 200a, 200d, 200e, and 200f of FIGS. 2A and 2B) if unsafe temperatures are reached.

A voltage level element 485 may optionally be included in the control element 480 to step up or down voltage to ensure proper voltage at a connected host device. Further, the control element 480 may optionally include a processing element 486 having one or more processors and a memory element 487 having one or more non-transitory memories associated with the exchange of data with the host device and/or rechargeable battery as well as the storage of data. In some such embodiments, the exchanged data may include a viral-like scheme and associated electronics to communicate data and/or transfer code between batteries, host devices, and interchangeable battery interface apparatuses (e.g., the interchangeable battery interface apparatus 200*a*, 200*d*, 200*e*, and 200*f* of FIGS. 2A and 2B).

For instance, the control element 480 may optionally include viral data element 488 which may be in the form of code stored in non-transitory memory on the memory element 487 for such viral-like schemes and associated electronics for transferring data/code. Such viral-like code/data transfer schemes and associated electronics may be or share aspects with those as described in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER of the incorporated patents and applications.

An authentication element 489 may optionally be included in the control element 480 used to authenticate batteries that may be coupled to the interchangeable battery interface apparatus. For instance, the authentication of batteries may be used to disable the interchangeable battery interface apparatus (e.g., the interchangeable battery interface apparatus 200*a*, 200*d*, 200*e*, and 200*f* of FIGS. 2A and 2B) and therefore a connected host device for purpose of disallowing some battery types and/or as a security measure in case of theft.

Still referring to FIG. 4, the PCB embodiment 460 may include a plurality of connectors 462 to which a selection of differently positioned electrical contacts 430*a*, 430*d*, 430*e*, or 430*f*, which may be or share aspects with the electrical contacts 230*a*, 230*c*, 230*d*, and 230*e* of FIGS. 2A and 2B, may couple providing electrical pathways for an associated battery-specific adapter (e.g., battery-specific adapter 220*a*, 220*d*, 220*e*, and 220*f* of FIGS. 2A and 2B) in coupling a battery 400*a*, 400*b*, 400*c*, 400*d*, 400*e*, or 400*f* thereto. The batteries 400*a*, 400*b*, 400*c*, 400*d*, 400*e*, and 400*f* may be or share aspects with the batteries 130*a*, 130*b*, 130*c*, 130*d*, 130*e*, and 130*f* of FIG. 1 respectively.

A routing element 490, which may be or include electrical circuit conductive traces on the PCB 460, may provide electrical pathways between the various connectors 462 associated with different battery-specific adapters (e.g., battery-specific adapter 220*a*, 220*d*, 220*e*, and 220*f* of FIGS. 2A and 2B), the control element 480, and further with a host device 495 via a connector 450 (e.g., a flexible circuit board (FCB), flexible flat cables, wires, or the like which may be or share aspects with the connector 250 of FIGS. 2A and 2B or the connector 364 of FIG. 3).

Routing element 490 may be configured with electrically conductive pathways for various different battery types to accommodate coupling with different battery-specific adapters (e.g., battery-specific adapter 220*a*, 220*d*, 220*e*, and 220*f* FIGS. 2A and 2B) having differently positioned electrical contacts (e.g., electrical contacts 230*a*, 230*d*, 230*e*, and 230*f* of FIGS. 2A and 2B).

Still referring to FIG. 4, an external connector port embodiment such as interface connector element 420 may be included for the purposes of connecting with one or more external devices. For instance, the external connector port 420 may be or include a universal serial bus (USB) port or the like for connecting with one or more external devices for exchange of data. In some embodiments, the external connector port 420 may be or include a universal serial bus power delivery (USB PD) port or the like such that connected batteries (e.g., batteries 400*a*, 400*b*, 400*c*, 400*d*, 400*e*, and 400*f*) may be recharged by an external power source and/or may distribute electric current to one or more external devices.

Further illustrated in FIG. 4, the PCB 460 may include a wireless element embodiment such as wireless module 496. The wireless element 496 may be used for communication between an interchangeable battery interface apparatus in accordance with aspects of the present disclosure (e.g., such as the interchangeable battery interface apparatus 200*a*, 200*d*, 200*e*, and 200*f* of FIGS. 2A and 2B) associated with the PCB 460 and one or more external devices via one or more Wi-Fi, Bluetooth, Bluetooth Low Energy (BLE), near-field communication (NFC) or like wireless communication module or circuit. The data communicated may include, but is not limited to, status or charge level of coupled battery or batteries, viral-like code/data transfer data, authentication or other security data as subsequently disclosed herein, and/or other data.

In some embodiments, the wireless element embodiment 496 may communicate data with the host device 495 which may, for instance, be or include the wireless pipe inspection video transmission apparatus 730 in the cable-reel 720 of FIG. 7C, the CCU 830 of FIG. 8C, the utility locator device 950 of FIG. 9C, the utility locating transmitter 1060 of FIG. 10C, the GNSS backpack 1170 of FIG. 11, the rangefinder apparatus 1280 of FIG. 12, or other device that includes an interchangeable battery interface apparatus in accordance with aspects of the present disclosure. T Though the wireless element 496 is shown as disposed on the PCB 460 in FIG. 4, in other embodiments in accordance with aspects of the present disclosure such a wireless element may be a wireless module (or in some embodiments a wired communications module such as a serial data transmitter or transceiver) or subsystem disposed in locations besides the PCB (e.g., a base subassembly, battery-specific adapter, or elsewhere in an interchangeable battery interface apparatus). Likewise, the wireless element 496 may instead or additionally communicate data with one or more batteries (e.g., the batteries 400*a*, 400*b*, 400*c*, 400*d*, 400*e*, and 400*f*) and/or external devices 497 (e.g., one or more other system devices, cloud or other remote server, or the like).

In the previously illustrated interchangeable battery interface apparatus embodiments (e.g., the interchangeable battery interface apparatus 200*a*, 200*d*, 200*e*, and 200*f* illustrated in FIGS. 2A and 2B), a single battery is shown capable of connecting at one time. In other embodiments in accordance with aspects of the present disclosure an interchangeable battery interface apparatus embodiment may be configured to connect to two or more batteries simultaneously in powering a host device which may be of the same manufacture, chemistry, and/or interface geometry or, alternatively, connect with two or more batteries having different manufacturers, chemistries, and/or interface geometries.

Figure 5A:
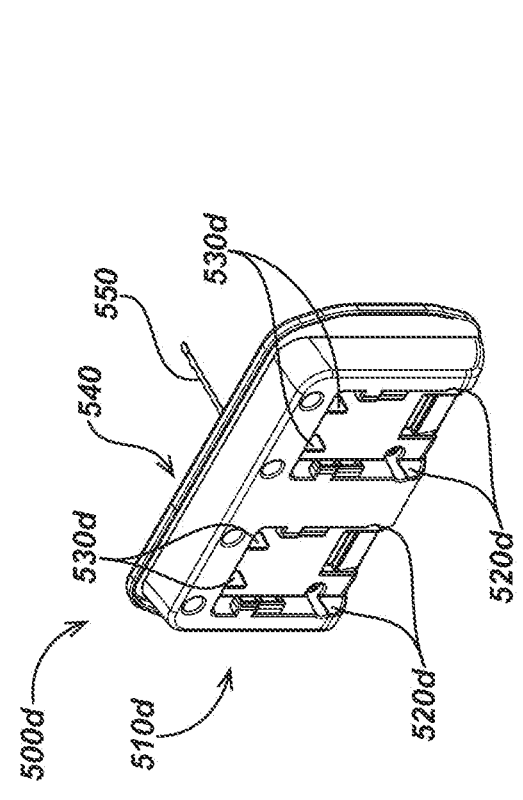
FIG. 5A is an isometric view of interchangeable battery interface apparatus embodiments configured for use with two or more different batteries simultaneously.
Figure 5A:
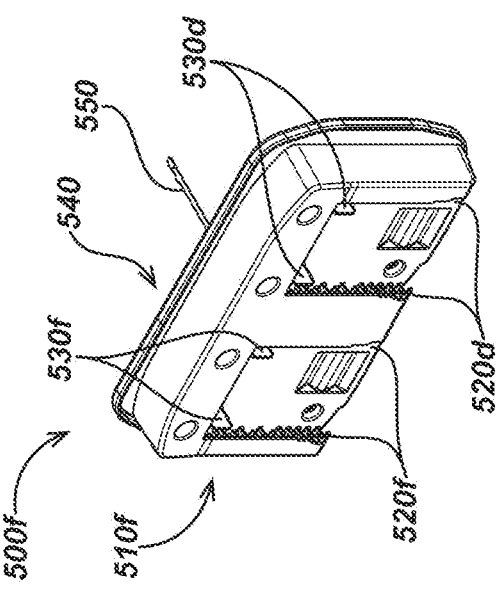
Figure 5B:
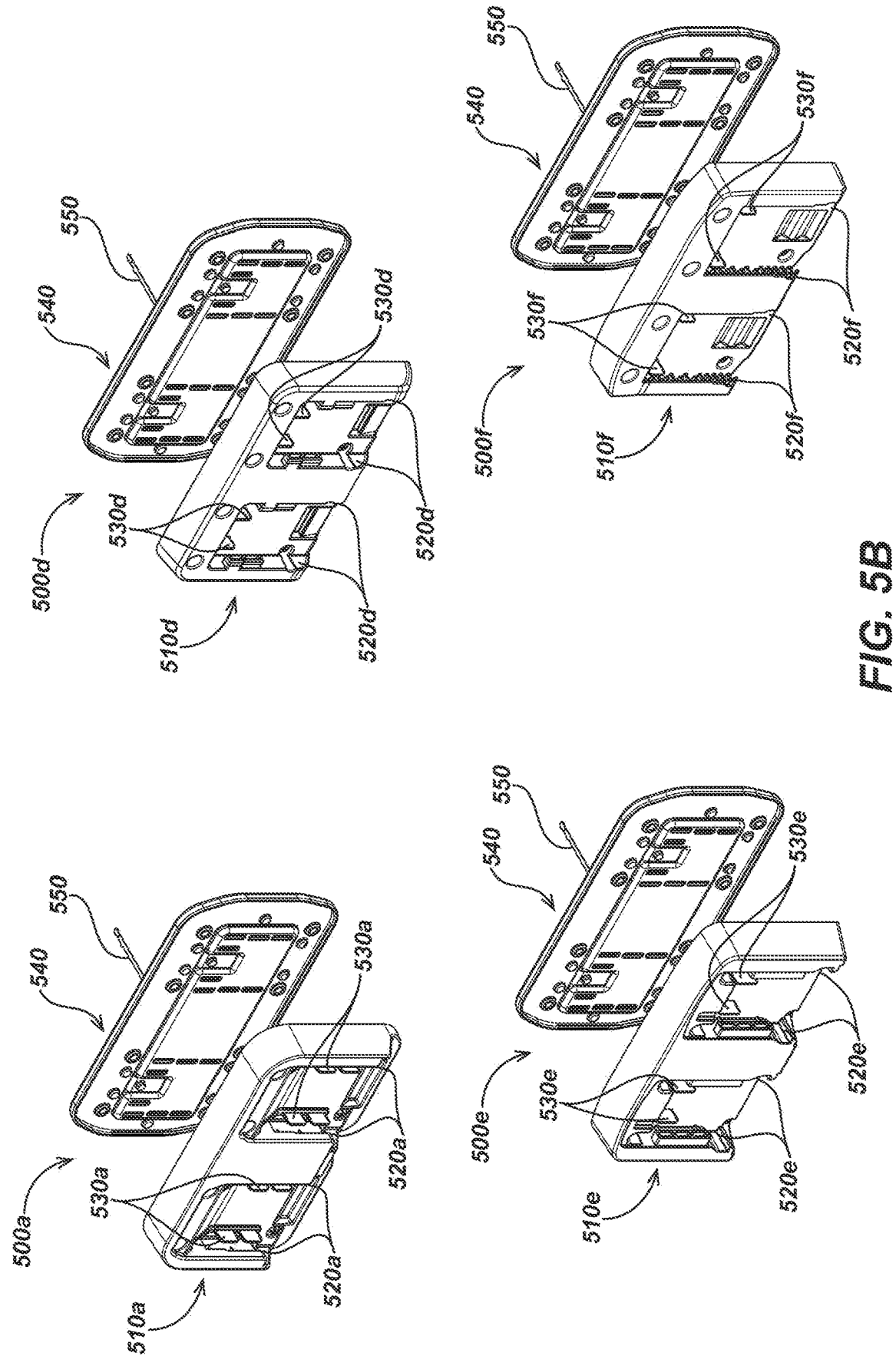
FIG. 5B is a partially exploded view of the interchangeable battery interface apparatus embodiments of FIG. 5A separating battery-specific adapters from the base subassemblies.

Turning to FIGS. 5A and 5B, a number of interchangeable battery interface apparatus embodiments are illustrated which may be included in various modular battery systems embodiments of the present disclosure that further include a host device and a plurality of batteries (e.g., battery 100*a*, 100*b*, 100*c*, 100*d*, 100*e*, or 100*f* illustrated in FIG. 1). As illustrated, an interchangeable battery interface apparatus 500a may be configured to mate with two of the SeeScan™ batteries 100a, the Makita™ batteries 100b, or the Ridgid™ batteries 100c illustrated in FIG. 1.

An interchangeable battery interface apparatus 500d may be configured to mate with two of the DeWalt™ batteries 100d illustrated FIG. 1, an interchangeable battery interface apparatus 500e may be configured to mate with two of the Milwaukee™ batteries 100e illustrated FIG. 1, and an interchangeable battery interface apparatus 500f may be configured to mate with two of the Bosch™ batteries 100f illustrated FIG. 1. It should be noted that in other embodiments, other quantities of batteries may mate with an interchangeable battery interface apparatus embodiment in accordance with aspects of the present disclosure. Likewise, in some embodiments interchangeable battery interface apparatus adapted to mate with a plurality of batteries, different types may be configured to mate with the interchangeable battery interface apparatus.

Each interchangeable battery interface apparatus embodiment 500a, 500d, 500e, and 500f may include a battery-specific adapter element (e.g., battery-specific adapter 510a, 510d, 510e, and 510f) having a battery-specific interface (e.g., battery-specific interface 520a, 520d, 520e, and 520f) formed to mate with and mechanically and electrically couple with a specific battery type. For instance, the interchangeable battery interface apparatus 500a may include a battery-specific adapter 510a which may further include a battery-specific interface 520a formed to mate and mechanically couple with two of the SeeScan™ batteries 100a (FIG. 1), two of the Makita™ batteries 100b (FIG. 1), or two of the Ridgid™ batteries 100c (FIG. 1).

Likewise, the interchangeable battery interface apparatus embodiment 500d may include a battery-specific adapter 510d which may further include a battery-specific interface 520d formed to mate and mechanically couple with two of the DeWalt™ batteries 100d (FIG. 1), the interchangeable battery interface apparatus 500e may include a battery-specific adapter 510e which may further include a battery-specific interface 520e formed to mate and mechanically couple with two of the Milwaukee™ batteries 100e (FIG. 1), and the interchangeable battery interface apparatus 500f may include a battery-specific adapter 510f which may further include a battery-specific interface 520f formed to mate and mechanically couple with two of the Bosch™ batteries 100f (FIG. 1).

Still referring to FIGS. 5A and 5B, each battery-specific adapter embodiment (e.g., battery-specific adapter 510a, 510d, 510e, and 510f) may further include a contact element having one or more electrically conductive contacts (e.g., contacts 530a, 530d, 530e, and 530f) that may extend through the battery-specific interface (e.g., battery-specific interface 520a, 520d, 520e, and 520f) aligned so as to connect with the electrical contacts on respective batteries in communicating electric current for powering a host device and/or, in some embodiments, the exchange of data.

For instance, in mechanically coupling the SeeScan™ battery embodiment 100a (FIG. 1), the Makita™ batteries 100b (FIG. 1), or the Ridgid™ batteries 100c (FIG. 1) to the battery-specific adapter 510a of the interchangeable battery interface apparatus 500a, the contacts 112a, 112b, or 112c (FIG. 1) of the respective battery 100a, 100b, or 100c (FIG. 1) may contact and establish electrical pathways with the contacts 530a of the interchangeable battery interface apparatus 500a.

Likewise, in mechanically coupling the DeWalt™ batteries 100d (FIG. 1) to the battery-specific adapter 510d of the interchangeable battery interface apparatus 500d the contacts 112d (FIG. 1) of the battery 100d (FIG. 1) may contact and establish electrical pathways with the contacts 530d of the interchangeable battery interface apparatus 500d. In mechanically coupling the Milwaukee™ batteries 100e (FIG. 1) to the battery-specific adapter 510e of the interchangeable battery interface apparatus 500e the contacts 112e (FIG. 1) of the battery 100e (FIG. 1) may contact and establish electrical pathways with the contacts 530e of the interchangeable battery interface apparatus 500e. In mechanically coupling the Bosch™ batteries 100f (FIG. 1) to the battery-specific adapter 510f of the interchangeable battery interface apparatus 500f the contacts 112f (FIG. 1) of the battery 100f (FIG. 1) may connect and establish electrical pathways with the contacts 530f of the interchangeable battery interface apparatus 500f.

As best illustrated in FIG. 5B, the interchangeable battery interface apparatus embodiments 500a, 500d, 500e, and 500f may further include a base subassembly embodiment 540 that may couple with the respective one of the battery-specific adapters 510a, 510d, 510e, and 510f. The base subassembly embodiment 540 may be or share aspects with the base subassembly embodiment 340 illustrated in FIG. 3 further adapted to mate with multiple batteries. The base subassembly 540 may mechanically couple (e.g., via screws, bolts, or the like), as well as electrically couple via a connector 550 (e.g., a flexible circuit board (FCB), flexible flat cables, wires, or the like for establishing electrical pathways) to a host device in communicating electrical current for powering and, optionally, exchanging data between a host device, battery or batteries, and/or interchangeable battery interface apparatus embodiment(s).

Referring still to of FIGS. 5A and 5B, it should be noted that in some modular battery system embodiments employing an interchangeable battery interface apparatus embodiment in accordance with aspects of the present disclosure as well as two or more batteries and a host device configured to connect with the interchangeable battery interface apparatus, the base subassembly (e.g., the base subassembly 540) may be the same in various interchangeable battery interface apparatuses (e.g., interchangeable battery interface apparatuses 500a, 500d, 500e, and 500f) such that only the battery-specific adapters (e.g., battery-specific adapters 510a, 510d, 510e, and 510f) may be swapped out to adapt the interchangeable battery interface apparatus (e.g., interchangeable battery interface apparatus 500a, 500d, 500e, and 500f) for use with different battery types (e.g., battery 100a, battery 100b, battery 100c, battery 100d, battery 100e, or battery 100f of FIG. 1).

In other modular battery system embodiments in accordance with aspects of the present disclosure, the entirety of the interchangeable battery interface apparatus (e.g., interchangeable battery interface apparatus 500a, 500d, 500e, and 500f) may be swapped out to adapt a host device with different battery types (e.g., battery 100a, battery 100b, battery 100c, battery 100d, battery 100e, or battery 100f of FIG. 1).

The modular battery system embodiments including an interchangeable battery interface apparatus embodiment (e.g., interchangeable battery interface apparatus 200a, 200d, 200e, and 200f of FIGS. 2A and 2B or interchangeable battery interface apparatus 500a, 500d, 500e, and 500f of FIGS. 5A and 5B) in accordance with aspects of the present disclosure may be employed in one of a variety of different host devices to couple with and be powered by different battery types.

Figure 6:
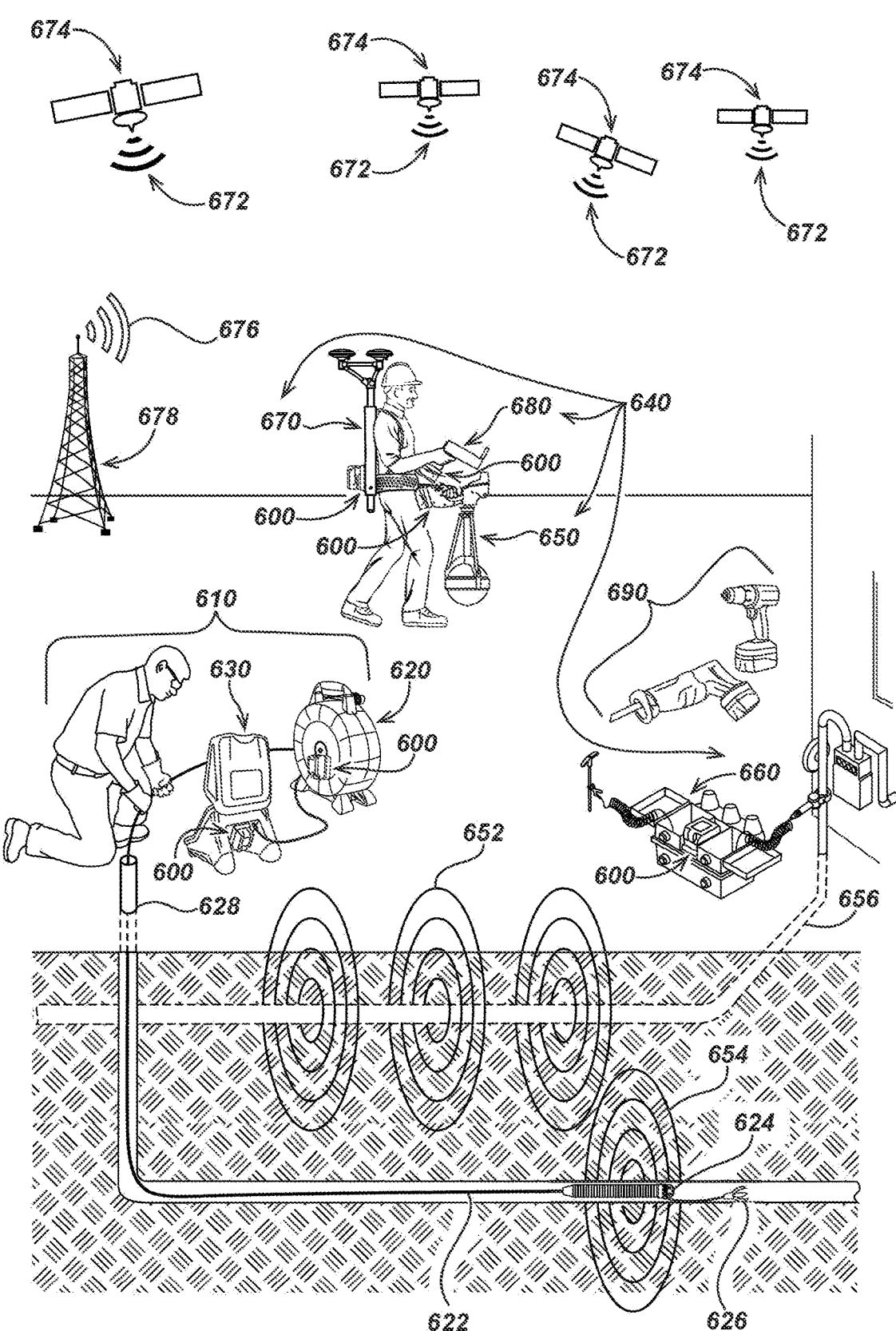
FIG. 6 is an illustration of various modular battery system embodiments including an interchangeable battery interface apparatus embodiment as used with various devices of pipe inspection/cleaning systems and utility locating systems.

For example, as illustrated in FIG. 6, a modular battery system embodiment including an interchangeable battery interface apparatus embodiment 600 in accordance with aspects of the present disclosure may be employed in various tools/devices/apparatuses such as those used in a pipe inspection/cleaning system 610 (e.g., which may include but should not be limited to a cable-reel 620 and/or a CCU 630) and/or a utility locating system 640 (e.g., which may include but should not be limited to a utility locator device 650 and/or a utility locating transmitter 660 and/or GNSS backpack device 670 and/or rangefinder apparatus 680) such that such the various tools/devices/apparatuses may couple to and be powered by different battery types, such as the battery types general used in power tools (e.g., power tools 690).

It should be noted that other modular battery systems embodiments in accordance with aspects of the present disclosure may include other types of host devices and may couple to other quantities and types of batteries. For instance, in some embodiments the power tools 690 (or other like tools or devices) may employee a modular battery system embodiment including an interchangeable battery interface apparatus embodiment in accordance with aspects of the present disclosure.

In FIG. 6, the cable-reel embodiment 620 of the pipe inspection/cleaning system embodiment 610 may be or share aspects with the cable-reels, drums, and/or associated apparatus embodiments as disclosed in U.S. Pat. No. 9,521,303, issued Dec. 13, 2016, entitled CABLE STORAGE DRUM WITH MOVEABLE CCU DOCKING APPARATUS; U.S. patent application Ser. No. 17/110,273, filed Dec. 2, 2020, entitled INTEGRAL DUAL CLEANER CAMERA DRUM SYSTEMS AND METHODS; U.S. patent application Ser. No. 17/190,400, filed Mar. 3, 2021, entitled DOCKABLE CAMERA REEL AND CCU SYSTEM; U.S. patent application Ser. No. 17/815,387, filed Jul. 27, 2022, entitled INWARD SLOPED DRUM FACE FOR PIPE INSPECTION CAMERA SYSTEM and/or other cable-reels, drums, and/or associated apparatus embodiments of the incorporated patents and applications.

For instance, the cable-reel embodiment 620 may store and dispense a push-cable 622 having one or more attached cameras, such as an inspection camera 624, and/or cleaning apparatuses, such as a cleaning tool 626, into a pipe 628 or other void. The modular battery system including an interchangeable battery interface apparatus 600 may be used for mating one or more battery types in powering the cable-reel 620. The cable-reel 620 may require electrical power, for instance, when including an electrically powered automatic push-cable feeding apparatus and/or other mechanism for wireless communication of inspection images/video and/or other information related to inspection and/or cleaning of the pipe or other void (e.g., via the relay modules and like devices disclosed in U.S. patent application Ser. No. 17/528,956, filed Nov. 17, 2021, entitled VIDEO INSPECTION SYSTEM, APPARATUS, AND METHODS WITH RELAY MODULES AND CONNECTION PORT of the incorporated patents and applications). Various embodiments as disclosed herein may be used for coupling various battery types to the cable reel may be used in different embodiments.

Still referring to the pipe inspection/cleaning system embodiment 610 of FIG. 6, the CCU embodiment 630 may be or share aspects with the camera control units or associated displays and apparatus embodiments as disclosed in U.S. Pat. No. 9,521,303, issued Dec. 13, 2016, entitled CABLE STORAGE DRUM WITH MOVEABLE CCU DOCKING APPARATUS; U.S. patent application Ser. No. 17/190,400, filed Mar. 3, 2021, entitled DOCKABLE CAMERA REEL AND CCU SYSTEM; and/or other CCUs and/or displays and/or or other associated apparatuses embodiments of the incorporated patents and applications.

For instance, CCU embodiment 630 may display and/or store inspection video/images from the inspection camera 624 as well as control aspects of the inspection camera 624 and/or cleaning tool 626 and/or aspects of the cable-reel 620 and/or other wirelessly or wired connected devices (e.g., devices associated with a utility locating system such as the utility locating system 640, cloud storage/computing devices, base stations, or the like). The modular battery system including an interchangeable battery interface apparatus 600 may be used for mating one or more battery types to power the CCU 630.

Referring to the utility locating system embodiment 640 of FIG. 6, the utility locator device embodiment 650 may be or share aspects with the utility locator devices, utility locators, or locator embodiments as disclosed in U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 10,078, 149, issued Sep. 18, 2018, entitled BURIED OBJECT LOCATORS WITH DODECAHEDRAL ANTENNA NODES; U.S. Pat. No. 11,196,181, issued Dec. 21, 2021, entitled LOW COST, HIGH PERFORMANCE SIGNAL PROCESSING IN A MAGNETIC-FIELD SENSING BURIED UTILITY LOCATOR SYSTEM; and/or like device embodiments of the incorporated patents and applications.

For instance, the utility locator device embodiment 650 may include one or more antennas and associated circuitry to measure magnetic signals (e.g., signal 652 or signal 654) which may be emitted by one or more utility lines such as utility line 656 or pipe 628 (e.g., when current is coupled to a conductive utility line via a transmitter device such as the transmitter device 660 and/or coupled from ambient or other signal sources) and/or a magnetic dipole field sonde device which may be in the inspection camera 624 in determining positions and/or mapping the utility line(s) (e.g., utility line 656 and/or pipe 628). The modular battery system including an interchangeable battery interface apparatus 600 may be used for mating one or more battery types in powering the utility locator device 650.

Still referring to the utility locating system embodiment 640 of FIG. 6, the utility locating transmitter embodiment 660 may be or share aspects with the transmitter embodiments as disclosed in U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. Pat. No. 9,927,546, issued Mar. 27, 2018, entitled PHASE-SYNCHRONIZED BURIED OBJECT TRANSMITTER AND LOCATOR METHODS AND APPARATUS; U.S. patent application Ser. No. 17/528,956, filed Nov. 17, 2021, entitled SIGNAL TRANSMITTER CONNECTION PORT FOR WIRELESS INSPECTION AND LOCATING SYSTEM; and/or like device embodiments of the incorporated patents and applications.

For instance, the utility locating transmitter embodiment 660 may include circuitry and one or more inductive clamps, direct electrical contact clips, inductive apparatus, and/or other apparatus in coupling electrical current to one or more utility lines such as the utility line 656 such that a utility locator device (e.g., utility locator device 650) may determine positions and/or mapping the utility line(s) (e.g., utility line 656). The modular battery system including an interchangeable battery interface apparatus 600 may be used for mating one or more battery types in powering the utility locating transmitter 660.

Still referring to the utility locating system embodiment 640 of FIG. 6, the GNSS backpack embodiment 670 may be or share aspects with the backpack device embodiments as disclosed in U.S. Pat. No. 10,608,348, issued Mar. 31, 2020, entitled DUAL ANTENNA SYSTEMS WITH VARIABLE POLARIZATION; U.S. patent application Ser. No. 17/235,507, filed Apr. 20, 2021, entitled UTILITY LOCATING DEVICES EMPLOYING MULTIPLE SPACED APART GNSS ANANCY FOR RTK POSITIONING AND OTHER POSITIONING SYSTEMS AND METHODS; and/or like device embodiments of the incorporated patents and applications. For instance, the GNSS backpack 670 may include one or more global navigation satellite systems (GNSS) and associated antennas to receive satellite navigation signals (e.g., a plurality of navigation signals 672 from a number of navigation satellites 674 and, optionally, real-time kinematic or other navigation correction data 676 from one or more base stations 678) in determining geolocation which may further refine the geolocation of an associated utility locator device (e.g., utility locator device 650) in determining positions and/or mapping utility line(s) (e.g., utility line 656). The modular battery system including an interchangeable battery interface apparatus 600 may be used for mating one or more battery types in powering the GNSS backpack 670.

Still referring to the utility locating system embodiment 640 of FIG. 6, the rangefinder apparatus embodiment 680 may be or share aspects with the rangefinder device embodiments as disclosed in U.S. patent application Ser. No. 15/866,360, filed Jan. 9, 2018, entitled TRACKED DISTANCE MEASURING DEVICES, SYSTEMS, AND METHODS; U.S. Pat. No. 11,397,274, issued Jul. 26, 2022, entitled TRACKED DISTANCE MEASURING DEVICES, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDERS AND ASSOCIATED METHODS AND UTILITY LOCATOR DEVICES; and/or like device embodiments of the incorporated patents and applications. For instance, the rangefinder apparatus embodiment 680 may include one or more lasers in determining distances in utility locating systems (e.g., utility locating system 640). The modular battery system including an interchangeable battery interface apparatus 600 may be used for mating one or more battery types in powering the rangefinder apparatus 680.

Turning to FIGS. 7A and 7B, a cable-reel embodiment 720 is illustrated which may be or share aspect with the cable-reel embodiment 620 of FIG. 6 and/or the cable-reels, drums, and/or associated apparatus embodiments as disclosed in U.S. Pat. No. 9,521,303, issued Dec. 13, 2016, entitled CABLE STORAGE DRUM WITH MOVEABLE CCU DOCKING APPARATUS; U.S. patent application Ser. No. 17/110,273, filed Dec. 2, 2020, entitled INTEGRAL DUAL CLEANER CAMERA DRUM SYSTEMS AND METHODS; U.S. patent application Ser. No. 17/190,400, filed Mar. 3, 2021, entitled DOCKABLE CAMERA REEL AND CCU SYSTEM; U.S. patent application Ser. No. 17/815,387, filed Jul. 27, 2022, entitled INWARD SLOPED DRUM FACE FOR PIPE INSPECTION SYSTEMS and/or other cable-reels, drums, and/or associated apparatus embodiments of the incorporated patents and applications for storing and dispensing a push-cable having one or more attached cameras and/or cleaning apparatuses into a pipe or other void.

A modular battery system embodiment 700a that includes an interchangeable battery interface apparatus embodiment (e.g., interchangeable battery interface apparatus 710a of FIGS. 7A and 7B or the interchangeable battery interface apparatuses 710d, 710e, and 710f of FIG. 7B) that may be used for mating one or more battery types (e.g., a battery 712a of FIGS. 7A and 7B of a battery 712d, 712e, or 712f of FIG. 7B) in powering the associated host device, such as the cable-reel 720. The cable-reel 720 may require electrical power, for instance, when including an automatic push-cable feeding apparatus and/or other mechanism for wireless communication (e.g., via a wireless pipe inspection video transmission apparatus 730 or other relay module or like device embodiments disclosed in U.S. patent application Ser. No. 17/528,956, filed Nov. 17, 2021, entitled VIDEO INSPECTION SYSTEM, APPARATUS, AND METHODS WITH RELAY MODULES AND CONNECTION PORT of the incorporated patents and applications) of inspection images/video and/or other information related to inspection and/or cleaning of the pipe or other void.

Referring to FIG. 7B, the interchangeable battery interface apparatus embodiments 710a, 710d, 710e, 710f may be or share aspects with the interchangeable battery interface apparatus embodiments 200a, 200d, 200e, and 200f of FIGS. 2A and 2B or the interchangeable battery interface apparatus embodiments 500a, 500d, 500e, and 500f of FIGS. 5A and 5B configured for use with multiple batteries.

Each of the interchangeable battery interface apparatus embodiments 710a, 710d, 710e, and 710f may be configured to mate with one or more different battery types in powering the cable-reel 720 when coupled thereto. For instance, the interchangeable battery interface apparatuses 710a may be configured to mate with battery 712a, 712b, or 712c, the interchangeable battery interface apparatuses 710d may be configured to mate with battery 712d, the interchangeable battery interface apparatuses 710e may be configured to mate with battery 712e, and the interchangeable battery interface apparatuses 710f may be configured to mate with battery 712f in powering the cable-reel 720. A plurality of different interchangeable battery interface apparatus embodiments are illustrated in FIG. 7B (e.g., interchangeable battery interface apparatuses 710a, 710d, 710e, and 710f) that may each adapt the cable-reel 720 to mate with one or more different battery types (e.g., battery 712a, 712b, 712c, 712d, 714e, and 714f).

In some embodiments, the various interchangeable battery interface apparatus embodiments may instead include a base subassembly embodiment (e.g., the base subassembly 240 of FIGS. 2A and 2B) such that only the battery-specific adapter (e.g., battery-specific adapters 210a, 210d, 210e, and 210f of FIGS. 2A and 2B) may be swapped out to adapt the interchangeable battery interface apparatus (e.g., interchangeable battery interface apparatus 200a, 200d, 200e, and 200f of FIGS. 2A and 2B) for use with a different battery type (e.g., batteries 712a, 712b, 712c, 712d, 714e, and 714f). A mounting port 732 for coupling the interchangeable battery interface apparatus 710a, 710d, 710e, or 710f. For instance, the mounting port 732 may be or include a surface to which the interchangeable battery interface apparatus 710a, 710d, 710e, or 710f may mechanically and electrically couple to the cable-reel 720. In FIG. 7B, the mounting port 732 is illustrated on the wireless pipe inspection video transmission apparatus 730 though in other embodiments, a mounting port may instead be located on the cable-reel 720 or other connected device or apparatus.

Turning to FIG. 7C, a modular battery system embodiment 700c is illustrated which may be the same as the modular battery system embodiment 700a of FIGS. 7A and 7B where various components of an interchangeable battery interface apparatus (e.g., a base subassembly 740) may be built into or disposed on the wireless pipe inspection video transmission apparatus 730.

For instance, each interchangeable battery interface apparatus embodiment 710a, 710d, 710e, and 710f may include respective battery-specific adapters 711a, 711d, 711e, and 711f configured for use with one or more different batteries (e.g., the battery-specific adapters 711a adapted for use with battery 712a,712b, or 712c; the battery-specific adapters 711d adapted for use with battery 712d; the battery-specific adapters 711e adapted for use with battery 712e; or the battery-specific adapters 711f adapted for use with battery 712f) that may mate with the base subassembly 740 built into the wireless pipe inspection video transmission apparatus 730.

The base subassembly embodiment 740 may be the same or share aspects with the base subassembly embodiment 340 of FIG. 3. For instance, the base subassembly 740 may include a number of slit features to accommodate electrical contacts of various different battery-specific adapters (e.g., the battery-specific adapters 711a, 711d, 711e, and 711f). Likewise, the base subassembly 740 built into the wireless pipe inspection video transmission apparatus 730 may include a PCB (e.g., the PCB 460 of FIG. 4) or the like having analogous electrical contacts to that of the battery specific adapters as well as a routing element to distribute electrical current.

The PCB or like element may include a control element which may be or share aspects with the electronic control element embodiment 480 of FIG. 4 for receiving input electrical current from the battery or batteries and output current for powering and/or exchanging data with the wireless pipe inspection video transmission apparatus 730 or other host device(s).

The control element may be or include an undervoltage-lockout (UVLO) circuit, an overvoltage circuit, one or more temperature sensors, a voltage level element to step up or down voltage in ensuring proper voltage at a connected host device, one or more processors and non-transitory memory(ies).

In some such embodiments, the exchanged data may include a viral-like scheme and associated electronics to communicate data and/or transfer code between batteries, host devices, and interchangeable battery interface apparatuses 710a, 710d, 710e, or 710f. Such viral-like code/data transfer schemes and associated electronics may be or share aspects with those embodiments as described in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER of the incorporated patents and applications. The PCB or like element may further include an authentication element including electronics to authenticate batteries that may be coupled to the interchangeable battery interface apparatus for purpose of disallowing some battery types and/or as a security measure in case of theft.

Turning to FIGS. 8A and 8B, a camera control unit (CCU) embodiment 830 is illustrated which may be or share aspect with CCU 630 embodiment of FIG. 6 and/or the camera control units or associated displays and apparatus embodiments as disclosed in U.S. Pat. No. 9,521,303, issued Dec.

13, 2016, entitled CABLE STORAGE DRUM WITH MOVEABLE CCU DOCKING APPARATUS; U.S. patent application Ser. No. 17/190,400, filed Mar. 3, 2021, entitled DOCKABLE CAMERA REEL AND CCU SYSTEM; and/or other CCUs and/or displays and/or or other associated apparatuses of the incorporated patents and applications.

A modular battery system embodiment 800a that includes an interchangeable battery interface apparatus embodiment (e.g., interchangeable battery interface apparatus 810a of FIGS. 8A and 8B or the interchangeable battery interface apparatuses 810d, 810e, and 810f of FIG. 8B) that may be used for mating one or more battery types (e.g., a battery 812a of FIGS. 8A and 8B or a battery 812d, 812e, or 812f of FIG. 8B) in powering the associated host device, such as the CCU 830. The CCU 830 may display and/or store inspection video/images and/or control aspects of an inspection camera (e.g., inspection camera 624 and/or cleaning tool 626) and/or aspects of a cable-reel (e.g., the cable-reel 720 of FIGS. 7A and 7B and/or the cable-reel 620 of FIGS. 6A and 6B) and/or other wirelessly or wired connected devices (e.g., devices associated with a utility locating system such as the utility locating system 640 of FIGS. 6A and 6B, cloud storage/computing devices, base stations, or the like).

Referring to FIG. 8B, interchangeable battery interface apparatus embodiments 810a, 810d, 810e, 810f may be or share aspects with the interchangeable battery interface apparatus embodiments 200a, 200d, 200e, and 200f of FIGS. 2A and 2B or the interchangeable battery interface apparatuses 500a, 500d, 500e, and 500f of FIGS. 5A and 5B configured for use with multiple batteries. Each of the interchangeable battery interface apparatuses 810a, 810d, 810e, and 810f may be configured to mate with one or more different battery types in powering the CCU 830 when coupled thereto.

For instance, the interchangeable battery interface apparatuses 810a may be configured to mate with battery 812a, 812b, or 812c, the interchangeable battery interface apparatuses 810d may be configured to mate with battery 812d, the interchangeable battery interface apparatuses 810e may be configured to mate with battery 812e, and the interchangeable battery interface apparatuses 810f may be configured to mate with battery 812f in powering the CCU 830.

Various different interchangeable battery interface apparatus embodiments are illustrated in FIG. 8B (e.g., interchangeable battery interface apparatuses 810a, 810d, 810e, and 810f) that may each adapt the CCU 830 to mate with one or more different battery types (e.g., battery 812a, 812b, 812c, 812d, 814e, and 814f). In some embodiments, the various interchangeable battery interface apparatuses may instead include a base subassembly (e.g., the base subassembly 240 of FIGS. 2A and 2B) such that only the battery-specific adapters (e.g., battery-specific adapters 210a, 210d, 210e, and 210f of FIGS. 2A and 2B) may be swapped out to adapt the interchangeable battery interface apparatus (e.g., interchangeable battery interface apparatus 200a, 200d, 200e, and 200f of FIGS. 2A and 2B) for use with a different battery type (e.g., batteries 812a, 812b, 812c, 812d, 814e, and 814f). The CCU 830 may include a mounting port 832 for coupling the interchangeable battery interface apparatus 810a, 810d, 810e, and 810f. For instance, the mounting port 832 may be or include a surface to which the interchangeable battery interface apparatus 810a, 810d, 810e, or 810f may mechanically and electrically couple to the CCU 830.

Turning to FIG. 8C, a modular battery system embodiment 800c is illustrated which may be the same as the modular battery system embodiment 800a of FIGS. 8A and 8B where various components of an interchangeable battery interface apparatus (e.g., a base subassembly 840) may be built into or mounted on the CCU 830. For instance, each interchangeable battery interface apparatus 810a, 810d, 810e, and 810f may include a respective battery-specific adapter 811a, 811d, 811e, and 811f adapted for use with one or more different battery types (e.g., the battery-specific adapters 811a adapted for use with battery 812a, 812b, or 812c; the battery-specific adapters 811d adapted for use with battery 812d; the battery-specific adapters 811e adapted for use with battery 812e; or the battery-specific adapters 811f adapted for use with battery 812f) such that may mate with the base subassembly 840 built into the CCU 830.

The base subassembly 840 may be the same or share aspects with the base subassembly 340 of FIG. 3. For instance, the base subassembly 840 may include a number of slit features to accommodate electrical contacts of various different battery-specific adapters (e.g., the battery-specific adapters 811a, 811d, 811e, and 811f). Likewise, the base subassembly 840 built into CCU 830 may include a PCB (e.g., the PCB 460 of FIG. 4) or the like having analogous electrical contacts to that of the battery specific adapters as well as a routing element to distribute electrical current. The PCB or like element may include a control element which may be or share aspects with the control element 480 of FIG. 4 for receiving input electrical current from the battery or batteries and output current for powering and/or exchanging data with the CCU 830 or other host device.

The control element may be or include an undervoltage-lockout (UVLO) circuit, an overvoltage circuit, one or more temperature sensors, a voltage level element to step up or down voltage in ensuring proper voltage at a connected host device, one or more processors and non-transitory memory(ies). In some such embodiments, the exchanged data may include a viral-like scheme and electronics to communicate data and/or transfer code between batteries, host devices, and interchangeable battery interface apparatuses 810a, 810d, 810e, or 810f. Such viral-like code/data transfer schemes and associated electronics may be or share aspects with those as described in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER of the incorporated patents and applications. The PCB or like element may further include an authentication element to authenticate batteries that may be coupled to the interchangeable battery interface apparatus for purpose of disallowing some battery types and/or as a security measure in case of theft.

Turning to FIGS. 9A and 9B, a utility locator device embodiment 950 is illustrated which may be or share aspect with the utility locator device embodiment 650 of FIG. 6 or the utility locator devices, utility locators, or locator embodiments such as those disclosed in U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 10,078,149, issued Sep. 18, 2018, entitled BURIED OBJECT LOCATORS WITH DODECAHEDRAL ANTENNA NODES; U.S. Pat. No. 11,196,181, issued Dec. 7, 2021, entitled LOW COST, HIGH PERFORMANCE SIGNAL PROCESSING IN A MAGNETIC-FIELD SENSING BURIED UTILITY LOCATOR SYSTEM; and/or like devices of the incorporated patents and applications. A modular battery system 900a that includes an interchangeable battery interface apparatus (e.g., interchangeable battery interface apparatus 910a of FIGS. 9A and 8B or the interchangeable battery interface apparatuses 910d, 910e, and 910f of FIG. 9B) that may be used for mating one or more battery types in powering the associated host device, such as the utility locator device 650. The utility locator device 950 may include one or more antennas and associated circuitry to measure magnetic signals which may be emitted by one or more utility lines (e.g., the utility line 656 illustrated in FIG. 6) in determining positions and/or mapping the utility line(s) (e.g., utility line 656 of FIG. 6). For instance, magnetic signals may be emitted by one or more utility lines when current is coupled thereto via a transmitter device (e.g., the transmitter device 660 of FIG. 6).

Referring to FIG. 9B, interchangeable battery interface apparatus embodiments 910a, 910d, 910e, and 910f may be or share aspects with the interchangeable battery interface apparatus embodiments 200a, 200d, 200e, and 200f of FIGS. 2A and 2B or the interchangeable battery interface apparatus embodiments 500a, 500d, 500e, and 500f of FIGS. 5A and 5B configured for use with multiple batteries. Each of the interchangeable battery interface apparatuses 910a, 910d, 910e, and 910f may be configured to mate with one or more different battery types in powering the utility locator device 950 when coupled thereto.

For instance, the interchangeable battery interface apparatuses 910a may be configured to mate with battery 912a, 912b, or 912c, the interchangeable battery interface apparatuses 910d may be configured to mate with battery 912d, the interchangeable battery interface apparatuses 910e may be configured to mate with battery 912e, and the interchangeable battery interface apparatuses 910f may be configured to mate with battery 912f in powering the utility locator device 950. A plurality of different interchangeable battery interface apparatus embodiments are illustrated in FIG. 9B (e.g., interchangeable battery interface apparatuses 910a, 910d, 910e, and 910f) that may each adapt the utility locator device 950 to mate with one or more different battery types (e.g., battery 912a, 912b, 912c, 912d, 914e, and 914f).

In some embodiments, the various interchangeable battery interface apparatuses may instead include a base subassembly (e.g., the base subassembly 340 of FIG. 3) such that only the battery-specific adapters (e.g., battery-specific adapters 210a, 210d, 210e, and 210f of FIGS. 2A and 2B) may be swapped out to adapt the interchangeable battery interface apparatus (e.g., interchangeable battery interface apparatus 200a, 200d, 200e, and 200f of FIGS. 2A and 2B) for use with a different battery type (e.g., batteries 912a, 912b, 912c, 912d, 914e, and 914f). The utility locator device 950 may include a mounting port 952 for coupling the interchangeable battery interface apparatus 910a, 910d, 910e, or 910f. For instance, the mounting port 952 may be or include a surface to which the interchangeable battery interface apparatus 910a, 910d, 910e, or 910f may mechanically and electrically couple to the utility locator device 950.

Turning to FIG. 9C, a modular battery system embodiment 900c is illustrated which may be the same as or similar to the modular battery system embodiments 900a of FIGS. 9A and 9B, where various components of an interchangeable battery interface apparatus (e.g., a base subassembly 940) may be built into or mounted on the utility locator device 950. For instance, each interchangeable battery interface apparatus 910a, 910d, 910e, and 910f may include a respective battery-specific adapters 911a, 911d, 911e, and 911f adapted for use with one or more different batteries (e.g., the battery-specific adapters 911a adapted for use with battery 912a, 912b, or 912c; the battery-specific adapters 911d adapted for use with battery 912d; the battery-specific adapters 911e adapted for use with battery 912e; or the battery-specific adapters 911f adapted for use with battery 9121) that may mate with the base subassembly 940 built into the utility locator device 950.

The base subassembly 940 may be the same or share aspects with the base subassembly 340 of FIG. 3. For instance, the base subassembly 940 may include a number of slit features to accommodate electrical contacts of various different battery-specific adapters (e.g., the battery-specific adapters 911a, 911d, 911e, and 911f). Likewise, the base subassembly 940 built into utility locator device 950 may include a PCB (e.g., the PCB 460 of FIG. 4) or the like having analogous electrical contacts to that of the battery specific adapters as well as a routing element to distribute electrical current. The PCB or like element may include a control element which may be or share aspects with the control element 480 of FIG. 4 for receiving input electrical current from the battery or batteries and output current for powering and/or exchanging data with the utility locator device 950 or other host device.

The control element may be or include an undervoltage-lockout (UVLO) circuit, an overvoltage circuit, one or more temperature sensors, a voltage level element to step up or down voltage in ensuring proper voltage at a connected host device, one or more processors and non-transitory qjmemory(ies). In some such embodiments, the exchanged data may include a viral-like scheme and associated electronics to communicate data and/or transfer code between batteries, host devices, and interchangeable battery interface apparatuses 910a, 910d, 910e, or 910f. Such viral-like code/data transfer schemes and associated electronics may be or share aspects with those as described in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER of the incorporated patents and applications. The PCB or like element may further include an authentication element to authenticate batteries that may be coupled to the interchangeable battery interface apparatus for purpose of disallowing some battery types and/or as a security measure in case of theft.

Turning to FIGS. 10A and 10B, a utility locating transmitter embodiment 1060 is illustrated which may be or share aspect with the utility locating transmitter embodiment 660 of FIG. 6 or the transmitter embodiments as disclosed in U.S. Pat. No. 9,891,337, issued Feb. 13, 2018, entitled UTILITY LOCATOR TRANSMITTER DEVICES, SYSTEMS, AND METHODS WITH DOCKABLE APPARATUS; U.S. Pat. No. 9,927,546, issued Mar. 27, 2018, entitled PHASE-SYNCHRONIZED BURIED OBJECT TRANSMITTER AND LOCATOR METHODS AND APPARATUS; U.S. patent application Ser. No. 17/528,956, filed Nov. 17, 2021, entitled SIGNAL TRANSMITTER CONNECTION PORT FOR WIRELESS INSPECTION AND LOCATING SYSTEM; and/or like devices of the incorporated patents and applications.

For instance, the utility locating transmitter 1060 may include electronic circuitry and components and one or more inductive clamps, direct contact clips, and/or other apparatus to directly or inductively coupling electrical current from a transmitter to one or more utility lines (e.g., the utility line 656 of FIG. 6) such that a utility locator device (e.g., the utility locator device 950 of FIGS. 9A and 9B and/or the utility locator device 650 of FIG. 6) may determine positions and/or mapping the utility line(s) (e.g., utility line 656 of FIG. 6).

A modular battery system 1000a that includes an interchangeable battery interface apparatus (e.g., interchangeable battery interface apparatus 1010a of FIGS. 10A and 10B or the interchangeable battery interface apparatuses 1010d, 1010e, and 1010f of FIG. 10B) may be used for mating one or more battery types in powering the associated host device, such as the utility locating transmitter 1060.

Referring to FIG. 10B, the interchangeable battery interface apparatus embodiments 1010a, 1010d, 1010e, and 1010f may be or share aspects with the interchangeable battery interface apparatus embodiments 200a, 200d, 200e, and 200f of FIGS. 2A and 2B or the interchangeable battery interface apparatus embodiments 500a, 500d, 500e, and 500f of FIGS. 5A and 5B configured for use with multiple batteries. Each of the interchangeable battery interface apparatuses 1010a, 1010d, 1010e, and 1010f may be configured to mate with one or more different battery types in powering the utility locator device 1050 when coupled thereto.

For instance, the interchangeable battery interface apparatuses 1010a may be configured to mate with battery 1012a, 1012b, or 1012c, the interchangeable battery interface apparatuses 1010d may be configured to mate with battery 1012d, the interchangeable battery interface apparatuses 1010e may be configured to mate with battery 1012e, and the interchangeable battery interface apparatuses 1010f may be configured to mate with battery 1012f in powering utility locating transmitter 1060.

Various different interchangeable battery interface apparatus embodiments are illustrated in FIG. 10B (e.g., interchangeable battery interface apparatuses 1010a, 1010d, 1010e, and 1010f) that may each adapt the utility locating transmitter 1060 to mate with one or more different battery types (e.g., battery 1012a, 1012b, 1012c, 1012d, 1014e, and 1014f). In some embodiments, the various interchangeable battery interface apparatuses may instead include a base subassembly (e.g., the base subassembly 340 of FIG. 3) such that only the battery-specific adapters (e.g., battery-specific adapters 210a, 210d, 210e, and 210f of FIGS. 2A and 2B) may be swapped out to adapt the interchangeable battery interface apparatus (e.g., interchangeable battery interface apparatus 200a, 200d, 200e, and 200f of FIGS. 2A and 2B) for use with a different battery type (e.g., batteries 1012a, 1012b, 1012c, 1012d, 1014e, and 1014f). The utility locating transmitter 1060 may include a mounting port 1062 (partially obscured) for coupling the interchangeable battery interface apparatus 1010a, 1010d, 1010e, or 1010f. For instance, the mounting port 1062 (partially obscured) may be or include a surface to which the interchangeable battery interface apparatus 1010a, 1010d, 1010e, or 1010f may mechanically and electrically couple to the utility locating transmitter 1020.

Turning to FIG. 10C, a modular battery system embodiment 1000c is illustrated which may be the same as or similar to the modular battery system embodiments 1000a of FIGS. 10A and 10B, where various components of an interchangeable battery interface apparatus (e.g., a base subassembly 1040) may be built into the utility locating transmitter 1060. For instance, each interchangeable battery interface apparatus 1010a, 1010d, 1010e, and 1010f may include a respective battery-specific adapters 1011a, 1011d, 1011e, and 1011f adapted for use with one or more different batteries (e.g., the battery-specific adapters 1011a adapted for use with battery 1012a, 1012b, or 1012c; the battery-specific adapters 1011d adapted for use with battery 1012d; the battery-specific adapters 1011e adapted for use with battery 1012e; or the battery-specific adapters 1011f adapted for use with battery 1012f) that may mate with the base subassembly 1040 built into the utility locating transmitter 1060.

The base subassembly embodiment 1040 may be the same or share aspects with the base subassembly 340 of FIG. 3. For instance, the base subassembly 1040 may include a number of slit features to accommodate electrical contacts of various different battery-specific adapters (e.g., the battery-specific adapters 1011*a*, 1011*d*, 1011*e*, and 1011*f*). Likewise, the base subassembly 1040 built into utility locating transmitter 1060 may include a PCB (e.g., the PCB 460 of FIG. 4) or the like having analogous electrical contacts to that of the battery specific adapters as well as a routing element to distribute electrical current.

The PCB or like electronics substrate element may include a control element which may be or share aspects with the control element 480 of FIG. 4 for receiving input electrical current from the battery or batteries and output current for powering and/or exchanging data with the utility locating transmitter 1060 or other host device(s). The control element may be or include an undervoltage-lockout (UVLO) circuit, an overvoltage circuit, one or more temperature sensors, a voltage level element to step up or down voltage in ensuring proper voltage at a connected host device, one or more processors and non-transitory memory(ies).

In some such embodiments, the exchanged data may include a viral-like scheme and electronics to communicate data and/or transfer code between batteries, host devices, and interchangeable battery interface apparatuses 1010*a*, 1010*d*, 1010*e*, or 1010*f*. Such viral-like code/data transfer schemes and associated electronics may be or share aspects with those as described in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER of the incorporated patents and applications. The PCB or like element may further include an authentication element to authenticate batteries that may be coupled to the interchangeable battery interface apparatus for purpose of disallowing some battery types and/or as a security measure in case of theft.

Figure 11A:
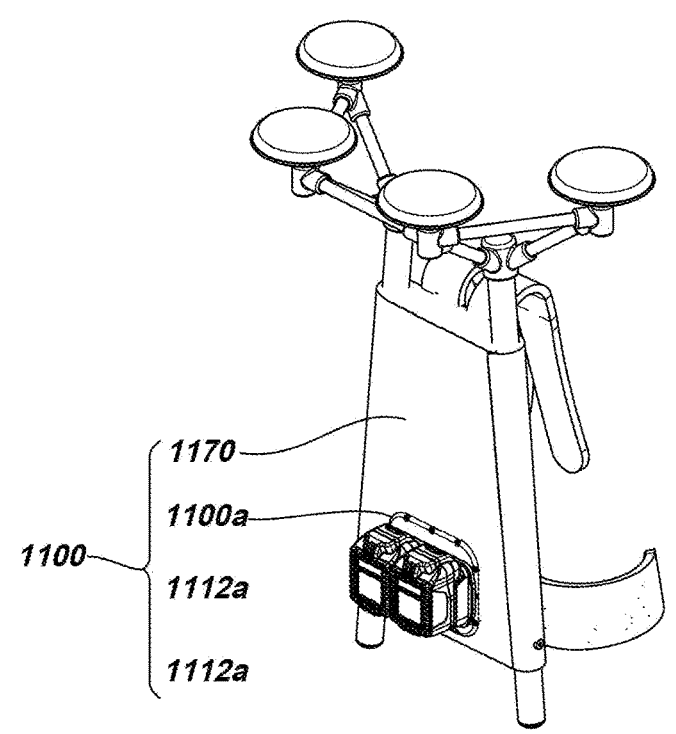
FIG. 11A is an isometric view of a modular battery system embodiment including an interchangeable battery interface apparatus embodiment employed in a GNSS backpack.
Figure 11B:
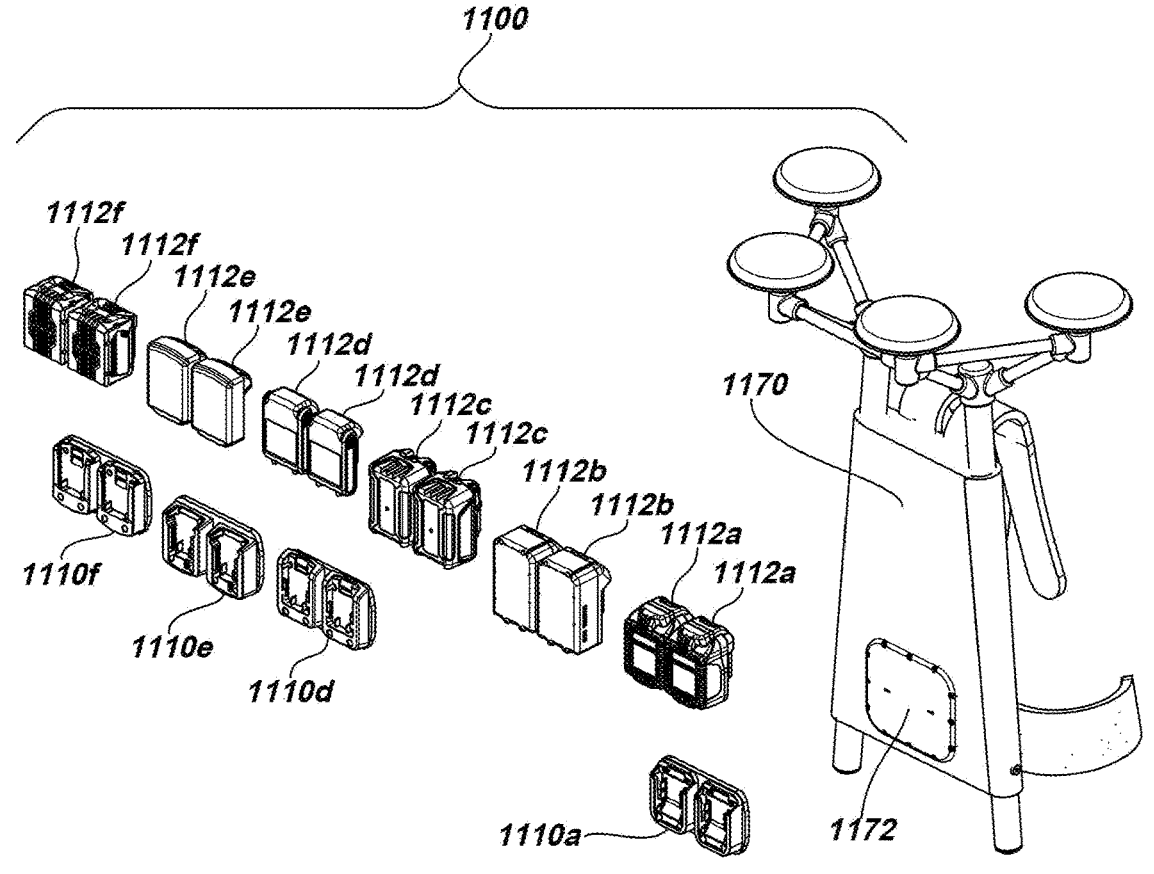
FIG. 11B is a partially exploded view of the modular battery system embodiment of FIG. 11A with various different interchangeable battery interface apparatus embodiments, battery embodiments, and the GNSS backpack separated.

Turning to FIGS. 11A and 11B, a GNSS backpack embodiment 1170 is illustrated which may be or share aspect with the GNSS backpack embodiment 670 of FIG. 6 and/or the backpack device embodiments as disclosed in U.S. Pat. No. 10,608,348, issued Mar. 31, 2020, entitled DUAL ANTENNA SYSTEMS WITH VARIABLE POLARIZATION; U.S. patent application Ser. No. 17/235,507, filed Apr. 20, 2021, entitled UTILITY LOCATING DEVICES EMPLOYING MULTIPLE SPACED APART GNSS ANANCY FOR RTK POSITIONING AND OTHER POSITIONING SYSTEMS AND METHODS; and/or like devices of the incorporated patents and applications. The GNSS backpack 1170 may include one or more global navigation satellite systems (GNSS) and associated antennas to receive satellite navigation signals in determining geolocation which may further refine the geolocation of an associated utility locator device (e.g., the utility locator device 1050 of FIGS. 10A and 10B and/or the utility locator device 650 of FIG. 6) in determining positions and/or mapping utility line(s) (e.g., utility line 656 of FIG. 6). A modular battery system 1100*a* that includes an interchangeable battery interface apparatus (e.g., interchangeable battery interface apparatus 1110*a* of FIGS. 11A and 11B or the interchangeable battery interface apparatuses 1110*d*, 1110*e*, and 1110*f* of FIG. 11B) may be used for mating a plurality of batteries in powering the GNSS backpack 1170. In other embodiments, an interchangeable battery interface apparatus which may be employed in a GNSS backpack device in accordance with aspects of the present disclosure may instead be configured for one battery or for more than two batteries simultaneously.

Referring to FIG. 11B, interchangeable battery interface apparatus embodiments 1110*a*, 1110*d*, 1110*e*, and 1110*f* may be or share aspects with the interchangeable battery interface apparatus embodiments 200*a*, 200*d*, 200*e*, and 200*f* of FIGS. 2A and 2B or the interchangeable battery interface apparatus embodiments 500*a*, 500*d*, 500*e*, and 500*f* of FIGS. 5A and 5B. Each of the interchangeable battery interface apparatuses 1110*a*, 1110*d*, 1110*e*, and 1110*f* may be configured to mate with one or more different battery types in powering the GNSS backpack 1170 when coupled thereto. For instance, the interchangeable battery interface apparatuses 1110*a* may be configured to mate with two of the batteries 1112*a*, 1112*b*, or 1112*c*, the interchangeable battery interface apparatuses 1110*d* may be configured to mate with two of the batteries 1112*d*, the interchangeable battery interface apparatuses 1110*e* may be configured to mate with two of the batteries 1112*e*, and the interchangeable battery interface apparatuses 1110*f* may be configured to mate with two of the batteries 1112*f* in powering GNSS backpack 1170.

Various different interchangeable battery interface apparatus embodiments are illustrated in FIG. 11B (e.g., interchangeable battery interface apparatuses 1110*a*, 1110*d*, 1110*e*, and 1110*f*) that may each adapt the GNSS backpack 1170 to mate with one or more different battery types (e.g., battery 1112*a*, 1112*b*, 1112*c*, 1112*d*, 1114*e*, and 1114*f*). In some embodiments, the various interchangeable battery interface apparatuses may instead include a subassembly (e.g., the base subassembly 240 of FIGS. 2A and 2B) such that only the battery-specific adapters (e.g., battery-specific adapters 210*a*, 210*d*, 210*e*, and 210*f* of FIGS. 2A and 2B) may be swapped out to adapt the interchangeable battery interface apparatus (e.g., interchangeable battery interface apparatus 200*a*, 200*d*, 200*e*, and 200*f* of FIGS. 2A and 2B) for use with a different battery type (e.g., batteries 1112*a*, 1112*b*, 1112*c*, 1112*d*, 1114*e*, and 1114*f*). The GNSS backpack device 1170 may include a mounting port 1172 for coupling the interchangeable battery interface apparatus 1110*a*, 1110*d*, 1110*e*, or 1110*f*. For instance, the mounting port 1172 may be or include a surface to which the interchangeable battery interface apparatus 1110*a*, 1110*d*, 1110*e*, or 1110*f* may mechanically and electrically couple to the GNSS backpack device 1120.

Figure 11C:
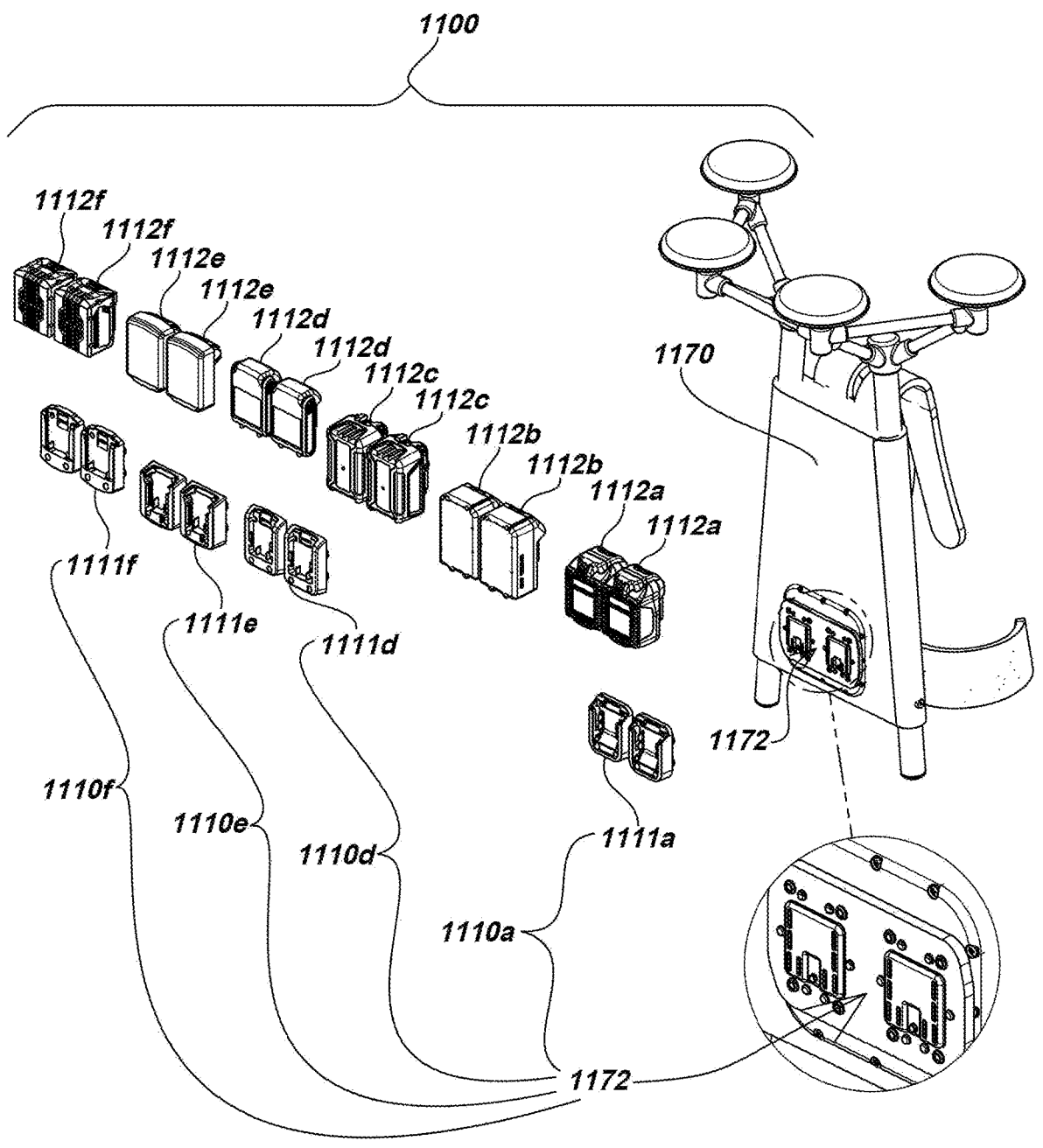
FIG. 11C is a partially exploded view of the modular battery system embodiment including an interchangeable battery interface apparatus embodiment partially built into a GNSS backpack.

Turning to FIG. 11C, a modular battery system embodiment 1100*c* is illustrated which may be the same as or similar to the modular battery system embodiment 1100*a* of FIGS. 11A and 11B where various components of an interchangeable battery interface apparatus (e.g., a base subassembly 1140) may be built into the GNSS backpack 1170. For instance, each interchangeable battery interface apparatus 1110*a*, 1110*d*, 1110*e*, and 11910*f* may include a respective battery-specific adapters 1111*a*, 1111*d*, 1111*e*, and 1111*f* adapted for use with different batteries (e.g., the battery-specific adapters 1111*a* adapted for use with two of the batteries 1112*a*, 1112*b*, or 1112*c*; the battery-specific adapters 1111*d* adapted for use with two of the batteries 1112*d*; the battery-specific adapters 1111*e* adapted for use with two of the batteries 1112*e*; or the battery-specific adapters 1111*f* adapted for use with two of the batteries 1112*f*) that may mate with the base subassembly 1140 built into the GNSS backpack 1170.

The base subassembly embodiment 1140 may be the same or share aspects with the base subassembly embodiment 340 of FIG. 3. For instance, the base subassembly 1140 may include a number of slit features to accommodate electrical contacts of various different battery-specific adapters (e.g., the battery-specific adapters 1111*a*, 1111*d*, 1111*e*, and 1111*f*). Likewise, the base subassembly 1140 built into GNSS backpack 1170 may include a PCB (e.g., the PCB 460 of FIG. 4) or the like having analogous electrical contacts to that of the battery specific adapters as well as a routing element to distribute electrical current. The PCB or like element may include a control element which may be or share aspects with the control element 480 of FIG. 4 for receiving input electrical current from the battery or batteries and output current for powering and/or exchanging data with the GNSS backpack 1170 or other host device.

The control element embodiment may be or include an undervoltage-lockout (UVLO) circuit, an overvoltage circuit, one or more temperature sensors, a voltage level element to step up or down voltage in ensuring proper voltage at a connected host device, one or more processors and non-transitory memory(ies). In some such embodiments, the exchanged data may include a viral-like scheme and associated electronics to communicate data and/or transfer code between batteries, host devices, and interchangeable battery interface apparatuses 1110*a*, 1110*d*, 1110*e*, or 1110*f*. Such viral-like code/data transfer schemes and associated electronics may be or share aspects with those as described in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER of the incorporated patents and applications. The PCB or like element may further include an authentication element to authenticate batteries that may be coupled to the interchangeable battery interface apparatus for purpose of disallowing some battery types and/or as a security measure in case of theft.

Figure 12A:
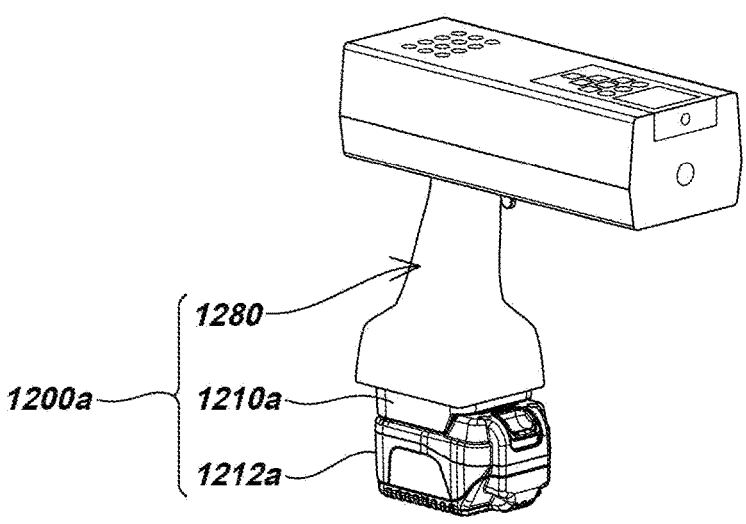
FIG. 12A is an isometric view of a modular battery system embodiment including an interchangeable battery interface apparatus embodiment employed in a rangefinder device.
Figure 12B:
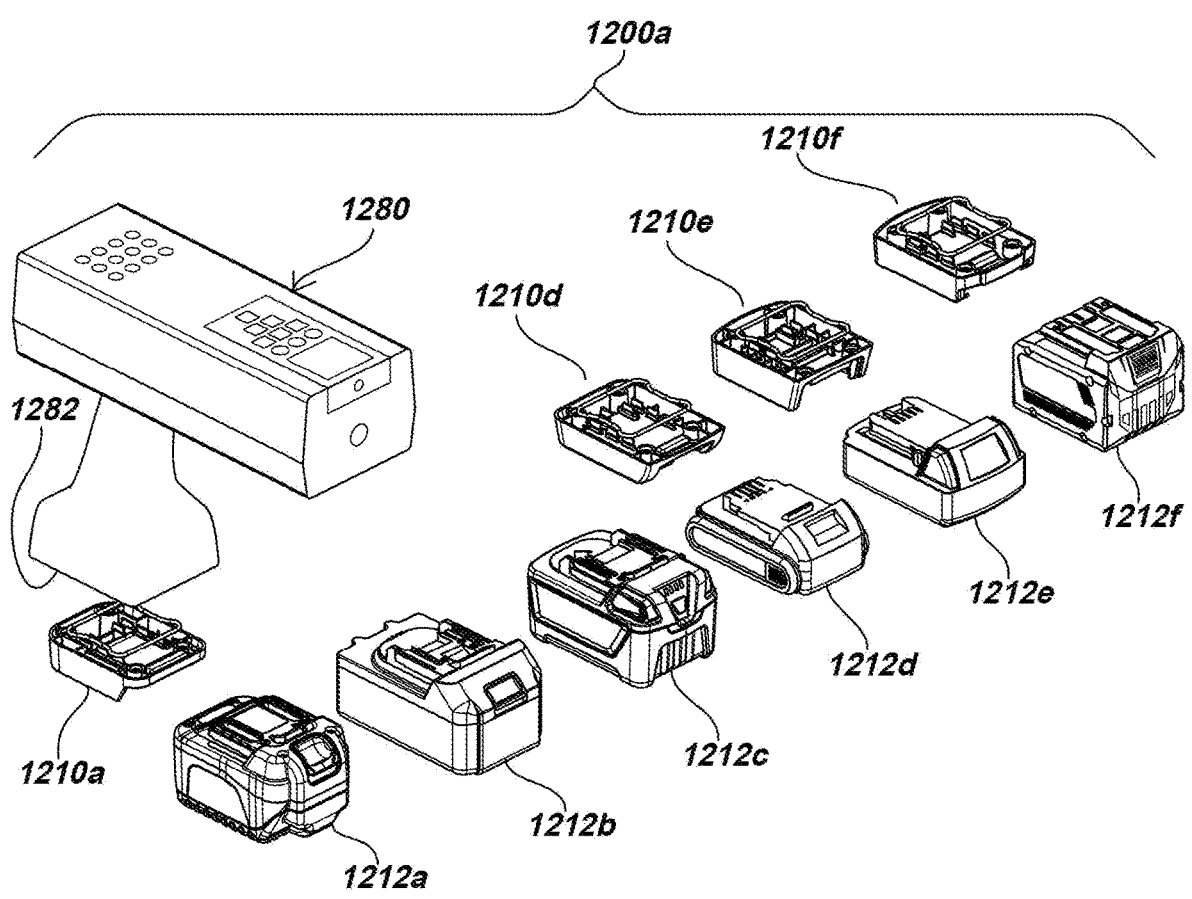
FIG. 12B is a partially exploded view of the modular battery system embodiment of FIG. 12A with various different interchangeable battery interface apparatus embodiments, battery embodiments, and the rangefinder device separated.

Turning to FIGS. 12A and 12B, a modular battery system embodiment 1200*a* is illustrated in a rangefinder apparatus embodiment 1280 which may be or share aspect with the rangefinder apparatus embodiment 680 of FIG. 6 and/or like devices as disclosed in U.S. patent application Ser. No. 15/866,360, filed Jan. 9, 2018, entitled TRACKED DISTANCE MEASURING DEVICES, SYSTEMS, AND METHODS; U.S. Pat. No. 11,397,274, issued Jul. 26, 2022, entitled TRACKED DISTANCE MEASURING DEVICES, SYSTEMS, AND METHODS; U.S. Pat. No. 11,397,274, issued Jul. 26, 2022, entitled TRACKED DISTANCE MEASURING DEVICES, SYSTEMS, AND METHODS; U.S. patent application Ser. No. 17/845,290, filed Jun. 21, 2022, entitled DAYLIGHT VISIBLE AND MULTI-SPECTRAL LASER RANGEFINDERS AND ASSOCIATED METHODS AND UTILITY LOCATOR DEVICES; and/or like devices of the incorporated patents and applications.

The rangefinder apparatus embodiment 1280 may include one or more lasers and associated sensors configured to determine distances as used in utility locating systems (e.g., utility locating system 640 of FIG. 6), for example to determine distance between a reference point on a locator or other device and a ground surface or some other object or structure such as a ground feature, manhole, sign, or other reference point or reference object.

Referring to FIG. 12B, the interchangeable battery interface apparatus embodiments 1210*a*, 1210*d*, 1210*e*, and 1210*f* may be or share aspects with the interchangeable battery interface apparatus embodiments 200*a*, 200*d*, 200*e*, and 200*f* of FIGS. 2A and 2B or the interchangeable battery interface apparatus embodiments 500*a*, 500*d*, 500*e*, and 500*f* of FIGS. 5A and 5B configured for use with multiple batteries. Each of the interchangeable battery interface apparatuses 1210*a*, 1210*d*, 1210*e*, and 1210*f* may be configured to mate with one or more different battery types in powering the rangefinder apparatus 1280 when coupled thereto. For instance, the interchangeable battery interface apparatuses 1210*a* may be configured to mate with battery 1212*a*, 1212*b*, or 1212*c*, the interchangeable battery interface apparatuses 1210*d* may be configured to mate with battery 1212*d*, the interchangeable battery interface apparatuses 1210*e* may be configured to mate with battery 1212*e*, and the interchangeable battery interface apparatuses 1210*f* may be configured to mate with battery 1212*f* in powering rangefinder apparatus 1280.

Various different interchangeable battery interface apparatus embodiments are illustrated in FIG. 12B (e.g., interchangeable battery interface apparatuses 1210*a*, 1210*d*, 1210*e*, and 1210*f*) that may each adapt the rangefinder apparatus 1280 to mate with one or more different battery types (e.g., battery 1212*a*, 1212*b*, 1212*c*, 1212*d*, 1214*e*, and 1214*f*). In some embodiments, the various interchangeable battery interface apparatuses may instead include a base subassembly (e.g., the base subassembly 340 of FIG. 3) such that only the battery-specific adapters (e.g., battery-specific adapters 210*a*, 210*d*, 210*e*, and 210*f* of FIGS. 2A and 2B) may be swapped out to adapt the interchangeable battery interface apparatus (e.g., interchangeable battery interface apparatus 200*a*, 200*d*, 200*e*, and 200*f* of FIGS. 2A and 2B) for use with a different battery type (e.g., batteries 1212*a*, 1212*b*, 1212*c*, 1212*d*, 1214*e*, and 1214*f*).

The rangefinder apparatus embodiment 1280 may include a mounting port 1282 (obscured) for coupling the interchangeable battery interface apparatus 1210*a*, 1210*d*, 1210*e*, or 1210*f*. For instance, the mounting port 1282 (obscured) may be or include a surface to which the interchangeable battery interface apparatus 1210*a*, 1210*d*, 1210*e*, or 1210*f* may mechanically and electrically couple to the rangefinder apparatus 1280.

Figure 12C:
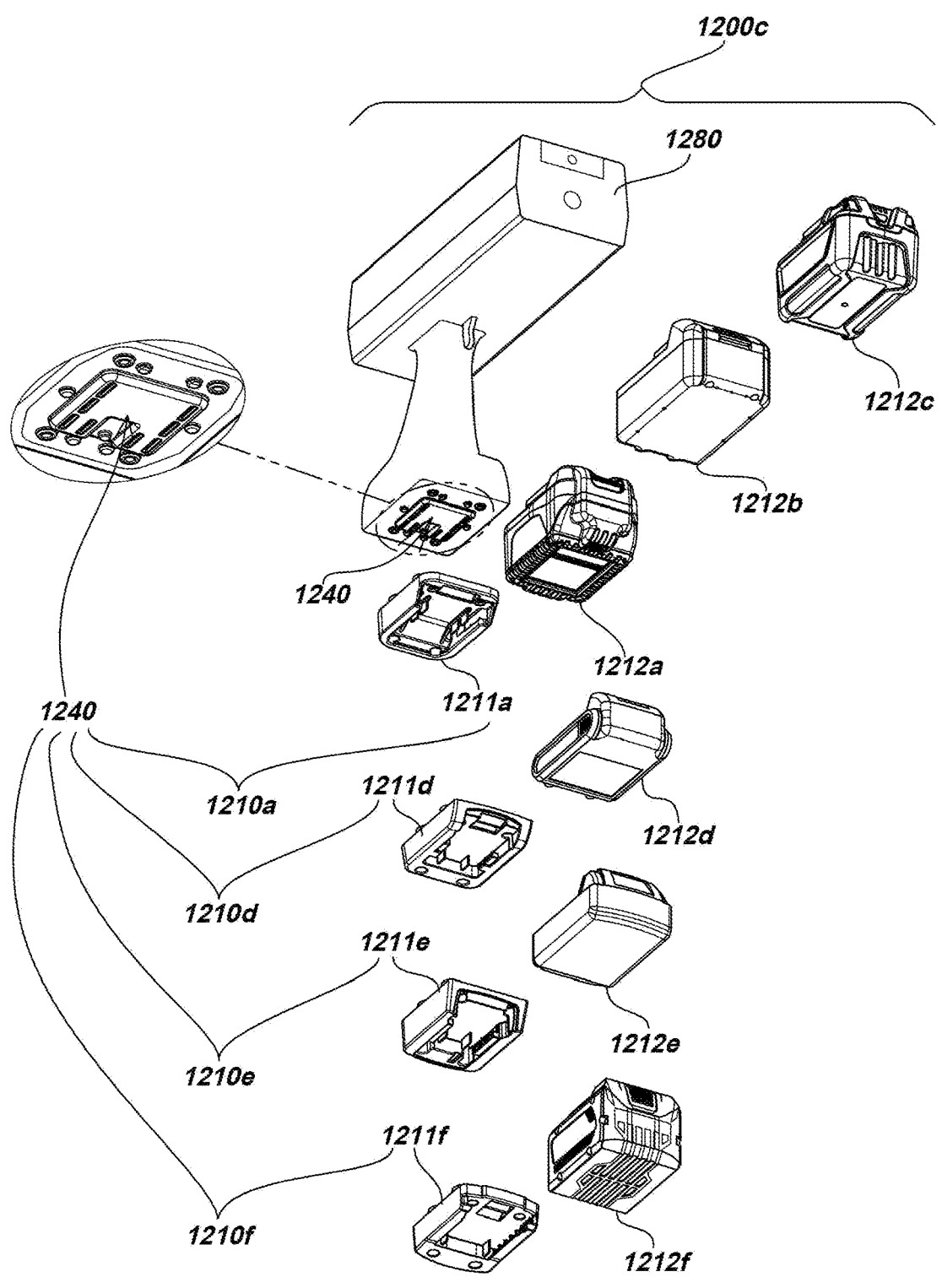
FIG. 12C is a partially exploded view of the modular battery system embodiment including an interchangeable battery interface apparatus embodiment partially built into a rangefinder device.

Turning to FIG. 12C, a modular battery system embodiment 1200*c* is illustrated which may be the same as the modular battery system embodiment 1200*a* of FIGS. 12A and 12B where various components of an interchangeable battery interface apparatus (e.g., a base subassembly 1240) may be built into the rangefinder apparatus 1280. For instance, each interchangeable battery interface apparatus 1210*a*, 1210*d*, 1210*e*, and 12910*f* may include a respective battery-specific adapters 1211*a*, 1211*d*, 1211*e*, and 1211*f* adapted for use with one or more different batteries (e.g., the battery-specific adapters 1211*a* adapted for use with battery 1212*a*, 1212*b*, or 1212*c*; the battery-specific adapters 1211*d* adapted for use with battery 1212*d*; the battery-specific adapters 1211*e* adapted for use with battery 1212*e*; or the battery-specific adapters 1211*f* adapted for use with battery 12112*f*) that may mate with the base subassembly 1240 built into the rangefinder apparatus 1280. The base subassembly 1240 may be the same or share aspects with the base subassembly 340 of FIG. 3.

For instance, the base subassembly embodiment 1240 may include a number of slit features to accommodate electrical contacts of various different battery-specific adapters (e.g., the battery-specific adapters 1211*a*, 1211*d*, 1211*e*, and 1211*f*). Likewise, the base subassembly 1240 built into GNSS backpack 1270 may include a PCB (e.g., the PCB 460 of FIG. 4) or the like having analogous electrical contacts to that of the battery specific adapters as well as a routing element to distribute electrical current. The PCB or like element may include a control element which may be or share aspects with the control element 480 of FIG. 4 for receiving input electrical current from the battery or batteries and output current for powering and/or exchanging data with the rangefinder apparatus 1280 or other host device.

The control element embodiment may be or include an undervoltage-lockout (UVLO) circuit, an overvoltage circuit, one or more temperature sensors, a voltage level element to step up or down voltage in ensuring proper voltage at a connected host device, one or more processors and non-transitory memory(ies). In some such embodiments, the exchanged data may include a viral-like scheme and associated electronics to communicate data and/or transfer code between batteries, host devices, and interchangeable battery interface apparatuses 1210*a*, 1210*d*, 1210*e*, or 1210*f*. Such viral-like code/data transfer schemes and associated electronics may be or share aspects with those embodiments as described in U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER of the incorporated patents and applications. The PCB or like element may further include an electronic authentication element to authenticate batteries that may be coupled to the interchangeable battery interface apparatus for purpose of disallowing some battery types and/or as a security measure in case of theft.

In some configurations, the apparatus or systems described herein may include means for implementing features or providing functions described herein. In one aspect, the aforementioned means may be a module including a processor or processors, associated memory and/or other electronics in which embodiments of the present disclosure may be implemented, such as to implement image and/or video signal processing, switching, transmission, or other functions to process and/or condition camera outputs, control lighting elements, control camera selection, or provide other electronic or optical functions described herein. These may be, for example, modules or apparatus residing in camera assemblies, camera and lighting assemblies, or other assemblies disposed on or within a push-cable or similar apparatus.

Those of skill in the art would understand that information and signals, such as video and/or audio signals or data, control signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Elements or modules as described herein may be used to implement electronics to perform signal generation, transmission, routing, and other functions as described herein.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein with respect to tools, instruments, and other described devices may be implemented or performed in one or more processing elements using elements such as a general or special purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Processing elements may include hardware and/or software/ firmware to implement the functions described herein in various combinations. Elements as described herein that include electronics may be in the form or discrete active or passive electronic components and/or in integrated circuit electronic components or in electronics modules implementing systems or subsystems as described herein. Electronics modules may be implemented on printed circuit board or other electronics base elements.

The previous description of the disclosed embodiments is provided to enable any person skilled in the art to make or use various embodiments. Various modifications to these embodiments will be readily apparent to those skilled in the art, and the generic principles defined herein may be applied to other embodiments without departing from the spirit or scope of the disclosure.

Accordingly, the scope of the disclosure is not intended to be limited to the specific aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make various embodiments of the present invention and their equivalents. Various modifications to these aspects will be readily apparent to those skilled in the art, and the generic principles defined herein may be applied to other aspects without departing from the spirit or scope of the invention. Thus, the scope of the presently claimed invention is not intended to be limited solely to the aspects and embodiments shown herein but is to be accorded the widest reasonable scope consistent with the following claims and their equivalents.

We claim:

1. An interchangeable battery interface apparatus for use with a host device, comprising;
   a base subassembly configured to mechanically and electrically couple to the host device;
   a first battery-specific adapter element configured to mechanically and electrically couple to the base subassembly, the first battery-specific adapter element comprising;
   a first battery-specific interface configured to mate with the interface geometry of a first specific rechargeable battery type, wherein the first specific rechargeable battery type is not compatible with direct coupling to the host device;

an electrical contact element having one or more electrically conductive contacts aligned so as to connect with the electrical contacts of the first specific rechargeable battery type;

a control element having one or more electronic circuits to receive input electrical current from the first specific rechargeable battery type and provide output current for powering the host device; and a routing element providing electrical connectivity and routing between the first battery-specific adapter contact elements, control element, and the host device; and a second battery-specific adapter element, different from the first battery-specific adapter element, configured to mechanically and electrically couple to the base subassembly, the second battery-specific adapter element comprising;

a second battery-specific interface configured to mate with the interface geometry of a second specific rechargeable battery type, different from the first specific rechargeable battery type, wherein the second specific rechargeable battery type is not compatible with direct coupling to the host device;

an electrical contact element having one or more electrically conductive contacts aligned so as to connect with the electrical contacts of the second specific rechargeable battery type;

a control element having one or more electronic circuits to receive input electrical current from the second specific rechargeable battery and provide output current for powering the host device; and a routing element providing electrical connectivity and routing between the second battery-specific adapter contact elements, control element, and the host device.

2. The apparatus of claim 1, wherein the base assembly is attachably and detachably disposable on the host device.

3. The apparatus of claim 1, wherein the base assembly is built into or non-detachably disposed on the host device.

4. The apparatus of claim 1, wherein the base element is configured to receive only one of the first battery-specific adapter element and the second battery-specific adapter element at the same time.

5. The apparatus of claim 1, wherein the base assembly, the first battery-specific adapter element, and the second battery specific adapter element are configured to be attachable and detachable.

6. The apparatus of claim 1, wherein the control element includes an undervoltage-lockout (UVLO) circuit.

7. The apparatus of claim 1, wherein the control element includes an over-voltage protection circuitry.

8. The apparatus of claim 1, wherein the control element includes a temperature sensor.

9. The apparatus of claim 1, wherein the control element comprises one or more electronic circuits for stepping up or stepping down voltage levels of the specific rechargeable battery type to correspond with a voltage requirement of the host device.

10. The apparatus of claim 1, wherein the control element includes one or more processors and associated non-transitory memories for communicating data between the host device and the specific rechargeable battery type.

11. The apparatus of claim 10, wherein the communicated data includes virally communicated code transferred between the specific rechargeable battery and the host device.

12. The apparatus of claim 10, wherein the communicated data is used to authenticate the specific rechargeable battery for use on with the host.

13. The apparatus of claim 1, wherein the host comprises a buried utility locator and the base assembly is configured to mechanically and electrically couple to the utility locator battery interface.

14. The apparatus of claim 1, wherein the host comprises a utility locator transmitter and the base assembly is configured to mechanically and electrically couple to the utility locator transmitter battery interface.

15. The apparatus of claim 1, wherein the host comprises a video inspection system device and the base assembly is configured to mechanically and electrically couple to the video inspection system device battery interface.

16. The apparatus of claim, 1, further including a wireless element disposed in the base subassembly to wirelessly communicate data from the specific rechargeable battery and/or the host.

17. An interchangeable battery interface apparatus for use with a host buried utility locator, comprising;

a base subassembly configured to mechanically and electrically couple to the buried utility locator; and one of a plurality of different battery-specific adapter elements electrically and mechanically couplable to the base subassembly at a given time, wherein ones of the plurality of different battery-specific adapter comprise:

a battery-specific interface configured to mate with the interface geometry of a specific rechargeable battery type of a plurality of different battery types, wherein the specific rechargeable battery type is not compatible with direct coupling to the buried utility locator device;

an electrical contact element having one or more electrically conductive contacts aligned so as to connect with the electrical contacts of the specific rechargeable battery type;

a control element having one or more electronic circuits to receive input electrical current from the specific rechargeable battery and provide output current for powering and/or exchanging data with the buried utility locator device; and a routing element providing electrical connectivity and routing between the contact elements, control element, and the buried utility locator device;

wherein each of the plurality of different battery-specific adapters are configured to electrically and mechanically mate with corresponding ones of different specific rechargeable battery types.

18. An apparatus for use between a battery and a video pipe inspection device, comprising;

a battery-specific adapter element operatively mechanically and electrically coupleable to a base subassembly configured to mechanical couple to the video pipe inspection device, the battery-specific adapter element comprising;

a battery-specific interface configured to mate with the interface geometry of a specific rechargeable battery type, wherein the specific rechargeable battery type is not compatible with direct coupling to the video pipe inspection device;

an electrical contact element having one or more electrically conductive contacts aligned so as to connect with the electrical contacts of the specific rechargeable battery type;

a control element having one or more electronic circuits to receive input electrical current from the specific rechargeable battery and provide output current for powering and exchanging data with the video pipe inspection device;

a routing element providing electrical connectivity and
    routing between the contact elements, control element,
    and the video pipe inspection device; and a wireless element disposed in the battery-specific adapter
    element to wirelessly communicate data from the spe-
    cific rechargeable battery type.

* * * * *